(12) United States Patent
Calafiore et al.

(10) Patent No.: US 11,815,680 B2
(45) Date of Patent: *Nov. 14, 2023

(54) OPTICAL SYSTEM AND METHOD FOR PROVIDING EXPANDED FIELD OF VIEW

(71) Applicant: Meta Platforms Technologies, LLC, Menlo Park, CA (US)

(72) Inventors: Giuseppe Calafiore, Woodinville, WA (US); Oleg Yaroshchuk, Kyiv (UA); Barry David Silverstein, Kirkland, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/900,540

(22) Filed: Aug. 31, 2022

(65) Prior Publication Data
US 2023/0004004 A1   Jan. 5, 2023

Related U.S. Application Data

(63) Continuation of application No. 17/137,530, filed on Dec. 30, 2020, now Pat. No. 11,474,352.

(51) Int. Cl.
*G02B 27/01* (2006.01)
*G02B 5/18* (2006.01)
(Continued)

(52) U.S. Cl.
CPC .......... *G02B 27/0101* (2013.01); *G02B 5/18* (2013.01); *G02B 5/1828* (2013.01);
(Continued)

(58) Field of Classification Search
CPC .... G02B 2027/0178; G02B 2027/0174; G02B 2027/0123; G02B 5/18; G02B 5/1842;
(Continued)

(56) References Cited

U.S. PATENT DOCUMENTS 8,903,207 B1 * 12/2014 Brown ............... G02B 27/0103
359/6
10,551,622 B2   2/2020 Robbins et al.
(Continued)

FOREIGN PATENT DOCUMENTS

CN    107121824 A   9/2017
WO    2022046973 A1  3/2022

OTHER PUBLICATIONS

International Search Report and Written Opinion for International Application No. PCT/US2021/063858, dated Mar. 31, 2022, 12 pages.
Kress B.C., "Optical Waveguide Combiners for AR Headsets: Features and Limitations," SPIE Proceedings, Digital Optical Technologies 2019, Jul. 16, 2019, vol. 11062, 27 pages.
International Preliminary Report on Patentability for International Application No. PCT/US2021/063858, dated Jul. 13, 2023, 10 pages.

*Primary Examiner* — Xuemei Zheng
(74) *Attorney, Agent, or Firm* — MILLBURN IP PLLC

(57) ABSTRACT

A device includes a waveguide. The device also includes a plurality of grating sets coupled with the waveguide and configured to, during a plurality of time periods, couple a plurality of input image lights into and out of the waveguide as a plurality of output image lights. In a first grating set of the plurality of grating sets, a first vector sum of in-plane projections of grating vectors associated with all gratings included in the first grating set is a first non-null vector. In a second grating set of the plurality of grating sets, a second vector sum of in-plane projections of grating vectors associated with all gratings included in the second grating set is a second non-null vector. The first vector sum and the second vector sum have different directions.

19 Claims, 34 Drawing Sheets

(51) Int. Cl.
*G02B 27/42* (2006.01)
*G02B 27/00* (2006.01)

(52) U.S. Cl.
CPC ..... *G02B 27/0081* (2013.01); *G02B 27/0172* (2013.01); *G02B 27/4272* (2013.01); *G02B 2027/0123* (2013.01); *G02B 2027/0159* (2013.01)

(58) Field of Classification Search
CPC .......... G02B 5/1828; G02B 2005/1804; G02B 27/0101; G02B 27/0172; G02B 27/4272; G02B 27/0081; G02B 2027/0159
See application file for complete search history.

(56) References Cited

U.S. PATENT DOCUMENTS

| | | | |
|---|---|---|---|
| 2014/0104665 A1* | 4/2014 | Popovich | G02B 27/0176 359/15 |
| 2015/0125109 A1* | 5/2015 | Robbins | G02B 27/0172 385/10 |
| 2017/0322426 A1 | 11/2017 | Tervo | |
| 2018/0113309 A1 | 4/2018 | Robbins et al. | |
| 2018/0364486 A1* | 12/2018 | Ding | G02B 6/005 |

* cited by examiner

1400

Generating, by a light source assembly, a plurality of input image lights representing a plurality of image portions of a virtual image during a plurality of time periods, the input image lights having a substantially same input field of view ("FOV") with a substantially same symmetry axis ⟵ 1410

During the time periods, coupling, by a plurality of grating sets, the input image lights into a waveguide and out of the waveguide as a plurality of output image lights, a combined output FOV of the output image lights being larger than the input FOV ⟵ 1420

FIG. 14

OPTICAL SYSTEM AND METHOD FOR PROVIDING EXPANDED FIELD OF VIEW

CROSS REFERENCE TO RELATED APPLICATION

This application is a continuation of U.S. patent application Ser. No. 17/137,530, entitled "OPTICAL SYSTEM AND METHOD FOR PROVIDING EXPANDED FIELD OF VIEW," filed on Dec. 30, 2020. Content of the above-mentioned application is incorporated herein by reference in its entirety.

TECHNICAL FIELD

The present disclosure generally relates to optical systems and methods, more specifically, to an optical system and a method for providing an expanded field of view.

BACKGROUND

Near-eye displays ("NEDs") and head-up displays ("HUDs") have been widely implemented in a variety of applications, such as video playback, gaming, and sports. NEDs and HUDs have been used to realize virtual reality ("VR"), augmented reality ("AR"), or mixed reality ("MR"). NEDs and HUDs for AR and/or MR applications display a virtual image superimposed on real-world images or see-through images. Pupil-expansion waveguide display systems with diffractive coupling structures are promising designs for NEDs and HUDs, which can potentially offer sun/eye-glasses form factors, a moderately large field of view ("FOV"), a high transmittance, and a large eye-box. A waveguide display system includes a light source assembly that generates an image light representing a virtual image, and a waveguide coupled with diffractive coupling structures to guide the image light to an eye-box of the waveguide display system. The diffractive coupling structures functioning as an out-coupling element replicate the virtual image at the output side of the waveguide to expand an effective pupil.

SUMMARY OF THE DISCLOSURE

Consistent with a disclosed embodiment of the present disclosure, a device is provided. A device includes a waveguide. The device also includes a plurality of grating sets coupled with the waveguide and configured to, during a plurality of time periods, couple a plurality of input image lights into the waveguide and out of the waveguide as a plurality of output image lights. The plurality of input image lights have a substantially same input field of view ("FOV") with a substantially same symmetry axis. A combined output FOV of the output image lights is larger than the input FOV.

Consistent with a disclosed embodiment of the present disclosure, a method is provided. The method includes generating, by a light source assembly, a plurality of input image lights representing a plurality of image portions of a virtual image during a plurality of time periods, the input image lights having a substantially same input field of view ("FOV") with a substantially same symmetry axis. The method also includes during the time periods, coupling, by a plurality of grating sets, the input image lights into a waveguide and out of the waveguide as a plurality of output image lights. A combined output FOV of the output image lights is larger than the input FOV.

Other aspects of the present disclosure can be understood by those skilled in the art in light of the description, the claims, and the drawings of the present disclosure.

BRIEF DESCRIPTION OF THE DRAWINGS

The accompanying drawings depicting various embodiments are for illustrative purposes and are not intended to limit the scope of the present disclosure. In the drawings:

FIG. 14 is a flowchart illustrating a method for providing an expanded FOV, according to an embodiment of the present disclosure;

DETAILED DESCRIPTION

Figure 1A:
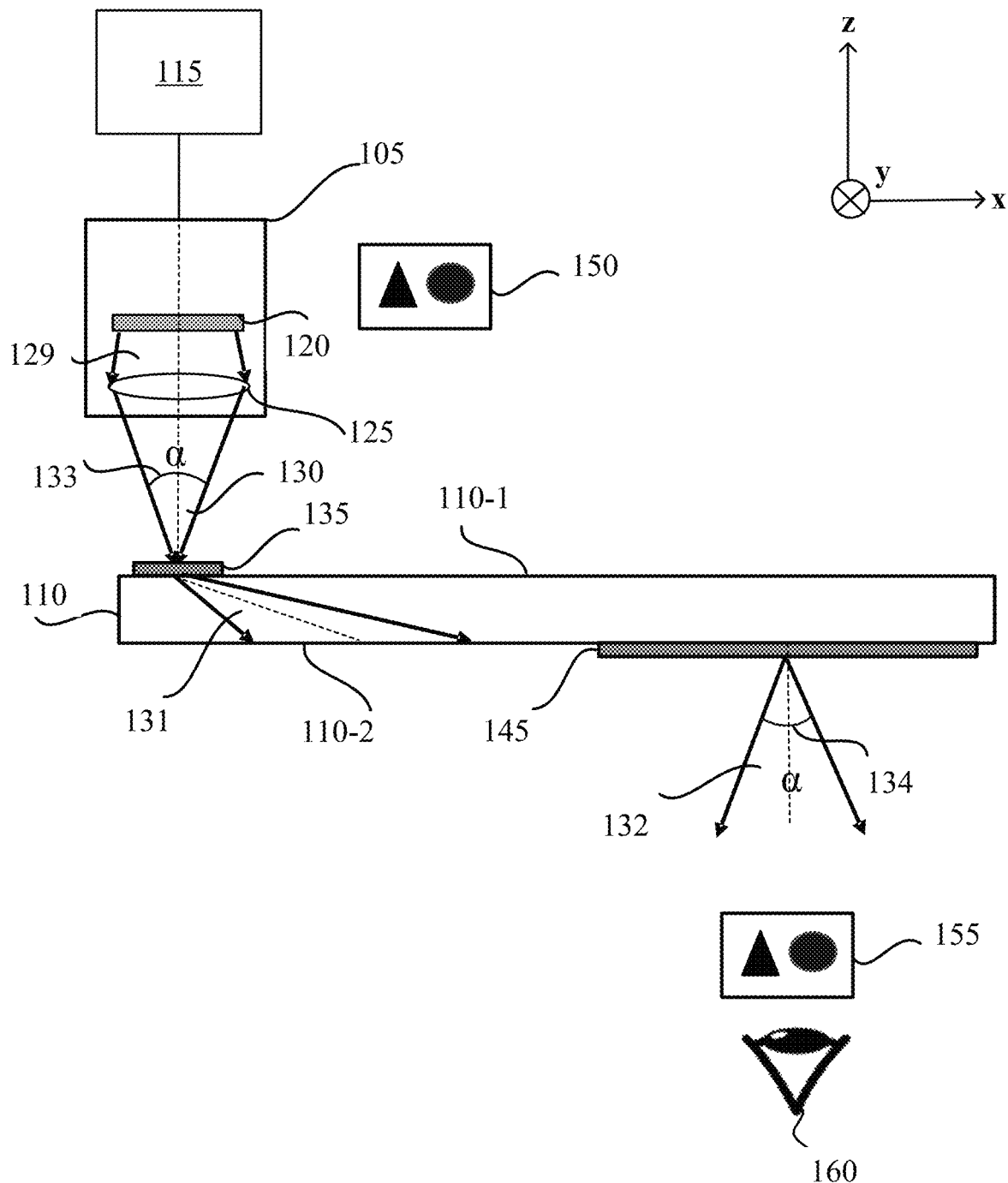
FIG. 1A illustrates a schematic diagram of a conventional waveguide optical system implemented in a near-eye display ("NED")

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a light output from one optical element may be directly or indirectly received by the other optical element. An optical series refers to optical positioning of a plurality of optical elements in a light path, such that a light output from one optical element may be transmitted, reflected, diffracted, converted, modified, or otherwise processed or manipulated by one or more of other optical elements. In some embodiments, the sequence in which the plurality of optical elements are arranged may or may not affect an overall output of the optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. It is understood that the term "on" may not necessarily imply that the first element is over the second element in the vertical, gravitational direction. The first element may be disposed or arranged at any suitable orientation relative to the second element (e.g., over or above the second element, below or under the second element, left to the second element, right to the second element, behind the second element, in front of the second element, etc.). When the first element is described as being disposed "on" the second element, the first element may be directly or indirectly disposed on the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof. The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor. The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc. The term "communicatively coupled" or "communicatively connected" indicates that related items are coupled or connected through a communication channel, such as a wired or wireless communication channel.

A linear polarizer may be configured to selectively transmit a linearly polarized light having a first linear polarization and selectively block a linearly polarized light having a second linear polarization orthogonal to the first linear polarization. A linear polarizer may be, for example, a reflective polarizer (e.g., a dual brightness enhancement film, a lyotropic liquid crystal layer, a wire grid polarizer, a prism polarizer, etc.), or an absorptive polarizer (e.g., a dichroic polarizer). The linear polarizer may have a light transmission axis and a light absorption axis that is orthogonal to the light transmission axis in a plane direction. In some embodiment, the polarization efficiency of the linear polarizer may be smaller than 50%. In some embodiment, the polarization efficiency of the linear polarizer greater than about 50%, e.g., 60%, 70%, 80%, 90%, or 95%, etc.

The term "orthogonal" as used in "orthogonal polarizations" or the term "orthogonally" as used in "orthogonally polarized" means that an inner product of two vectors representing the two polarizations is substantially zero. For example, two lights with orthogonal polarizations or two orthogonally polarized lights may be two linearly polarized lights with polarizations in two orthogonal directions (e.g., an x-axis direction and a y-axis direction in a Cartesian coordinate system) or two circularly polarized lights with opposite handedness (e.g., a left-handed circularly polarized light and a right-handed circularly polarized light).

An output angle of a ray diffracted out of an out-coupling element may be defined as an angle between the ray and a normal of a surface of the out-coupling element or a normal of a surface of the waveguide with which the out-coupling element is coupled. The output angle may be defined as positive or negative depending on the angular relationship between the ray and the normal of the surface of the out-coupling element or the normal of the surface of the waveguide. For discussion purposes, the output angle may be defined as positive when the ray is clockwise from the normal, and as negative when the ray is counter-clockwise from the normal. A slant angle of a grating having slanted microstructures (also referred to as a slant grating) may be defined as positive or negative depending on the angular relationship between a tilting direction of the microstructures and the normal of the surface (also referred to as surface normal) of the grating. For discussion purposes, the slant angle may be defined as positive when the tilting direction of the microstructures is clockwise from the surface normal, and as negative when the tilting direction of the microstructures is counter-clockwise from the surface normal.

A grating vector of (or associated with) a grating represents a quantitative description of the properties of the grating. The grating vector may be defined as a vector having a direction orthogonal to the lines of the grating (or the planes of constant refractive indices in the grating) and a magnitude of $2\pi/\Lambda$, where $\Lambda$ is the grating period (or pitch). An "in-plane projection" of a grating vector refers to a projection of the grating vector in a plane of the grating (e.g., a surface plane of the grating, or a plane parallel to the surface plane of the grating) or a plane corresponding to a surface of a waveguide to which the grating is attached. In some embodiments, the in-plane projection may have a direction parallel or anti-parallel with a pupil expansion direction. In some embodiments, the in-plane projection may have a direction that is not parallel or anti-parallel with the pupil expansion direction. A pupil expansion direction refers to a direction in which the pupil is replicated or expanded.

FIG. 1A illustrates a schematic diagram of a conventional waveguide display system 100. The waveguide display system 100 may include a light source assembly 105, a waveguide 110, and a controller 115. The light source assembly 105 may output an input image light 130 having an input field of view ("FOV") 133 toward the waveguide 110. The light source assembly 105 may include a display element 120 and a collimating lens 125. The display element 120 may generate an image light 129 representing a virtual image 150 having a predetermined image size that may be limited by a linear size of a display panel or a scanning range of a laser scanner included in the display element 120. The virtual image 150 may be an extended image and the predetermined image size is not negligible when compared to the size of the collimating lens 125. The collimating lens 125 may condition the image light 129 and output the input image light 130 having the input FOV 133 toward the waveguide 110. The collimating lens 125 may transform or convert a linear distribution of pixels of the display panel into an angular distribution of pixels. The waveguide display system 100 may include an in-coupling grating 135 and an out-coupling grating 145 coupled to the waveguide 110. The in-coupling grating 135 may couple, via diffraction, the input image light 130 into the waveguide 110 as an in-coupled image light 131. The in-coupled image light 131 may propagate within the waveguide 110 toward the out-coupling grating 145 through total internal reflection ("TIR"). The out-coupling grating 145 may couple, via diffraction, the in-coupled image light 131 out of the waveguide 110 as an output image light 132 having an output FOV 134.

Figure 1B:
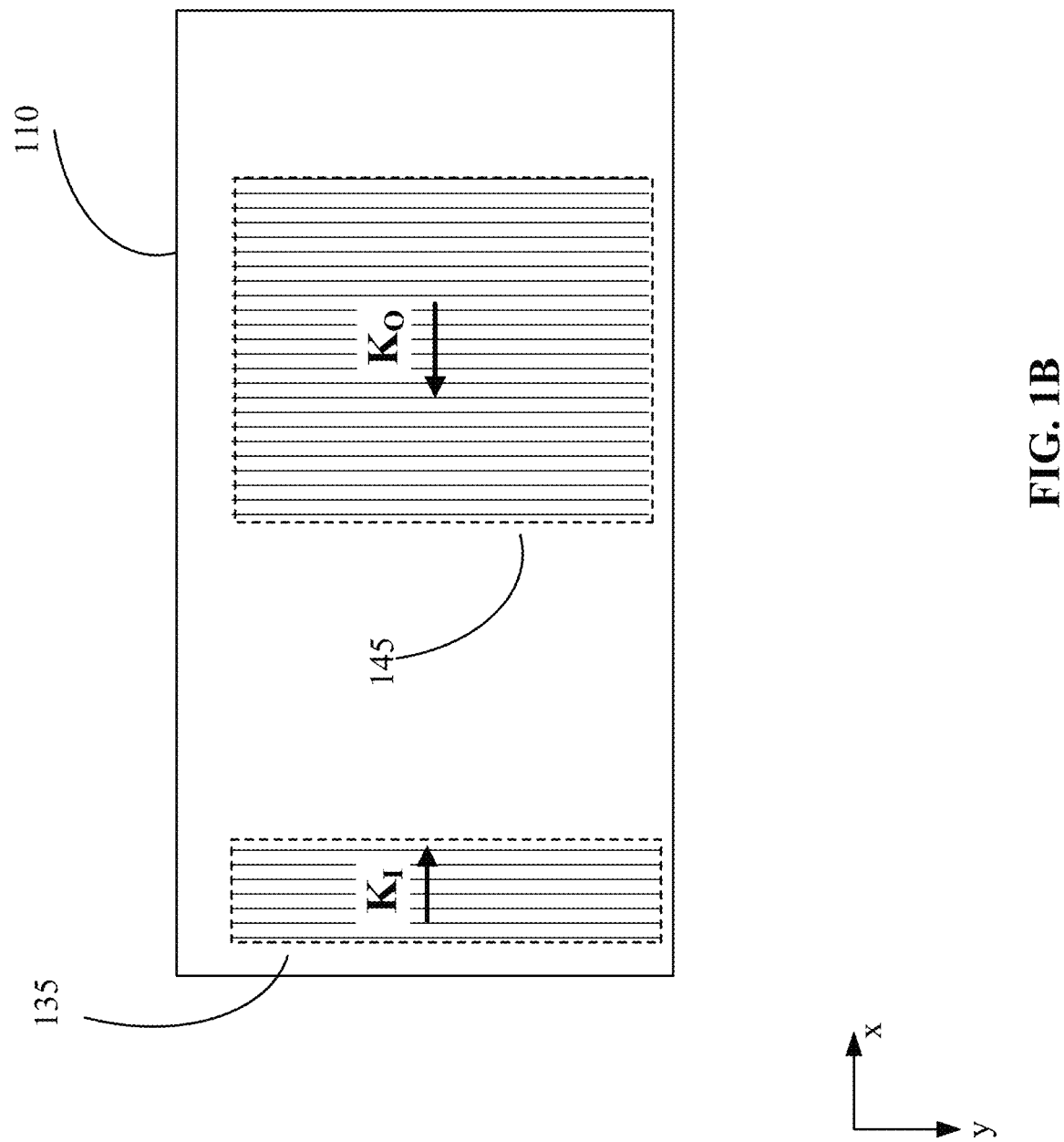
FIG. 1B illustrates a schematic cross-sectional view of a waveguide and an in-coupling grating and an out-coupling grating coupled to the waveguide shown in FIG. 1A.

FIG. 1B illustrates an x-y sectional view of the waveguide 110, and the in-coupling grating 135 and the out-coupling grating 145 coupled to the waveguide 110. As shown in FIG. 1B, a grating vector $\vec{K}_I$ of the in-coupling grating 135 may be configured with a magnitude of $2\pi/\Lambda_i$, where $\Lambda_i$ is the period of the grating. A direction of the grating vector $\vec{K}_I$ may be parallel with or the same as a direction of periodicity of the in-coupling grating 135. A grating vector $\vec{K}_O$ of the out-coupling grating 145 may be configured with a magnitude of $2\pi/\Lambda_o$, where $\Lambda_o$ is the period of the out-coupling grating 145. A direction of the grating vector $\vec{K}_O$ may be the same as a direction of periodicity of the out-coupling grating 145. A grating vector (e.g., $\vec{K}_I$, $\vec{K}_O$) may indicate the diffraction effect of the grating on an input image light. A vector sum of projections of the grating vector $\vec{K}_I$ and the grating vector $\vec{K}_O$ onto a pupil expansion direction (e.g., an x-axis direction) may be a null vector.

A projection of a grating vector (e.g., $\vec{K}_I$, $\vec{K}_O$) on the pupil expansion direction (e.g., an x-axis direction) may be referred to as an in-plane projection of the grating vector. That is, the grating vector may be projected onto a plane including the pupil expansion direction. The plane may be parallel to the surface of the grating. The directions of the in-plane projections of the grating vector $\vec{K}_I$ and the grating vector $\vec{K}_O$ may be substantially anti-parallel, and the magnitudes of the in-plane projections of the grating vector $\vec{K}_I$ and the grating vector $\vec{K}_O$ may be substantially the same. For example, as shown in FIG. 1B, the in-coupling grating 135 and the out-coupling grating 145 may be gratings having non-slanted grating microstructures (e.g., non-slant gratings) extending in a y-axis direction. Thus, the in-plane projections of the grating vector $\vec{K}_I$ and the grating vector $\vec{K}_O$ may be equal to the grating vector $\vec{K}_I$ and the grating vector $\vec{K}_O$, respectively. In other words, the directions of the grating vectors $\vec{K}_I$ and $\vec{K}_O$ may be substantially anti-parallel and the magnitudes of the grating vector $\vec{K}_I$ and the grating vector $\vec{K}_O$ may be substantially the same.

In such a configuration, due to a symmetric configuration of the grating vectors $\vec{K}_I$ and $\vec{K}_O$, the output image light 132 with the output FOV 134 may not be rotated with respect to the input image light 130 with the input FOV 133. Each of the input FOV 133 and the output FOV 134 may have a symmetry axis parallel to a surface normal of the waveguide 110, as shown in FIG. 1A, and an angular size of the output FOV 134 may be substantially equal to an angular size of the input FOV 133. A symmetry axis of an FOV of an image light refers to a symmetry axis of a view cone, in which the rays of the image light are confined. The FOV of the image light may refer to an angular size of the view cone. Both of the input FOV 133 and the output FOV 134 may have an angular size represented by the angle α. Accordingly, an image 155 perceived by an eye 160 that receives the output image light 132 may be substantially the same as (or may have the same image content as) the virtual image 150. Increasing the size of the display element 120 (or, increasing a scanning range or area of a scanner, e.g., a laser scanner, when the display element 120 is a laser scanning display panel) may increase the angular size of the output FOV 134 of the conventional waveguide display system 100. However, the size of the collimating lens 125 may need to be increased. The increase in the size of the display element 120 (or, of the scanning range or area of the scanner, e.g., a laser scanner, when the display element 120 is a laser scanning display panel) and the increase in the size of the collimating lens 125 may result in a larger form factor, a heavier weight, and a higher cost.

The present disclosure provides an optical system (e.g., a waveguide display system) configured to provide an increased or expanded overall output FOV as compared to an input FOV, without increasing the form factor of the optical system, the size of a light-generating display screen (or panel) of the display element (or without increasing the scanning range or area of the laser scanner when the display element includes a laser scanning display panel), and without increasing the size of the collimating lens. The waveguide display system may include a waveguide and a plurality of grating sets coupled with the waveguide. The grating sets may be configured to, during a plurality of time periods, couple a plurality of input image lights into the waveguide to propagate inside the waveguide, and couple the input image lights propagating inside the waveguide out of the waveguide as a plurality of output image lights. The plurality of input image lights may have a substantially same input field of view ("FOV") with a substantially same symmetry axis. A combined output FOV of the output image lights (which is the FOV integrated over the total period of time or a frame time) is larger than the input FOV.

In some embodiments, the symmetry axis of the input FOV may be substantially parallel with a surface normal of the waveguide. In some embodiments, each grating set may include a plurality of gratings. In some embodiments, in at least one of the plurality of grating sets, a vector sum of in-plane projections of grating vectors of all of the gratings included in the at least one grating set may be a non-null vector. In some embodiments, the at least one grating set may include an in-coupling grating and an out-coupling grating, and at least one of the in-coupling grating or the out-coupling gratings may be a directly switchable grating or an indirectly switchable grating. In some embodiments, the at least one grating set may include an in-coupling grating, an out-coupling grating, and a folding grating, and at least one of the in-coupling grating, the out-coupling gratings, or the folding grating may be a directly switchable grating or an indirectly switchable grating.

In some embodiments, the waveguide display system may include at least one waveguide, at least one in-coupling element and at least one out-coupling element coupled with the at least one waveguide. In some embodiments, a plurality of out-coupling elements may be included. In some embodiments, each out-coupling element may include one or more out-coupling gratings. The at least one in-coupling element may be configured to couple two input image lights having a substantially same input FOV into the at least one waveguide during two time periods (e.g., two consecutive sub-frames), respectively. In some embodiments, the waveguide display system may include a controller configured to control a plurality of out-coupling gratings to operate in a diffraction state to couple the input image lights out of the at least one waveguide as two output image lights during the two time periods, respectively.

Two output FOVs of the two output image lights may have a substantially narrow or small overlapping area (or overlapping FOV portion), and an angular size of the overlapping FOV portion may be smaller than a predetermined percentage of each of the two output FOVs. For example, the predetermined percentage of each of the two output FOVs may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. A combined output FOV of the two output FOVs may be larger than the input FOV. In some embodiments, at least one (e.g., each) of the output FOVs of the output image lights may be substantially equal to the input FOV. In some embodiments, the angular size of the combined output FOV may be at least two times (e.g., two times, three times, or four times, etc.) of angular size of the input FOV.

In some embodiments, at least one of the out-coupling gratings may be a directly switchable grating electrically coupled with a power source, which may supply a voltage to the directly switchable grating. The controller may control the power source to configure the directly switchable grating to operate in a diffraction state or a non-diffraction state. In some embodiments, at least one of the out-coupling gratings may be an indirectly switchable grating optically coupled with a polarization switch. The controller may control the polarization switch to operate in a switching state or a non-switching state via a power source electrically coupled with the polarization switch, thereby configuring the indirectly switchable grating to operate in the diffraction state or the non-diffraction state.

In some embodiments, the out-coupling gratings may include a directly switchable grating and an indirectly switchable grating. Power sources may be electrically coupled with the directly switchable grating and the polarization switch that is optically coupled with the indirectly switchable grating, respectively. The controller may control the power sources that are electrically coupled with the directly switchable grating and the polarization switch respectively, to control the directly switchable grating and the indirectly switchable grating to operate in the diffraction state or the non-diffraction state.

In some embodiments, the two input image lights having the same input FOV may include a first input image light and a second input image light. The two time periods may include a first time period and a second time period. The two output image lights may include a first output image light having a first output FOV and a second output image light having a second output FOV. During the first time period, the at least one in-coupling element may be configured to couple the first input image light having the input FOV into the at least one waveguide. The controller may configure a first out-coupling grating to operate in the diffraction state to couple, via diffraction, the first input image light out of the at least one waveguide as the first output image light having the first output FOV. The controller may configure a second out-coupling grating to operate in a non-diffraction state (with substantially zero or negligible diffraction, or with a diffraction efficiency lower than a predetermined value).

During the second time period, the at least one in-coupling element may be configured to couple the second input image light having the input FOV into the at least one waveguide. The controller may configure the second out-coupling grating to operate in the diffraction state to couple, via diffraction, the second input image light out of the at least one waveguide as the second output image light having the second output FOV. The controller may configure the first out-coupling grating to operate in the non-diffraction state. In some embodiments, an angular size of the first output FOV may be substantially the same as an angular size of the second output FOV, and may be substantially the same as the input FOV.

In some embodiments, the optical system may include a light source assembly configured to generate an input image light representing an image portion of a virtual image. The input image light may have a predetermined input field of view ("FOV"). The virtual image may have an image size. The light source assembly may include a display element configured to generate an image light based on the image portion and a lens configured to convert the image light into the input image light having the input FOV. The input FOV may be represented by an angular size.

The image portion may be displayed by a full light-generating area of the display element. That is, the image light corresponding to the image portion may be generated by the full light-generating area of the display element. Each image portion may have an image portion size that is substantially the same as a size of the full light-generating area of the display element. Thus, the input image light may be generated based on the light generated by the full light-generating area of the display element. The image size of the virtual image may be larger than the size of the full light-generating area of the display element (also referred to as a size of the display element). In some embodiments, the image size of the virtual image may be two times, three times, or four times, etc., of the size of the full light-generating area of the display element. In some embodiments, the virtual image may be spatially divided (e.g., equally divided) into a plurality of image portions (e.g., a first image portion and a second image portion) each having an image portion size (e.g., a diagonal length). The image portion size may be substantially the same for the image portions. In some embodiments, the size of the full light-generating area of the display element may be substantially equal to a size of the display panel included in the display element. In some embodiments, when the display element includes a laser scanning display panel, the size of the full light-generating area of the display element may include, correspond to, or be determined by a full scanning range or area of a laser scanner. In some embodiments, a display frame of the virtual image may be divided into a plurality of (e.g., two) sub-frames (sub-frames being exemplary two time periods).

During a first sub-frame, the controller may control the light source assembly to generate and output a first input image light representing the first image portion (e.g., a left half) of the virtual image. The at least one in-coupling element may couple the first input image light having the input FOV into the at least one waveguide. The controller may configure the first out-coupling grating to operate in the diffraction state to couple, via diffraction, the first input image light out of the at least one waveguide as the first output image light having the first output FOV. The controller may configure the second out-coupling grating to operate in the non-diffraction state. During a second sub-frame, the controller may control the light source assembly to generate and output a second input image light representing the second image portion (e.g., a right half) of the virtual image. The at least one in-coupling element may couple the second input image light having the input FOV into the at least one waveguide. The controller may configure the second out-coupling grating to operate in the diffraction state to couple, via diffraction, the second input image light out of the at least one waveguide as the second output image light having the second output FOV. The controller may configure the first out-coupling grating to operate in the non-diffraction state.

In some embodiments, the at least one in-coupling element may include an in-coupling grating. A projection of a grating vector of a grating (e.g., the in-coupling grating, the first out-coupling grating, the second out-coupling grating, etc.) on a pupil expansion direction (e.g., an x-axis direction) may be referred to as an in-plane projection of the grating vector. The in-plane projection of the grating vector may also be a vector having a direction and a magnitude. The direction of the in-plane projection of the grating vector may be determined by the direction of the grating vector, and the magnitude of the in-plane projection of the grating vector may be determined by the magnitude of the grating vector and a slant angle of the grating.

A first vector sum of the in-plane projections of the grating vectors of the in-coupling grating and the first out-coupling grating may be a non-null vector, and a second vector sum of the in-plane projections of the grating vectors of the in-coupling grating and the second out-coupling grating may be a non-null vector. In other words, the in-plane projections of the grating vectors of the in-coupling grating and the first out-coupling grating may be unequal to one another, and the in-plane projections of the grating vectors of the in-coupling grating and the second out-coupling grating may be unequal to one another. In some embodiments, directions of the first vector sum and the second vector sum may be different from one another, e.g., the directions of the first vector sum and the second vector sum may be anti-parallel. For example, one of the first vector sum and the second vector sum may be a vector having a positive direction (e.g., the positive direction may be the +x-axis direction), and the other may be a vector having a negative direction (e.g., the negative direction may be the −x-axis direction). In some embodiments, magnitudes of the first vector sum and the second vector sum may be different from one another. In some embodiments, magnitudes of the first vector sum and the second vector sum may be substantially the same. In some embodiments, magnitudes of the first vector sum and the second vector sum may be different from one another.

In some embodiments, at least one (e.g., each) of the first out-coupling grating or the second out-coupling grating may be a grating with slanted microstructures having a slant angle (also referred to as a slant grating). The in-plane projections of the grating vectors of the first out-coupling grating and the second out-coupling grating may be different in at least one of the directions or the magnitudes.

In some embodiments, the directions of the in-plane projections of the grating vectors of the first out-coupling grating and the second out-coupling grating may be substantially parallel to one another, and the magnitudes of the in-plane projections of the grating vectors of the first out-coupling grating and the second out-coupling grating may be different from one another. In some embodiments, the grating periods of the first out-coupling grating and the second out-coupling grating may be different from one another, and the slant angles of the first out-coupling grating and the second out-coupling grating may be substantially the same. In some embodiments, the grating periods of the in-coupling grating, the first out-coupling grating, and the second out-coupling grating may be different from one another. For example, one of the grating period of one of the first out-coupling grating and the second out-coupling grating may be larger than the grating period of the in-coupling grating, and the grating period of the other one of the first out-coupling grating and the second out-coupling grating may be smaller than the grating period of the in-coupling grating. In some embodiments, the grating periods of the first out-coupling grating and the second out-coupling grating may be substantially the same, and the slant angles of the first out-coupling grating and the second out-coupling grating may have different absolute values and the same sign. In some embodiments, the slant angles of the in-coupling grating, the first out-coupling grating, and the second out-coupling grating may have different absolute values and the same sign. For example, the slant angle of one of the first out-coupling grating and the second out-coupling grating may be larger than the slant angle of the in-coupling grating, and the slant angle of the other one of the first out-coupling grating and the second out-coupling grating may be smaller than the slant angle of the in-coupling grating.

In some embodiments, the directions of the in-plane projections of the grating vectors of the first out-coupling grating and the second out-coupling grating may be substantially anti-parallel to one another, and the magnitudes of the in-plane projections of the grating vectors of the first out-coupling grating and the second out-coupling grating may be substantially the same. In some embodiments, the grating periods of the first out-coupling grating and the second out-coupling grating may be substantially the same, and the slant angles of the first out-coupling grating and the second out-coupling grating may have substantially the same absolute value and opposite signs. For example, the slant angle of one of the first out-coupling grating and the second out-coupling grating may be a positive slant angle (e.g., +β), and the slant angle of the other one of the first out-coupling grating and the second out-coupling grating may be a negative slant angle (e.g., −β). In some embodiments, the directions of the in-plane projections of the grating vectors of the first out-coupling grating and the second out-coupling grating may be substantially anti-parallel to one another, and the magnitudes of the in-plane projections of the grating vectors of the first out-coupling grating and the second out-coupling grating may be different from each other. For example, the grating periods of the first out-coupling grating and the second out-coupling grating may be substantially the same, and the slant angles of the first out-coupling grating and the second out-coupling grating may have different absolute values and opposite signs.

The first out-coupling grating may couple, via diffraction, the first input image light out of the waveguide as the first output image light propagating toward a first side (e.g., a left side or a clockwise side) of a surface normal of the waveguide. The second out-coupling grating may couple, via diffraction, the second input image light out of the waveguide as the second output image light propagating toward a second side (e.g., a right side or a counter-clockwise side) of the surface normal. That is, the first and second out-coupling gratings may deliver the first and the second output image lights toward different sides of the surface normal. In other words, the first and second out-coupling gratings may rotate the first and the second output FOVs in different directions (e.g., clockwise and counter-clockwise directions) with respect to the input FOV. In some embodiments, an angular size of each of the first and second output FOVs may be substantially equal to an angular size of the input FOV. In some embodiments, the first output FOV and second output FOV may have a substantially narrow or small overlapping area (or overlapping FOV portion), and an angular size of the overlapping FOV portion may be smaller than a predetermined percentage of the first output FOV (or the second output FOV). For example, the predetermined percentage of the first output FOV (or the second output FOV) may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. Thus, during the display frame, an angular size of the combined output FOV may be substantially two times as large as the angular size of the input FOV.

Figure 2:
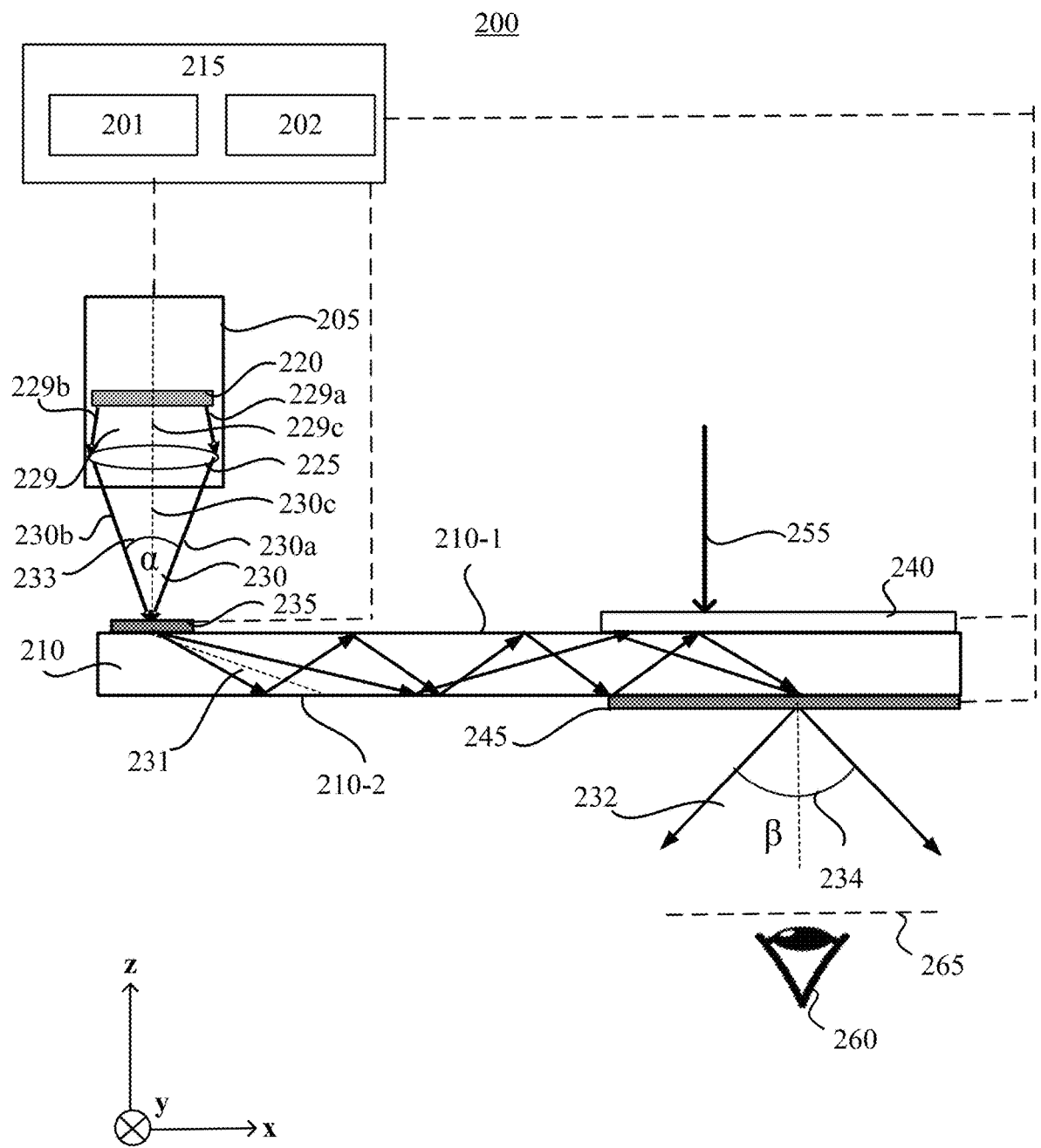
FIG. 2 illustrates a schematic diagram of a waveguide display assembly configured to provide an expanded FOV, according to an embodiment of the present disclosure.

FIG. 2 illustrates a schematic diagram of an optical system or device 200 for providing an increased or expanded output FOV, according to an embodiment of the present disclosure. The optical device 200 may also be referred to as a waveguide display system 200. As shown in FIG. 2, the waveguide display system 200 may include a light source assembly 205, a waveguide 210, and a controller 215. The waveguide 210 may be coupled with an in-coupling element 235 and an out-coupling element 245. The light source assembly 205 may generate and output an input image light 230 having an input FOV 233 toward the waveguide 210. The waveguide display system 200 may direct the input image light 230 to an eyebox 265 of the waveguide display system 200 as an output image light 232. An eye 260 may be located within the eyebox 265 to receive the output image light 232. The output image light 232 may have an increased or expanded overall output FOV 234 as compared to the input FOV 233. As shown in FIG. 2, the input FOV 233 of the input image light 230 may have an angular size represented by the angle α, and the output FOV 234 of the output image light 232 may have an angular size represented by the angle β. The output FOV 234 may be larger than the input FOV 233, i.e., β>α. In some embodiments, the output FOV 234 may be two times, three times, four times, etc., as large as the input FOV 233, i.e., β=2α, or β=3α, or β=4α, etc. A symmetry axis of the input FOV 233 may be parallel with a symmetry axis of the output FOV 234.

The light source assembly 205 may include a light source 220 and a light conditioning system 225. The light source 220 may also be referred to as a display element 220. The display element 220 may include a display panel, such as a liquid crystal display ("LCD") panel, a liquid-crystal-on-silicon ("LCoS") display panel, an organic light-emitting diode ("OLED") display panel, a micro light-emitting diode ("micro-LED") display panel, a laser scanning display panel, a digital light processing ("DLP") display panel, or a combination thereof. In some embodiments, the display element 220 may include a self-emissive panel, such as an OLED display panel or a micro-LED display panel. In some embodiments, the display element 220 may include a display panel that is illuminated by an external source, such as an LCD panel, an LCoS display panel, or a DLP display panel. Examples of an external source may include a laser diode, a vertical cavity surface emitting laser, a light emitting diode, or a combination thereof. During a time period (e.g., a sub-frame), the display element 220 may display an image portion of a virtual image. The image portion may have an image portion size, which may be a fraction of the image size of the virtual image. For example, the display element 220 may output an image light 229 representing the virtual image. In some embodiments, the image portion size of the image portion of the virtual image may be substantially equal to a size of a full light-generating area (or display area) of the display element 220, or may be substantially equal to a full scanning range or area of a laser scanner when the display element 220 includes a laser scanning display panel. In some embodiments, the image size of the virtual image may be an extended size, which may not be negligible, and hence the virtual image may not be considered as a point source image.

The light conditioning system 225 may include one or more optical components configured to condition the light generated by the light source 220. In some embodiments, the light conditioning system 225 may be controlled by the controller 215 to perform various conditioning of the light generated by the light source 220. Conditioning the light may include, e.g., transmitting, attenuating, expanding, collimating, and/or adjusting orientation of the light. In some embodiments, the light conditioning system 225 may include a lens, such as a collimating lens configured to condition the image light 229 from the display element 220 and output the input image light 230 having the input FOV 233 toward the waveguide 210. The lens may transform a linear distribution of pixels in the virtual image having the predetermined image size into an angular distribution of pixels in the image light 230 having the input FOV 233. For example, the lens may transform a ray 229a (in the image light 229) representing a pixel located at a rightmost edge of the virtual image into a rightmost ray 230a of the image light 230, transform a ray 229b (in the image light 229) representing a pixel located at a leftmost edge of the virtual image into a leftmost ray 230b of the image light 230, and transform a ray 229c (in the image light 229) representing a pixel located at a center of the virtual image (or an image portion of the virtual image) into a center ray 230c of the image light 230. The input FOV 233 may correspond to an angular region bounded by the leftmost ray 230b and the rightmost ray 230a of the image light 230. The input FOV 233 may be represented by an angular size (e.g., an angle).

In some embodiments, the in-coupling element 235 may be disposed at a first portion (e.g., an input portion) of the waveguide 210. The in-coupling element 235 may couple the image light 230 into a total internal reflection ("TIR") path inside the waveguide 210 as an in-coupled image light 231. The in-coupled image light 231 may propagate inside the waveguide 210 through TIR, and hence may also be referred to as a TIR propagating light 231. The waveguide 210 may guide, via TIR, the TIR propagating image light 231 from the in-coupling element 235 to an out-coupling element 245 coupled with the waveguide 210. For example, the out-coupling element 245 may be disposed at a second portion (e.g., an output portion) of the waveguide 210. The first portion and the second portion may be located at different locations of the waveguide 210. The out-coupling element 245 may be configured to couple the TIR propagating image light 231 out of the waveguide 210 as an output image light 232 toward the eye 260. In some embodiments, the out-coupling element 245 may consecutively couple the TIR propagating image light 231 out of the waveguide 210 at different positions of the out-coupling element 245 when the TIR propagating image light 231 is incident onto the different positions of the out-coupling element 245. Thus, the out-coupling element 245 may replicate the image light 230 at the output side of the waveguide 210, to expand an effective pupil of the waveguide display system 200. In some embodiments, the waveguide 210 may also receive a light 255 from a real-world environment, and may combine the light 255 with the output image light 232, and deliver the combined light to the eye 260.

In some embodiments, the in-coupling element 235 may be formed or disposed at (e.g., affixed to) a first surface 210-1 or a second surface 210-2 of the waveguide 210 as a separate element coupled to the waveguide 210, or may be integrally formed as a part of the waveguide 210. In some embodiments, the out-coupling element 245 may be integrally formed as a part of the waveguide 210, or may be a separate element coupled to the waveguide 210. In some embodiments, the in-coupling element 235 and/or the out-coupling element 245 may include one or more diffraction gratings, one or more cascaded reflectors, one or more prismatic surface elements, and/or an array of holographic reflectors, or any combination thereof.

The waveguide 210 may include one or more materials configured to facilitate the TIR of the TIR propagating image light 231. The waveguide 210 may include, for example, a plastic, a glass, and/or polymers. The waveguide 210 may have a relatively small form factor. In some embodiments, the waveguide display system 200 may include additional elements configured to redirect, fold, and/or expand the TIR propagating image light 231. For example, as shown in FIG. 2, one or more redirecting/folding elements 240 may be coupled to the waveguide 210 to direct the image light 230 propagating inside the waveguide 210 in a predetermined direction. In some embodiments, the redirecting element 240 and the out-coupling element 245 may be disposed at a same surface or at different surfaces of the waveguide 210. In some embodiments, the redirecting element 240 may be separately formed and disposed at (e.g., affixed to) the first surface 210-1 or the second surface 210-2, or may be integrally formed as a part of the waveguide 210. In some embodiments, the redirecting element 240 may be configured to expand the TIR propagating image light 231 in a first direction (e.g., a y-axis direction in FIG. 2). The redirecting element 240 may redirect the expanded TIR propagating image light 231 to the out-coupling element 245. The out-coupling element 245 may couple the TIR propagating image light 231 out of the waveguide 210, and expand the TIR propagating image light 231 in a second direction (e.g., an x-axis direction in FIG. 2). Thus, a two-dimensional ("2D") expansion of the image light 230 may be provided at the output side of the waveguide 210. In some embodiments, multiple functions, e.g., out-coupling, redirecting, folding, and/or expanding the image light 230 may be combined into a single element, e.g. the out-coupling element 245, and hence, the redirecting element 240 may be omitted.

Although the waveguide 210, the in-coupling element 235, and the out-coupling element 245 are shown as having flat surfaces for illustrative purposes, any of the waveguides, in-coupling elements, out-coupling elements, and redirecting elements disclosed herein may include one or more curved surfaces or may have curved shapes. The controller 215 may be communicatively coupled with the light source assembly 205, and may control the operations of the light source assembly 205 to generate an input image light. The controller 215 may also control the operation state (e.g., a diffraction state or a non-diffraction state) of the in-coupling element 235, the out-coupling element 245, and/or the redirecting element 240. The controller 215 may include a processor or processing unit 201. The controller 215 may include a storage device 202. The storage device 202 may be a non-transitory computer-readable medium, such as a memory, a hard disk, etc., for storing data, information, and/or computer-executable program instructions or codes.

In some embodiments, at least one of the in-coupling element 235, the out-coupling element 245, or the redirecting element 240 may be a diffractive element that includes one or more diffraction gratings, such as a surface relief grating ("SRG") filled with liquid crystals ("LCs"), a holographic polymer-dispersed liquid crystal ("H-PDLC") grating, a volume hologram, a polarization selective grating, a polarization volume hologram ("PVH"), a metasurface grating, or any combination thereof. A diffraction grating included in the in-coupling element 235 may be referred to as an in-coupling grating 235 for discussion purposes. A diffraction grating included in the out-coupling element 245 may be referred to as an out-coupling grating 245 for discussion purposes. A diffraction grating included in the redirecting element 240 may be referred to as a folding or redirecting grating 240 for discussion purposes. A period of the in-coupling grating 235 may be configured, such that the in-coupling grating 235 may couple, via diffraction, the input image light 230 as the TIR propagating image light 231 propagating inside the waveguide 210 through TIR. A period of the out-coupling grating 245 may be configured, such that the out-coupling grating 245 may couple, via diffraction, the TIR propagating image light 231 out of the waveguide 210 as the output image light 232.

In some embodiments, a grating vector $\vec{K_I}$ of the in-coupling grating 235 may be configured to have a magnitude of $2\pi/\Lambda_i$, where $\Lambda_i$ is the period of the in-coupling grating 235. A direction of the grating vector $\vec{K_I}$ may be in a direction of periodicity of the in-coupling grating 235. In some embodiments, a grating vector $\vec{K_O}$ of the out-coupling grating 245 may be configured to have a magnitude of $2\pi/\Lambda_o$, where $\Lambda_o$ is the period of the out-coupling grating 245. A direction of the grating vector $\vec{K_O}$ may be in a direction of periodicity of the out-coupling grating 245. In some embodiments, a grating vector $\vec{K_F}$ of the folding grating 240 may be configured with a magnitude of $2\pi/\Lambda_f$, where $\Lambda_f$ is the period of the folding grating 240. A direction of the grating vector $\vec{K_F}$ may be the same as a direction of periodicity of the folding grating 240. A grating vector (e.g., $\vec{K_I}$, $\vec{K_O}$, or $\vec{K_F}$) may indicate the diffraction effect of the grating on an input light (e.g., an input image light).

In some embodiments, the waveguide display system 200 may include the in-coupling grating(s) 235 and the out-coupling grating(s) 245, and may not include the folding grating(s) 240. An in-coupling grating 235 and an out-coupling grating 245 operating at a diffraction state to direct the image light 230 into and out of the waveguide 210 may be referred to as a set of coupling gratings. In a set of coupling gratings, a vector sum of the in-plane projections of the grating vectors $\vec{K_I}$ and $\vec{K_O}$ may be a non-null vector. In some embodiments, the waveguide display system 200 may include a plurality of sets of coupling gratings, with at least one set including in-plane projections of the in-coupling and out-coupling grating vectors satisfying the above-described relationships. In some embodiments, a set of coupling gratings may include one in-coupling grating 235, one out-coupling grating 245, and one folding grating 240. In some embodiments, a vector sum of the in-plane projections of the grating vectors $\vec{K_I}$, $\vec{K_O}$, and $\vec{K_F}$ may be a non-null vector. In some embodiments, the waveguide display system 200 may include a plurality of sets of coupling gratings. In at least one set (e.g., in each set), the in-plane projections of the grating vectors $\vec{K_I}$, $\vec{K_O}$, and $\vec{K_F}$ may have the above-described relationships. As the vector sum of the in-plane projections of the grating vectors in at least one set (e.g., each set) is a non-null vector, dispersions of the gratings may not be mutually compensated for. Thus, in some embodiments, to reduce or eliminate dispersion artifacts, a narrow-band light source, such as a laser, may be used as a light source in the light source assembly 205.

In some embodiments, the in-coupling grating 235 may be a switchable grating or a non-switchable grating, the out-coupling grating 245 may be a switchable grating, and the folding grating 240 may be a switchable grating. A switchable grating may be directly or indirectly controlled or switched, e.g., by the controller 215, between operating in a diffraction state to diffract an incident light, and operating in a non-diffraction state to transmit the incident light with substantially zero or negligible diffraction. In some embodiments, the switchable gratings coupled with the waveguide 210 may be individually or independently controlled or configured by the controller 215 to operate in the diffraction state or in the non-diffraction state. A non-switchable grating may not be directly or indirectly controlled or switched, e.g., by the controller 215, between operating in a diffraction state to diffract an incident light, and operating in a non-diffraction state to transmit the incident light with substantially zero or negligible diffraction. Instead, a non-switchable grating may be fixedly configured to operate in a diffraction state for an image light within a predetermined wavelength range and a predetermined incidence angle range.

In some embodiments, the switchable grating may be a directly switchable grating that is directly switchable via an external field, e.g., an external electric field applied to electrodes included in or coupled with the directly switchable grating. The directly switchable grating may be an active grating, such as an active grating fabricated based on active liquid crystals ("LCs"). An active grating includes molecules, of which physical and/or optical properties, such as orientations, can be changed by the external field (e.g., external electric field). The active grating may be polarization sensitive (or polarization selective) or may be polarization insensitive (or polarization non-selective). Examples of the active and polarization sensitive (or selective) gratings may include, but not be limited to, holographic polymer-dispersed liquid crystal ("H-PDLC") gratings, surface relief gratings provided (e.g., filled) with active LCs, Pancharatnam-Berry phase ("PBP") gratings, polarization volume holograms ("PVHs") based on active LCs, etc. An example of active and polarization insensitive (or polarization non-selective) gratings may include two stacked active and polarization selective LC gratings with orthogonal alignment directions. In some embodiments, when the directly switchable grating operates in the diffraction state, the diffraction efficiency of the directly switchable grating may be tunable via, e.g., changing an external electric field.

In some embodiments, the switchable grating may be an indirectly switchable grating that is indirectly switchable via a polarization switch (which may be controlled by the controller 215) coupled to the indirectly switchable grating. The indirectly switchable grating may be an active and polarization sensitive (or polarization selective) grating, or a passive and polarization sensitive (or polarization selective) grating. Examples of the passive and polarization selective gratings may include, e.g., PVH gratings based on passive LCs, surface relief gratings provided (e.g., filled) with passive LCs. A passive grating may include molecules, of which physical and/or optical properties, such as orientations, remain substantially unchanged when subjecting to an external field (e.g., external electric field) in normal operations.

Due to the polarization sensitivity (or polarization selectivity) of the indirectly switchable grating, the indirectly switchable grating may diffract an image light having a first polarization, or transmit, with substantially zero or negligible diffraction, an image light having a second polarization different from (e.g., orthogonal to) the first polarization. Thus, when the polarization switch is configured to control (e.g., switch or maintain) the polarization of the image light before the image light is incident onto the indirectly switchable grating, the indirectly switchable grating may operate in the diffraction state for the image light having the first polarization or in the non-diffraction state for the image light having the second polarization.

The polarization switch may be controlled by the controller 215 to operate in a switching state or a non-switching state to switch or maintain the polarization of an incident image light. When an indirectly switchable grating is described as being controlled or configured by the controller 215 to operate in the diffraction state or non-diffraction state, it means that the associated polarization switch is controlled or configured by the controller 215 to change (e.g., switch) or maintain the polarization of the image light before the image light is incident onto the indirectly switchable grating.

In some embodiments, to control the polarization switch, the controller 215 may control a power source electrically coupled with the polarization switch. The controller 215 may control the voltage output from the power source to the polarization switch, thereby controlling the polarization switch to operate in the switching state (when a first voltage is supplied to the polarization switch) or the non-switching state (when a second voltage is supplied to the polarization switch). In the switching state, the polarization switch may change or switch the polarization of the image light, e.g., from the first polarization to the second polarization or vice versa, before the image light is incident onto the indirectly switchable grating. In the non-switching state, the polarization switch may maintain the polarization of the image light before the image light is incident onto the indirectly switchable grating. By controlling the polarization of the incident image light through the polarization switch, the indirectly switchable grating may be configured to operate in a diffraction state for an incident light having the first polarization or to operate in a non-diffraction state for an incident light having the second polarization.

In some embodiments, the waveguided display system 200 may include a plurality of waveguides 210 disposed in a stacked configuration (not shown in FIG. 2). At least one (e.g., each) of the plurality of waveguides 210 may be coupled with or include one or more diffractive elements (e.g., in-coupling element, out-coupling element, and/or redirecting or folding element), which may be configured to direct the input image light 230 as the output image light 232 with an increased overall output FOV 234 as compared to the input FOV 233. In some embodiments, the plurality of waveguides 210 in the stacked configuration may be configured to output a polychromatic image light (e.g., a full-color image light including components of multiple colors).

In some embodiments, the waveguided display system 200 may include one or more light source assemblies 205 coupled to the one or more waveguides 210. In some embodiments, at least one (e.g., each) of the light source assemblies 205 may be configured to emit a monochromatic image light of a specific wavelength band corresponding to a primary color (e.g., red, green, or blue) and an input FOV. In some embodiments, the waveguided display system 200 may include three waveguides 210 to deliver a component color image (e.g., a primary color image), e.g., red, green, and blue lights, respectively, in any suitable order, or simultaneously. At least one (e.g., each) of the three waveguides 210 may be coupled with or include one or more diffractive elements (e.g., in-coupling element, out-coupling element, and/or redirecting element). In some embodiments, the waveguide display system 200 may include two waveguides configured to deliver component color images (e.g., primary color images) by in-coupling and subsequently out-coupling, e.g., a combination of red and green lights, and a combination of green and blue lights, respectively, in any suitable order or simultaneously.

Figure 3A:
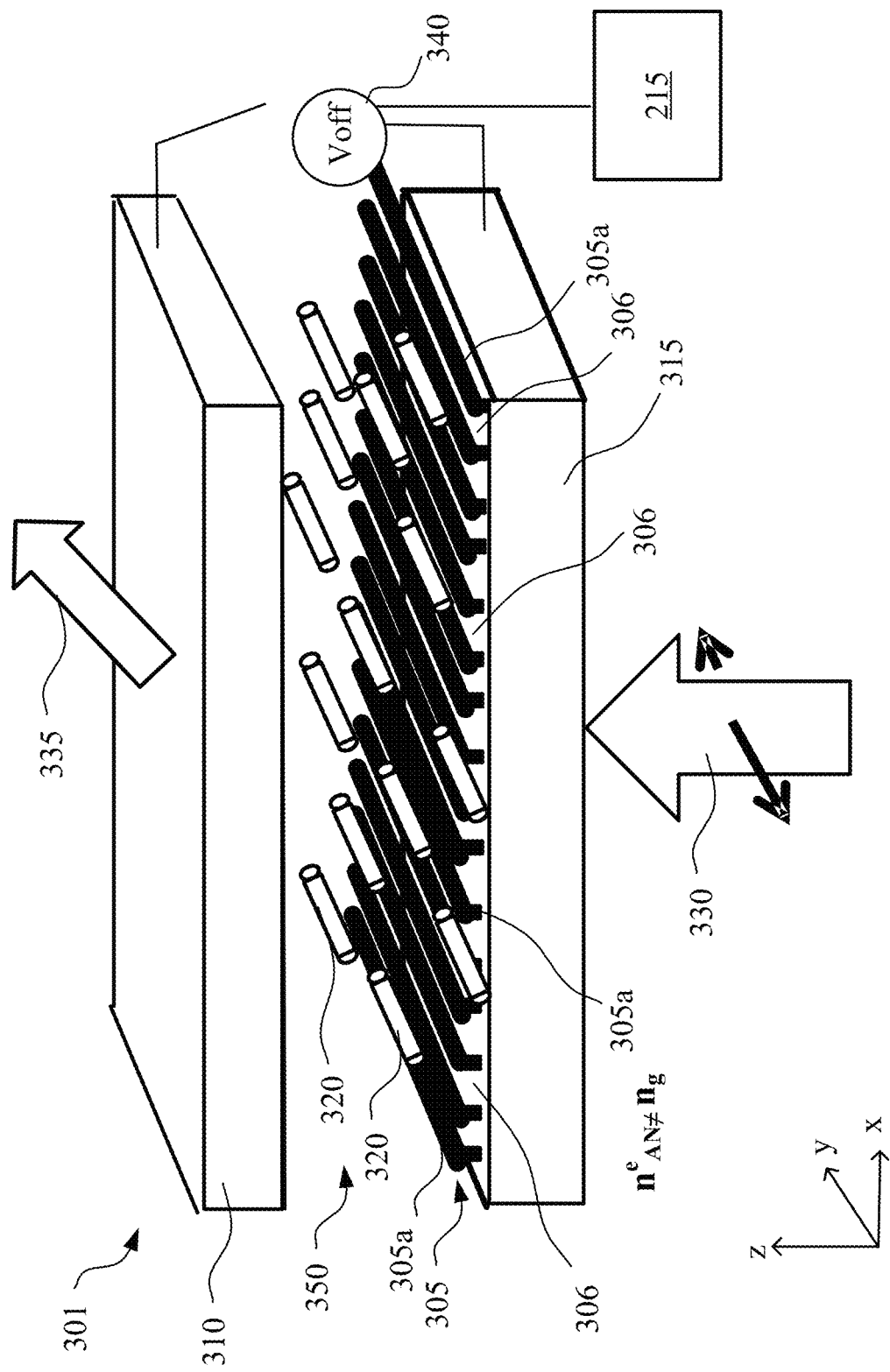
FIGS. 3A and 3B illustrate schematic diagrams of a grating in a diffraction state and a non-diffraction state, respectively, according to an embodiment of the present disclosure.

FIGS. 3A-6D illustrate exemplary switchable diffractive optical elements (e.g., gratings), which may be implemented in optical elements, devices, and systems disclosed herein, for example, as gratings described above and shown in other figures for providing an increased or expanded overall output FOV, such as those shown in, or described in connection with, FIG. 2 and other figures. The switchable diffractive optical element (e.g., grating) may be implemented as an in-coupling element, an out-coupling element, or a folding element. FIGS. 3A and 3B illustrate a schematic diagram of a diffractive optical element (or diffractive element) 301 at a diffraction state and a non-diffraction state, respectively, according to an embodiment of the disclosure. The diffractive optical element 301 may be a directly switchable grating controllable by the controller 215.

A power source 340 may be electrically coupled with the diffractive optical element 301. The power source 340 may provide an electric field to the diffractive optical element 301. The controller 215 may be electrically coupled (e.g., through wired or wireless connection) with the power source 340, and may control the output of a voltage and/or current of the power source 340. As described above, a directly switchable grating may be an active, polarization selective/sensitive grating, or an active, polarization nonselective/insensitive grating. For illustrative purposes, the diffractive optical element 301 is shown as an active, polarization selective grating. The diffractive optical element 301 may be directly switchable between a diffraction state and a non-diffraction state, when the controller 215 controls the power source 340 to generate a suitable electric field in the diffractive optical element 301.

Figure 3B:
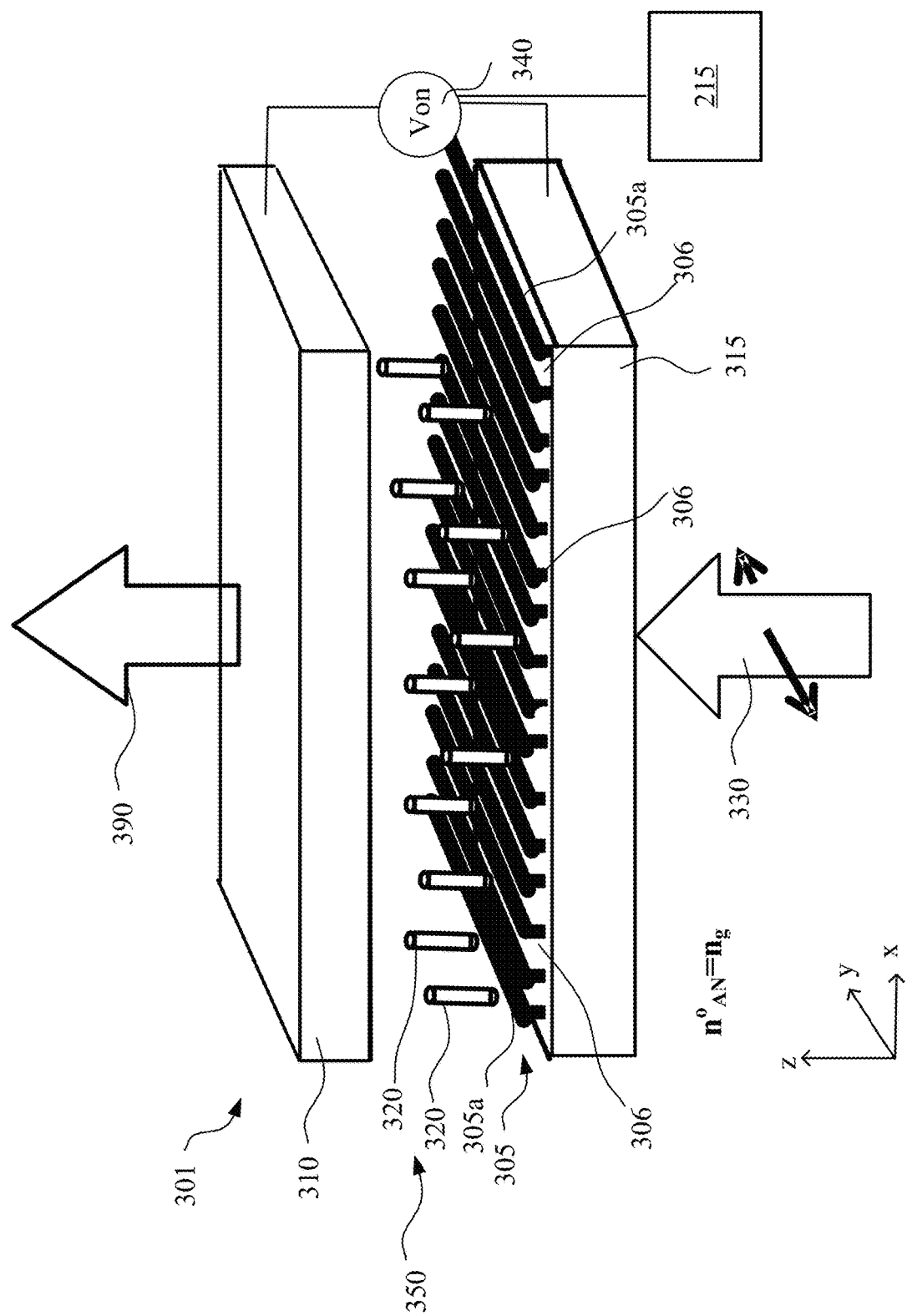

As shown in FIGS. 3A and 3B, the diffractive optical element 301 may include an upper substrate 310 and a lower substrate 315 arranged opposing (e.g., facing) one another. In some embodiments, at least one (e.g., each) of the upper substrate 310 or the lower substrate 315 may be provided with a transparent electrode at a surface (e.g., an inner surface) of the substrate for supplying an electric field to the diffractive optical element 301, such as an indium tin oxide ("ITO") electrode. The power source 340 may be coupled with the transparent electrodes to supply a voltage for providing the electric field to the diffractive optical element 301.

In some embodiments, the diffractive optical element 301 may include a surface relief grating ("SRG") 305 disposed at (e.g., bonded to or formed on) a surface of the lower substrate 315 facing the upper substrate 310. The SRG 305 may include a plurality of microstructures 305a, with sizes in micron levels or nano levels, which define or form a plurality of grooves 306. The microstructures 305a are schematically illustrated as solid black longitudinal structures, and the grooves 306 are shown as white portions between the solid black portions. The number of the grooves 306 may be determined by the grating period and the size of the SRG 305. The grooves 306 may be at least partially provided (e.g., filled) with an optically anisotropic material 350. Molecules 320 of the optically anisotropic material 350 may have an elongated shape (represented by white rods in FIGS. 3A and 3B). The molecules 320 may be aligned within the grooves 306, e.g., homeotropically aligned, homogeneously aligned, or both. The optically anisotropic material 350 may have a first principal refractive index (e.g., $n^e_{AN}$) along a groove direction (e.g., y-axis direction, length direction, or longitudinal direction) of the grooves 306. The optically anisotropic material 350 may have a second principal refractive index (e.g., $n^o_{AN}$) along an in-plane direction (e.g., x-axis direction, width direction, or lateral direction) perpendicular to the groove direction of the SRG 305.

When the grooves 306 have a substantially rectangular prism shape, or a longitudinal shape, the groove direction may be a groove length direction. In some embodiments, the groove 306 may have other shapes. Accordingly, the groove direction may be other suitable directions. The optically anisotropic material 350 may be an active, optically anisotropic material, such as active liquid crystals ("LCs") with LC directors reorientable by an external field, e.g., the electric field provided by the power source 340. The molecules 320 of the optically anisotropic material 350 may also be referred to as LC molecules 320. The active LCs may have a positive or negative dielectric anisotropy.

The SRG 305 may be fabricated based on an organic material, such as amorphous or liquid crystalline polymers, or cross-linkable monomers including those having LC properties (reactive mesogens ("RMs")). In some embodiments, the SRG 305 may be fabricated based on an inorganic material, such as metals or oxides used for manufacturing of metasurfaces. The materials of the SRG 305 may be isotropic or anisotropic. In some embodiments, the SRG 305 may provide an alignment for the optically anisotropic material 350. That is, the SRG 305 may function as an alignment layer to align the optically anisotropic material 350. In some embodiments, the molecules 320 may be aligned within the grooves 306 by a suitable aligning method, such as a mechanical force (e.g., a stretch), a light (e.g., through photoalignment), an electric field, a magnetic field, or a combination thereof.

For illustrative purposes, FIGS. 3A and 3B show that the SRG 305 may be a binary non-slanted grating with a periodic rectangular profile. That is, the cross-sectional profile of the grooves 306 of the SRG 305 may have a periodic rectangular shape. In some embodiments, the SRG 305 may be a binary slanted grating in which the microstructures 305a are slanted at a slant angle. In some embodiments, the slant angle of the SRG 305 may continuously vary. In some embodiments, the cross-sectional profile of the grooves 306 of the SRG 305 may be non-rectangular, for example, sinusoidal, triangular, parallelogram (e.g., when the microstructures 305a are slanted), or saw-tooth shaped.

In some embodiments, the alignment of the optically anisotropic material 350 may be provided by one or more alignment structures (e.g., alignment layers) other than by the SRG 305. An alignment structure may be disposed at the substrate 310 and/or 315 (e.g., two alignment layers may be disposed at the respective opposing surfaces of the substrates 310 and 315). In some embodiments, the alignment structures provided at both of the substrates 310 and 315 may provide parallel planar alignments or hybrid alignments. For example, the alignment structure disposed at one of the substrates 310 and 315 may be configured to provide a planar alignment, and the alignment structure disposed at the other one of the substrates 310 and 315 may be configured to provide a homeotropic alignment. In some embodiments, the alignment of the optically anisotropic material 350 may be provided by both the SRG 305 and one or more alignment structures (e.g., alignment layers) disposed at the substrate 310 and/or 315.

In some embodiments, as shown in FIG. 3A, the optically anisotropic material 350 may include active LCs having a positive anisotropy, such as nematic liquid crystals ("NLCs"). The LC molecules 320 of the optically anisotropic material 350 may be homogeneously aligned within the grooves 306 in the groove direction (e.g., y-axis direction). The second principal refractive index (e.g., $n^o_{AN}$) may substantially match with a refractive index $n_g$ of the SRG 305, and the first principal refractive index (e.g., $n^e_{AN}$) may not match with the refractive index $n_g$ of the SRG 305. The diffractive optical element 301 may be linear polarization dependent.

For example, referring to FIG. 3A, when a linearly polarized incoming light 330 polarized in the groove direction (e.g., y-axis direction) is incident onto the diffractive optical element 301, due to the refractive index difference between $n^e_{AN}$ and $n_g$, the incoming light 330 may experience a periodic modulation of the refractive index in the diffractive optical element 301. As a result, the diffractive optical element 301 may diffract the incoming light 330 as a light 335. Due to the substantial match between the refractive indices $n^o_{AN}$ and $n_g$, the diffractive optical element 301 may function as a substantially optically uniform plate for a linearly polarized incoming light polarized in the in-plane direction (e.g., x-axis direction) perpendicular to the groove direction (e.g., y-axis direction). That is, the diffractive optical element 301 may not diffract the incoming light linearly polarized in the in-plane direction perpendicular to the groove direction. Rather, the diffractive optical element 301 may transmit the incoming light polarized in the in-plane direction with substantially zero or negligible diffraction.

In some embodiments, the diffractive optical element 301 may be an active grating, which may be directly switchable between a diffraction state (or an activated state) and a non-diffraction state (or a deactivated state) by an external field, e.g., an external electric field provided by the power source 340. For example, the diffractive optical element 301 may include electrodes (not shown) disposed at the upper and lower substrate 310 and 315, and the power source 340 may be electrically coupled with the electrodes to provide the electric field to the diffractive optical element 301. The controller 215 may control an output (e.g., a voltage and/or current) of the power source 340. For discussion purposes, the voltage is used as an example output of the power source 340. By controlling the voltage output by the power source 340, the controller 215 may control the switching of the diffractive optical element 301 between the diffraction state and the non-diffraction state. For example, the controller 215 may control the voltage supplied by the power source 340 to switch the diffractive optical element 301 between the diffraction state and the non-diffraction state. When the diffractive optical element 301 operates in the diffraction state, the controller 215 may adjust the voltage supplied by the power source 340 to the electrodes to adjust the diffraction efficiency.

In some embodiments, the controller 215 may control the voltage supplied by the power source 340 to be lower than or equal to a threshold voltage, thereby configuring the diffractive optical element 301 to operate in the diffraction state (or activated state). In some embodiments, the threshold voltage may be determined by physical parameters of the diffractive optical element 301. When the voltage is lower than or equal to the threshold voltage, the electric field generated by the supplied voltage may be insufficient to reorient the LC molecules 320. When the controller 215 controls the supplied voltage to be higher than the threshold voltage (and sufficiently high) to reorient the LC molecules 320 to substantially follow (e.g., be parallel with) the direction of the electric field, the diffractive optical element 301 may operate in the non-diffraction state (or deactivated state).

As shown in FIG. 3A, when the controller 215 controls the power source 340 to supply a voltage that is lower than or equal to the threshold voltage (e.g., when the power source 340 supplies a substantially zero voltage), for the linearly polarized incoming light 330 polarized in the groove direction (e.g., y-axis direction) of the SRG 305, due to the difference between the refractive indices $n^e_{AN}$ and $n_g$, the light 330 may experience a periodic modulation of the refractive index in the diffractive optical element 301 while propagating therethrough. As a result, the diffractive optical element 301 may diffract the light 330 as the light 335. That is, the controller 215 may control the power source 340 to supply a voltage that is lower than or equal to the threshold voltage, thereby configuring the diffractive optical element 301 to operate in the diffraction state to diffract the linearly polarized incoming light 330. In some embodiments, the modulation of a refractive index nm (i.e., the difference between $n^e_{AN}$ and $n_g$) provided by the diffractive optical element 301 operating in the diffraction state to the incoming light 330 polarized in the groove direction may be larger than the modulation provided by the diffractive optical element 301 operating in the non-diffraction state to the light 330. When the diffractive optical element 301 operates in the diffraction state, the diffraction efficiency may be tunable (or adjustable). The controller 215 may tune (or adjust) a magnitude of the supplied voltage to tune the diffraction efficiency of the diffractive optical element 301.

As shown in FIG. 3B, when a voltage is supplied to the diffractive optical element 301, an electric field (e.g., along a z-axis direction) may be generated between the parallel substrates 310 and 315. When the voltage is higher than the threshold voltage and is gradually increased, the LC molecules 320 (of LCs having the positive dielectric anisotropy) may trend to be reoriented by the electric field (e.g., may gradually become oriented parallel with the electric field direction). As the voltage changes, for the linearly polarized incoming light 330 polarized in the groove direction (e.g., y-axis direction), the modulation of the refractive index nm (i.e., the difference between $n^e_{AN}$ and $n_g$) provided by the diffractive optical element 301 to the light 330 may change accordingly, which in turn may change the diffraction efficiency.

When the voltage is sufficiently high, as shown in FIG. 3B, directors of the LC molecules 320 (of LCs having the positive dielectric anisotropy) may be reoriented to be parallel with the electric field direction (e.g., z-axis direction). Due to the substantial match between the refractive indices $n^o_{AN}$ and $n_g$, the diffractive optical element 301 may function as a substantially optically uniform plate for the incoming light 330 polarized in the groove direction. The diffractive optical element 301 may operate in a non-diffraction state to transmit the light 330 therethrough as a light 390 with substantially zero or negligible diffraction.

In the embodiment shown in FIGS. 3A and 3B, the diffractive optical element 301 is configured to operate in the diffraction state when the voltage supplied by the power source 340 is lower than or equal to the threshold voltage, and operate in the non-diffraction state when the voltage is sufficiently higher than the threshold voltage. In other embodiments, by configuring the initial orientations of the LC molecules 320 differently, the diffractive optical element 301 may be configured to operate in the diffraction state when the voltage is sufficiently higher than the threshold voltage, and operate in the non-diffraction state when the voltage is lower than or equal to the threshold voltage.

Figure 4A:
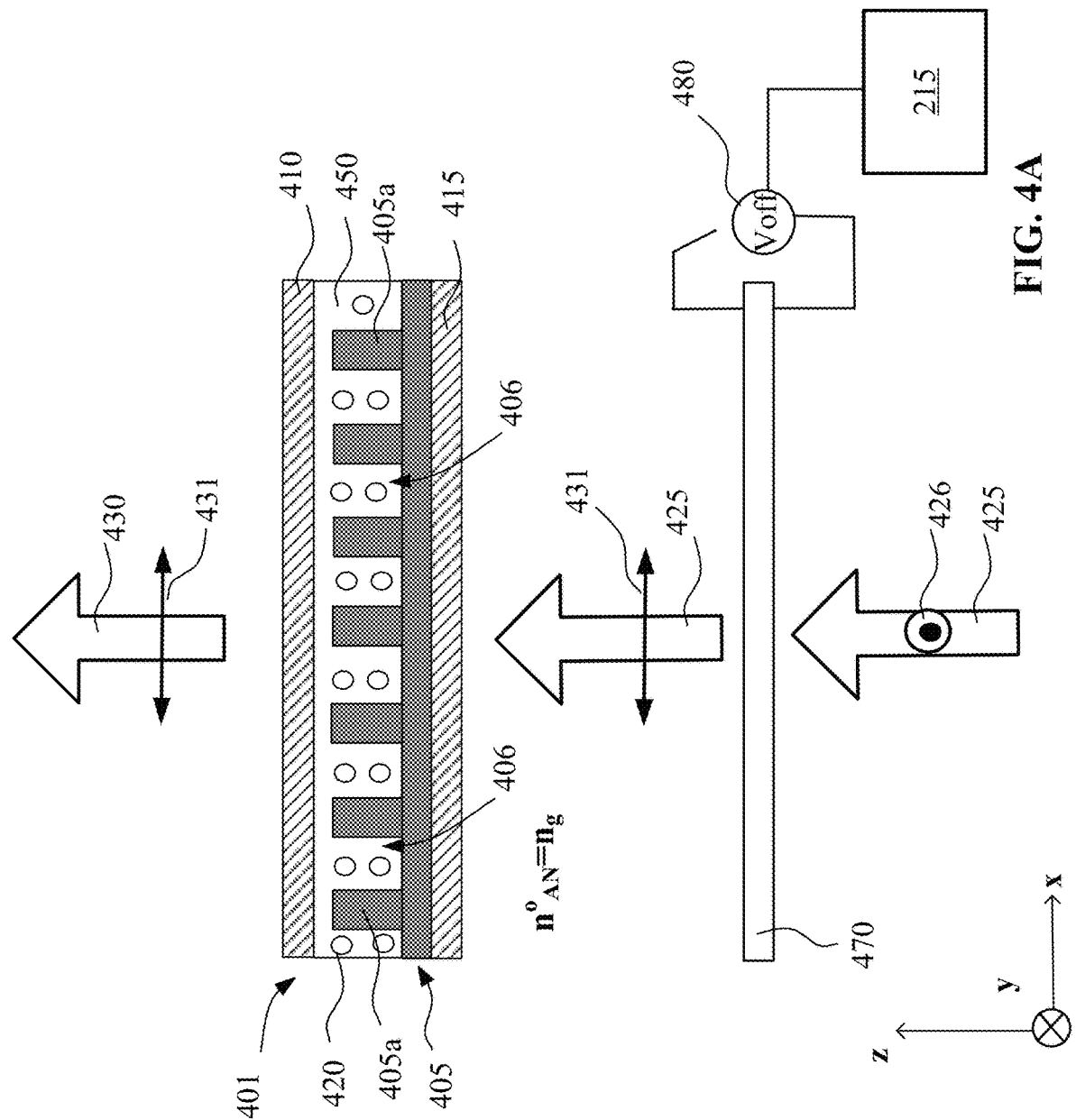
FIGS. 4A and 4B illustrate schematic diagrams of a grating in a non-diffraction state and a diffraction state, respectively, according to another embodiment of the present disclosure.
Figure 4B:
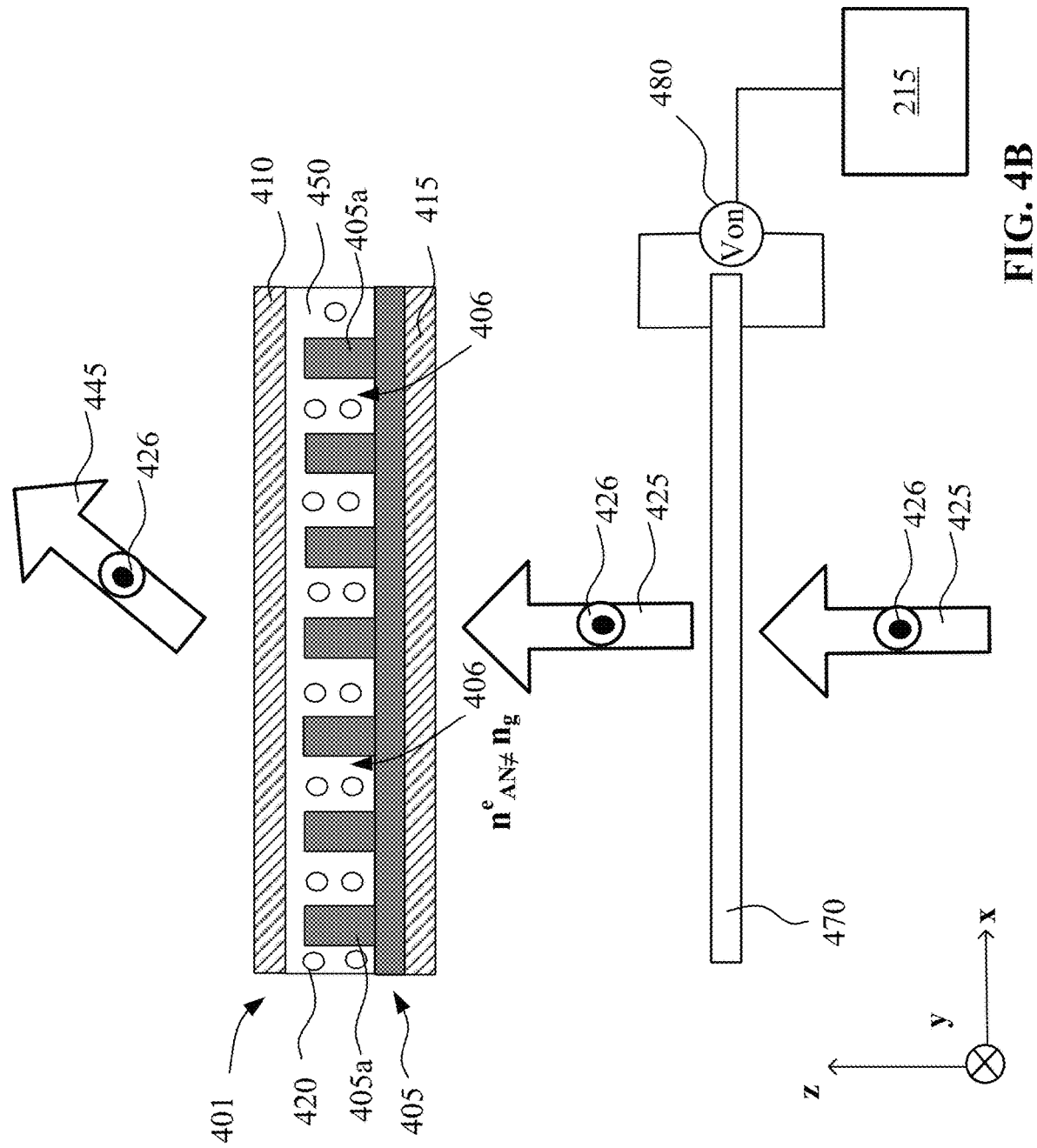

FIGS. 4A and 4B illustrate schematic diagrams of a diffractive optical element 401 at a non-diffraction state and a diffraction state, respectively, according to an embodiment of the present disclosure. The diffractive optical element 401 may be an indirectly switchable grating. A polarization switch 470 may be disposed at a light incidence side of the diffractive optical element 401. A power source 480 may be electrically coupled with the polarization switch 470 to provide an electric field in the polarization switch 470. The controller 215 may control the output of the power source 480 to control the electric field in the polarization switch 470, thereby controlling the diffraction state or non-diffraction state of the diffractive optical element 401.

The diffractive optical element 401 may be implemented as a grating in various optical elements, devices, and systems disclosed herein for providing an increased or expanded overall output FOV. The indirectly switchable diffractive optical element 401 may be an active grating that is polarization sensitive (or selective), or may be a passive grating that is polarization sensitive (or selective). The diffractive optical element 401 may be linear or circular polarization dependent (or polarization selective or sensitive). For illustrative purpose, the diffractive optical element 401 is shown as linear polarization dependent.

For example, the diffractive optical element 401 may be configured to diffract a linearly polarized light having a first polarization and transmit a linearly polarized light having a second polarization that is orthogonal to the first polarization. Because the diffractive optical element 401 is not directly switchable, the controller 215 may indirectly switch the diffractive optical element 401 to operate in the diffraction state for an image light having the first polarization or to operate in the non-diffraction state for an image light having the second polarization, by controlling the polarization of the image light incident onto the diffractive optical element 401. To control the polarization of the image light incident onto the diffractive optical element 401, the controller 215 may control the polarization switch 470 disposed at a light incidence side of the diffractive optical element 401. The polarization switch 470 may control the polarization of the image light before the image light is incident onto the diffractive optical element 401.

The diffractive optical element 401 may include elements that are similar to or the same as those included in diffractive optical element 301 shown in FIGS. 3A and 3B. For example, the diffractive optical element 401 may include an upper substrate 410 and a lower substrate 415 arranged facing one another, which may be similar to the substrates 310 and 315. The diffractive optical element 401 may include an SRG 405 disposed at (e.g., bonded to or formed on) a surface of the lower substrate 415 facing the upper substrate 410. The SRG 405 may be an embodiment of the SRG 305 shown in FIGS. 3A and 3B. FIGS. 4A and 4B show a cross-sectional view of the SRG 405 (which may be a cross-sectional view of the SRG 305). The SRG 405 may include a plurality of microstructures 405a defining or forming a plurality of grooves 406, which may be similar to the microstructures 305a and the grooves 306 included in the SRG 305. At least one (e.g., each) of the grooves 406 may be at least partially provided (e.g., filled) with an optically anisotropic material 450, which may be similar to the optically anisotropic material 350. Molecules 420 of the optically anisotropic material 450, which may be similar to the molecules 320, may be aligned within the grooves 406. Similar to the SRG 305, the SRG 405 may function as an alignment structure for aligning the molecules 420.

When the optically anisotropic material 450 includes active or reorientable LCs, the diffractive optical element 401 may be active, similar to the diffractive optical element 301. As mentioned above, an active and polarization sensitive (or selective) grating may be directly switchable or indirectly switchable. When the optically anisotropic material 450 includes passive or non-reorientable LCs, the diffractive optical element 401 may be passive. Passive or non-reorientable LCs may not be directly switchable by an external field (e.g., an electric field). A passive and polarization sensitive grating with passive LCs may be indirectly switchable through the polarization switch 470. Passive LCs may include, e.g., an optically anisotropic polymer that is polymerized from polymerizable pre-polymeric compositions or polymerizable LC precursors. In some embodiments, the polymerizable LC precursors may include RMs that are polymerizable molecules with optical properties similar to those of LC molecules.

The optically anisotropic material 450 may have a first principal refractive index (e.g., $n^e_{AN}$) along a groove direction (e.g., y-axis direction) of the plurality of grooves 406 and a second principal refractive index (e.g., $n^o_{AN}$) along an in-plane direction (e.g., x-axis direction) perpendicular to the groove direction. For discussion purposes, the molecules 420 are shown as homogeneously aligned within the grooves 406 in the groove direction (e.g., y-axis direction). The second principal refractive index (e.g., $n^o_{AN}$) may substantially match with a refractive index $n_g$ of the SRG 405, and the first principal refractive index (e.g., $n^e_{AN}$) may not match with the refractive index $n_g$ of the SRG 405.

In some embodiments, the controller 215 may control the polarization switch 470 to change or maintain a polarization an image light before the image light is incident onto the diffractive optical element 401. When the polarization of the image light incident onto the diffractive optical element 401 is switched or maintained, the diffractive optical element 401 may operate in a diffraction state when the incident light has the first polarization, or operate in a non-diffraction state when the incident light has the second polarization.

The controller 215 may control an electric field applied to the polarization switch 470. For example, the controller 215 may control the power source 480 electrically coupled with the polarization switch 470 to supply different voltages to the polarization switch 470. When different voltages are supplied to the polarization switch 470, the polarization switch 470 may be configured to operate in a switching state or a non-switching state. For example, when the voltage is lower than or equal to a predetermined voltage value (e.g., when zero voltage is supplied), the polarization switch 470 may operate in the switching state, as shown in FIG. 4A. When the voltage is higher than the predetermined voltage value (e.g., when a non-zero voltage, such as 5V, 10V, is supplied), the polarization switch 470 may operate in the non-switching state. In the switching state, the polarization switch 470 may switch the polarization of an image light 425 from a first polarization 426 (e.g., polarization in the y-axis direction) to a second polarization 431 (e.g., polarization in the x-axis direction), as shown in FIG. 4A. In the non-switching state, the polarization switch 470 may maintain the first polarization 426 of the light 425, as shown in FIG. 4B.

The polarization switch 470 may be any suitable polarization switch. In some embodiments, the polarization switch 470 may include an LC-based polarization switch, such as a 90° twist-nematic liquid crystal ("TNLC") cell. The TNLC cell may have a light incidence surface and a light exiting surface providing substantially orthogonal alignment directions of LC directors. The alignment direction provided by the light incidence surface of the TNLC cell may be oriented substantially parallel with the polarization direction (e.g., first polarization 426) of the linearly polarized light 425 incident onto the TNLC cell, thereby rotating the polarization of the light 425 by about 90° when the TNLC cell operates in the switching state, or maintaining the polarization of the light 425 incident onto the TNLC cell when the TNLC cell operates in the non-switching state. In some embodiments, the TNLC cell may operate in the switching state when the voltage supplied by the power source 480 is lower than or equal to a predetermined threshold voltage value, as shown in FIG. 4A, or operate in the non-switching state when the voltage is higher than the predetermined threshold voltage value (and sufficiently high) to reorient the LC directors along the electric field direction, as shown in FIG. 4B.

In some embodiments, the polarization switch 470 may include a switchable half-wave plate ("SHWP"). The SHWP operating in the switching state may switch a polarization of a linearly polarized incoming light 425 to an orthogonal polarization. The SHWP operating in the non-switching state may maintain the polarization of the linearly polarized incoming light 425. In some embodiments, the SHWP may include an LC layer, and an external electric field (e.g., a voltage) may be applied to the LC layer to change the orientation of the LCs, thereby controlling the polarization switch 470 to operate in a switching state or in a non-switching state. For example, the SHWP may operate in the switching state when the applied voltage is lower than or equal to a predetermined voltage value, as shown in FIG. 4A, or operate in the non-switching state when the voltage is higher than the predetermined voltage value (and sufficiently high) to reorient the LC directors along the electric field direction, as shown in FIG. 4B.

For discussion purposes, the polarization switch 470 is presumed to include a TNLC cell. The alignment direction provided by the light incidence surface of the TNLC cell may be parallel with a polarization direction (e.g., y-axis direction) of the light 425. The power source 480 may be electrically coupled with electrodes included in the TNLC cell to provide an electric field. The controller 215 may be electrically coupled with the power source 480, and may control the output (e.g., a voltage and/or current) of the power source 480. Voltage is used as an example of the control parameter of the power source 480 in the following descriptions.

For example, as shown in FIG. 4A, when the applied voltage is lower than the threshold voltage (e.g., when voltage is zero), the TNLC cell may operate in the switching state. The polarization direction of the image light 425 having the first polarization 426 may be rotated by the twisted structure of the TNLC cell by about 90° when exiting the polarization switch 470. Thus, the TNLC cell included in the polarization switch 470 may switch the polarization of the incoming light 425 from the first polarization 426 (e.g., polarization in a y-axis direction in FIG. 4A) to the second polarization 431 (e.g., polarization in an x-axis direction in FIG. 4A) perpendicular to the first polarization 426. Due to the substantial match between the refractive indices $n^o_{AN}$ of the optically anisotropic material 450 and $n_g$ of the SRG 405, the diffractive optical element 401 may function as a substantially optically uniform plate for the light 430. That is, the diffractive optical element 401 may operate in a non-diffraction state to transmit the image light 425 having the second polarization 431 therethrough with substantially zero or negligible diffraction as an image light 430 having the second polarization 431. That is, the diffraction effect of the diffractive optical element 401 may be substantially zero for the image light 425.

The twisted structure of the TNLC cell included in the polarization switch 470 may become untwisted due to an external force, such as the electric field provided by the power source 480. As a result, the polarization of the image light 425 propagating through the polarization switch 470 may be unaffected or maintained. As shown in FIG. 4B, when the applied voltage is higher than the predetermined threshold voltage value (and sufficiently high), the TNLC cell may operate in the non-switching state. LC molecules in the TNLC cell may be reoriented by the electric field and trend to be (e.g., gradually become) parallel with the electric field direction when the electric field is increased to become sufficiently strong. Thus, the twisted structure of the TNLC cell may become untwisted, and the TNLC cell may transmit the image light 425 having the first polarization 426 without affecting the polarization. Due to the difference between the refractive indices $n^e{}_{AN}$ and $n_g$, the image light 425 propagating through the diffractive optical element 401 may experience a periodic modulation of the refractive index in the diffractive optical element 401. As a result, the diffractive optical element 401 may diffract the image light 425 having the first polarization 426 as an image light 445 having the first polarization 426.

The switching time of the TNLC cell may be at an order of milliseconds ("ms"), e.g., 3-5 ms. In some embodiments, to further increase the switching speed of the diffractive optical element 401, a polarization switch based on ferroelectric liquid crystal ("FLCs") may be adopted, such as an SHWP based on FLCs. The switching time may be reduced to an order of microseconds ("µs"), e.g., less than 100 µs. Further, when the diffractive optical element 401 is indirectly switched between the diffraction state and the non-diffraction state through the external polarization switch 470, electrodes may be omitted, such that undesirable light absorption and modification of refractive index may be significantly suppressed.

Figure 5A:
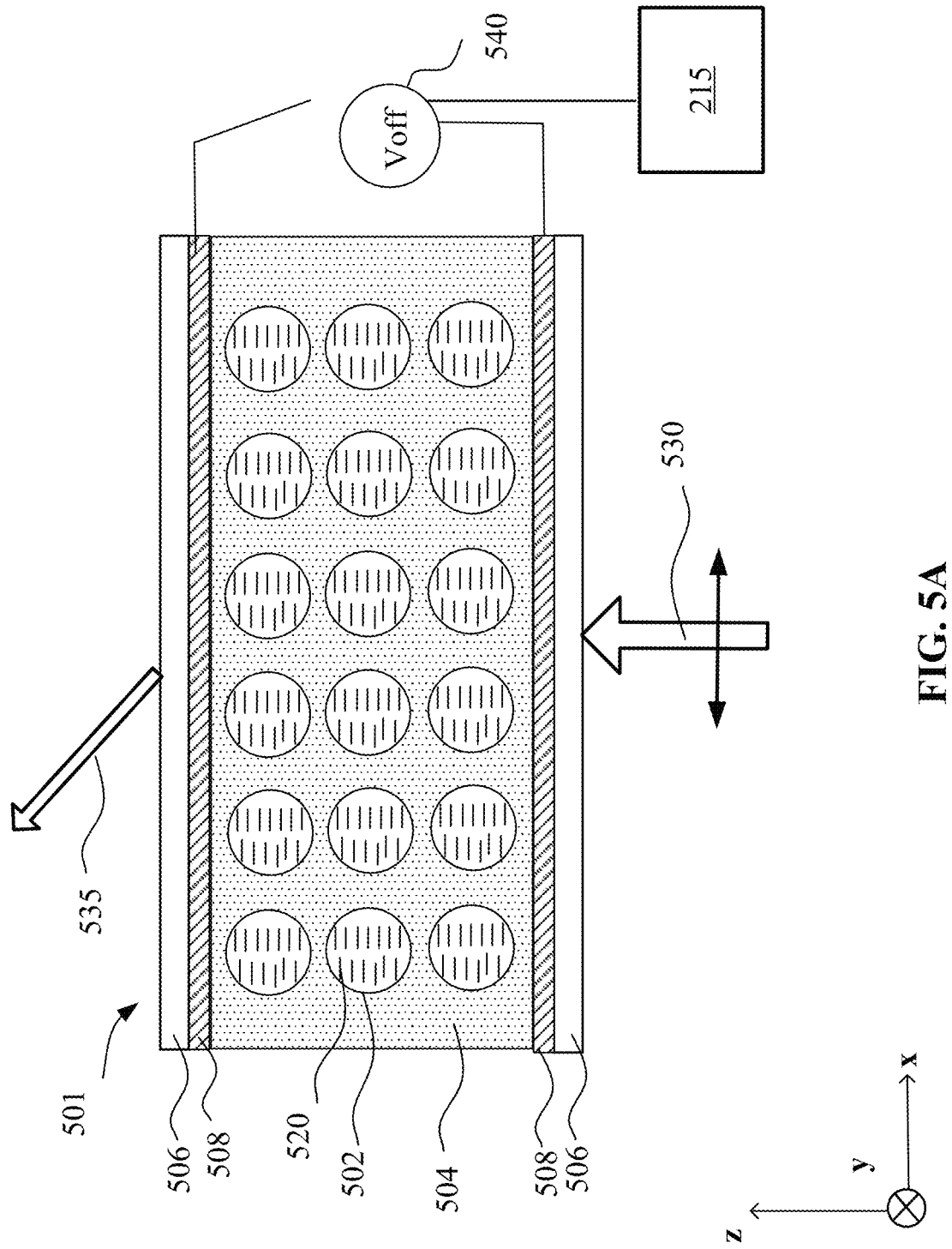
FIGS. 5A and 5B illustrate schematic diagrams of a grating in a diffraction state and a non-diffraction state, respectively, according to another embodiment of the present disclosure.
Figure 5B:
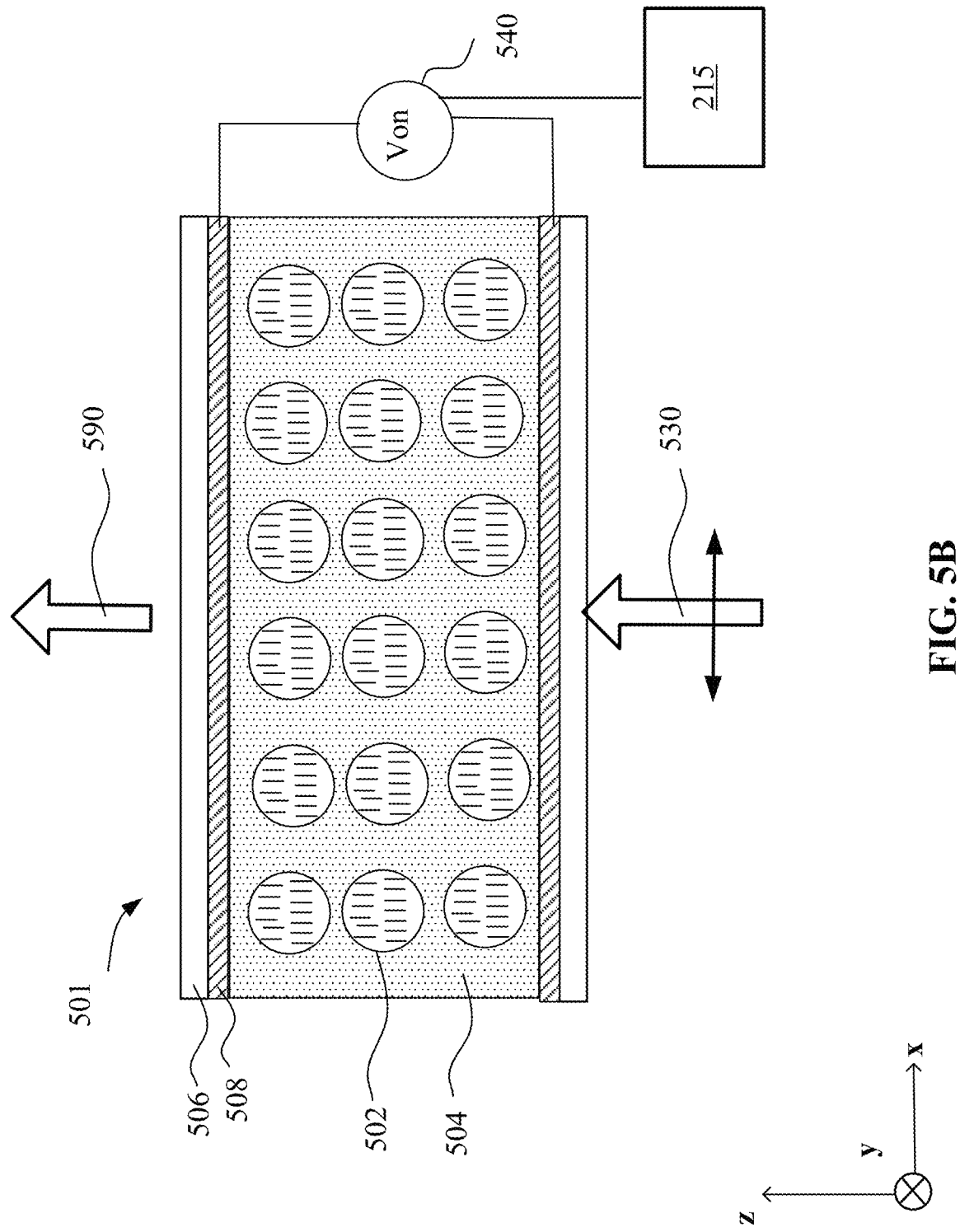

FIGS. 5A and 5B illustrate a schematic diagram of a diffractive optical element (or diffractive element) 501 at a diffraction state and a non-diffraction state, respectively, according to an embodiment of the disclosure. The diffractive optical element 501 may be a directly switchable grating controllable by the controller 215. A power source 540 may be electrically coupled with the diffractive optical element 501 to provide an electric field to the diffractive optical element 501. The controller 215 may be electrically coupled (e.g., through wired or wireless connection) with the power source 540, and may control the output of a voltage and/or current from the power source 540. The diffractive optical element 501 may be implemented as a grating in optical elements, devices, and systems disclosed herein for providing an increased or expanded overall output FOV, such as those shown in, or described in connection with, FIG. 2 and other figures. As described above, a directly switchable grating may be an active, polarization selective/sensitive grating, or an active, polarization nonselective/insensitive grating. For illustrative purposes, the diffractive optical element 501 is shown as an active, polarization selective grating. The diffractive optical element 501 may be directly switchable between a diffraction state and a non-diffraction state, when the controller 215 controls the power source 540 to generate a suitable electric field.

The diffractive optical element 501 may be an H-PDLC grating 501, which may be fabricated by polymerizing an isotropic photosensitive liquid mixture of monomers and LCs under a laser interference irradiation. As shown in FIG. 5A, the H-PDLC grating 501 may include layers of LC droplets 502 embedded in a polymer matrix 504 disposed between two substrates 506. Each substrate 506 may be provided with a transparent conductive electrode 508, such as an ITO electrode. At least one of the two electrodes 506 may be disposed with an alignment layer (not shown), which may be configured to homogeneously (or horizontally) align LC molecules 520 in a predetermined alignment direction, e.g., an x-axis direction in FIG. 5A. An ordinary refractive index $n_o$ of the LCs within the LC droplets 502 may be sufficiently close to the refractive index $n_p$ of the material of the polymer matrix 504, and an extraordinary refractive index $n_e$ of the LCs within the LC droplets 502 may be substantially different from the refractive index $n_p$ of the material of the polymer matrix 504. Due to the refractive index difference between the extraordinary refractive index $n_e$ of the LCs and the refractive index $n_p$ of the material of the polymer matrix 504, the spatial modulation of the LCs may produce a modulation in the average refractive index, resulting in an optical phase grating.

The H-PDLC grating 501 may be linear polarization dependent. For example, referring to FIG. 5A, when a linearly polarized incoming light 530 polarized in the predetermined alignment direction (e.g., an x-axis direction) is incident onto the diffractive optical element 501, due to the refractive index difference between $n_e$ and $n_p$, the light 530 may experience a periodic modulation of the refractive index in the diffractive optical element 501. As a result, the H-PDLC grating 501 may diffract the light 530 as a light 535. The LC droplets 502 are usually small (dimensions in sub-wavelength ranges) so that scattering due to refractive index mismatch of the LC and polymer may be minimized, and phase modulation may play a primary role. In other words, H-PDLC may belong to a class of nano-PDLC. Due to the substantial match between the refractive indices $n_o$ and $n_g$, the H-PDLC grating 501 may function as a substantially optically uniform plate for a linearly polarized incoming light polarized in a direction (e.g., a y-axis direction) perpendicular to the predetermined alignment direction (e.g., an x-axis direction) of the H-PDLC grating 501. That is, the H-PDLC grating 501 may not diffract the incoming light linearly polarized in the direction (e.g., a y-axis direction) perpendicular to the predetermined alignment direction (e.g., an x-axis direction). Rather, the H-PDLC grating 501 may transmit the incoming light linearly polarized in the direction perpendicular to the predetermined alignment direction with substantially zero or negligible diffraction.

In some embodiments, the H-PDLC grating 501 may be an active grating, which may be directly switchable between a diffraction state (or an activated state) and a non-diffraction state (or a deactivated state) by an external field, e.g., an external electric field provided by the power source 540. The controller 215 may control an output (e.g., a voltage and/or current) of the power source 540. For example, by controlling the voltage output by the power source 540, the controller 215 may control the switching of the H-PDLC grating 501 between the diffraction state and the non-diffraction state. When the H-PDLC grating 501 operates in the diffraction state, the controller 215 may adjust the voltage supplied by the power source 540 to adjust the diffraction efficiency of the diffractive optical element 501.

In some embodiments, the controller 215 may configure the diffractive optical element 501 to operate in the diffraction state (or activated state) by controlling a voltage supplied by the power source 540 to be lower than or equal to a threshold voltage. When the voltage is lower than or equal to the threshold voltage, the electric field generated by the supplied voltage may be insufficient to reorient the LC molecules 520 in the LC droplets 502. In some embodiments, the controller 215 may configure the H-PDLC grating 501 to operate in the non-diffraction state (or deactivated state) by controlling the supplied voltage to be higher than the threshold voltage (and sufficiently high) to reorient the LC molecules 520 to be parallel with the direction of the electric field.

As shown in FIG. 5A, when the controller 215 controls the power source 540 to supply a voltage lower than or equal to the threshold voltage (e.g., when the power source 540 supplies a substantially zero voltage), for the linearly polarized incoming light 530 polarized in the predetermined alignment direction (e.g., the x-axis direction), due to the difference between the refractive indices $n_e$ and $n_g$, the light 530 may experience a periodic modulation of the refractive index in the H-PDLC grating 501 while propagating therethrough. As a result, the light 530 may be diffracted by the diffractive optical element 501 as the light 535. That is, the controller 215 may control the power source 540 to supply a voltage that is lower than or equal to the threshold voltage, thereby configuring the H-PDLC grating 501 to operate in the diffraction state to diffract the linearly polarized incoming light 530.

As shown in FIG. 5B, when a voltage is supplied to the H-PDLC grating 501, an electric field (e.g., along a z-axis direction) may be generated between the two opposingly disposed substrates 506. When the voltage is higher than the threshold voltage and is gradually increased, the LC molecules 520 (of LCs having the positive dielectric anisotropy) may trend to be reoriented by the electric field (e.g., may gradually become oriented parallel with the electric field direction). When the voltage is sufficiently high, as shown in FIG. 5B, directors of the LC molecules 520 (of LCs having the positive dielectric anisotropy) may be reoriented to be parallel with the electric field direction (e.g., z-axis direction). Due to the substantial match between the refractive indices $n_o$ and $n_g$, the H-PDLC grating 501 may function as a substantially optically uniform plate for the incoming light 530. That is, the H-PDLC grating 501 may operate in a non-diffraction state for the light 530 polarized in the predetermined alignment direction (e.g., the x-axis direction), and may transmit the light 530 therethrough as a light 590 with substantially zero or negligible diffraction.

In the embodiment shown in FIGS. 5A and 5B, the H-PDLC grating 501 is configured to operate in the diffraction state when the voltage supplied by the power source 540 is lower than or equal to the threshold voltage, and to operate in the non-diffraction state when the voltage is sufficiently higher than the threshold voltage. In other embodiments, by configuring the initial orientations of the LC molecules 520 differently (e.g., homeotropically aligning LCs having a negative dielectric anisotropy), the H-PDLC grating 501 may be to operate in the diffraction state when the voltage supplied by the power source 540 is sufficiently higher than the threshold voltage, and to operate in the non-diffraction state when the voltage supplied by the power source 540 is lower than or equal to the threshold voltage.

Figure 6B:
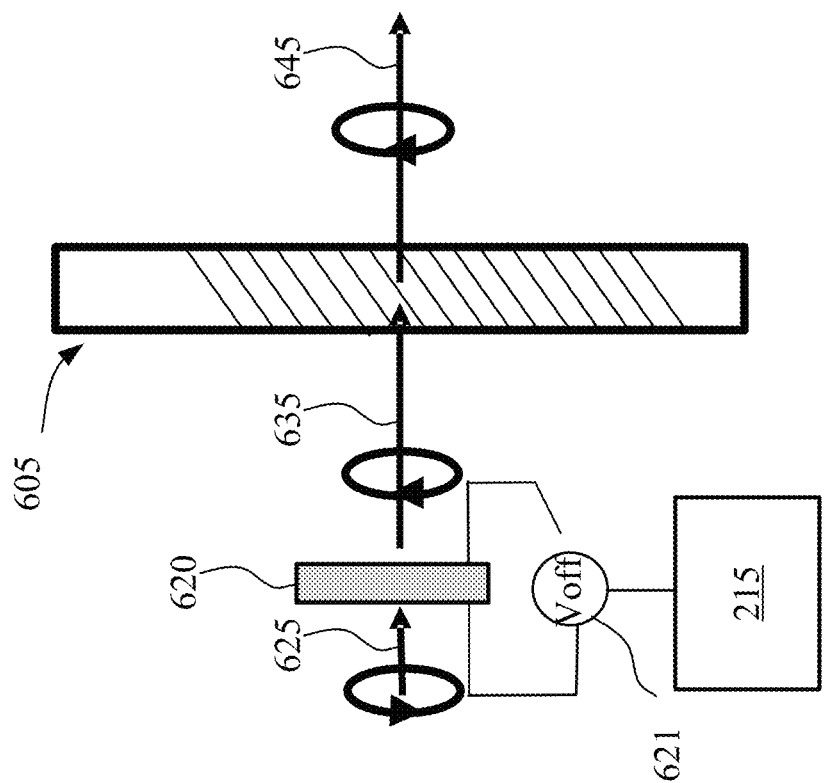
FIGS. 6A and 6B illustrate schematic diagrams of a grating in a diffraction state and a non-diffraction state, respectively, according to another embodiment of the present disclosure.
Figure 6A:
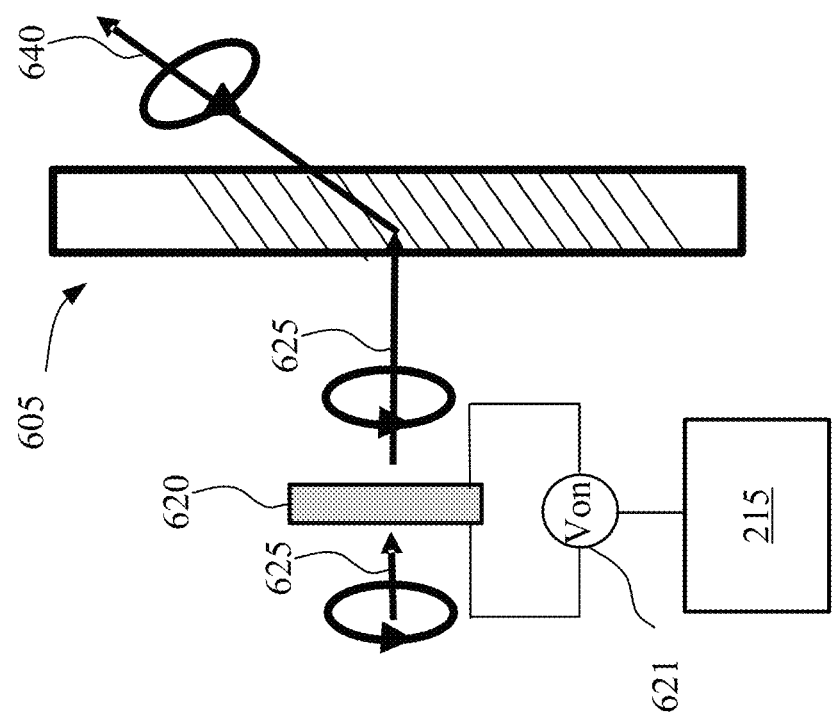

FIGS. 6A and 6B illustrate schematic diagrams of a transmissive-type indirectly switchable grating 605 in a diffraction state and a non-diffraction state, respectively, according to an embodiment of the present disclosure. The controller 215 may indirectly switch the grating 605 through controlling a polarization switch 620. A power source 621 may be electrically coupled with the polarization switch 620. The controller 215 may control the power source 621 to control the polarization switch 620. The polarization switch 620 may be similar to the polarization switch 470. Detailed descriptions of controlling a polarization switch to indirectly switch an indirectly switchable grating can refer to the above descriptions rendered in connection with FIGS. 4A and 4B. The polarization switch 620 may be disposed at a light incidence side of the grating 605. The polarization switch 620 may be configured to switch or maintain a polarization of an image light incident onto the grating 605, thereby indirectly switching the grating 605 to operate in a diffraction state when the incident image light has a first polarization, or to operate in a non-diffraction state when the incident image light has a second.

Figure 6D:
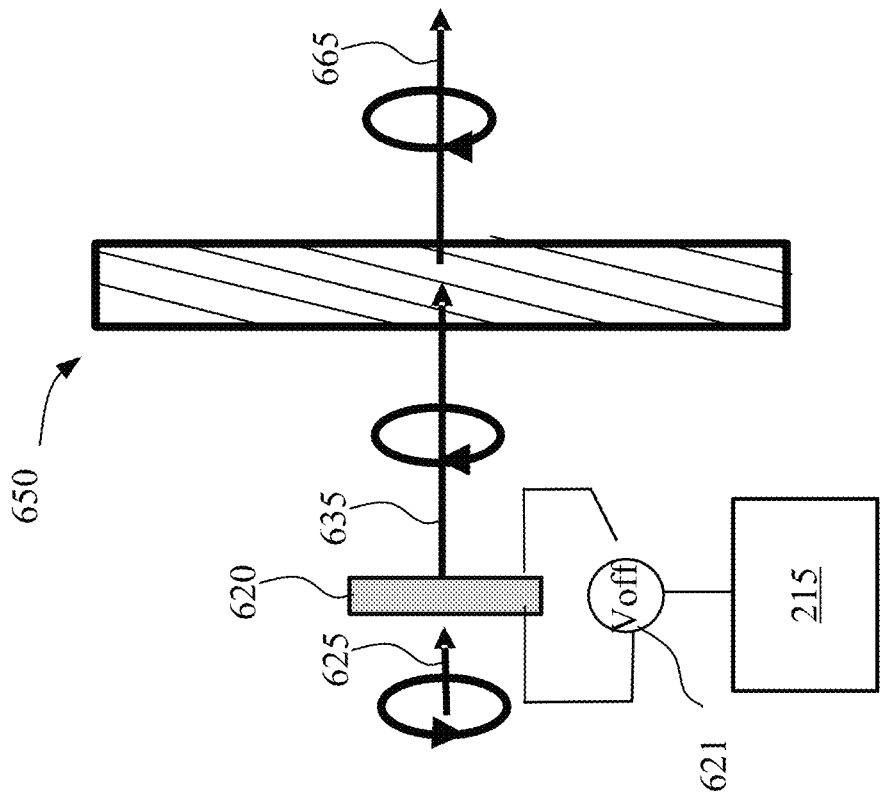
FIGS. 6C and 6D illustrate schematic diagrams of a grating in a diffraction state and a non-diffraction state, respectively, according to another embodiment of the present disclosure.
Figure 6C:
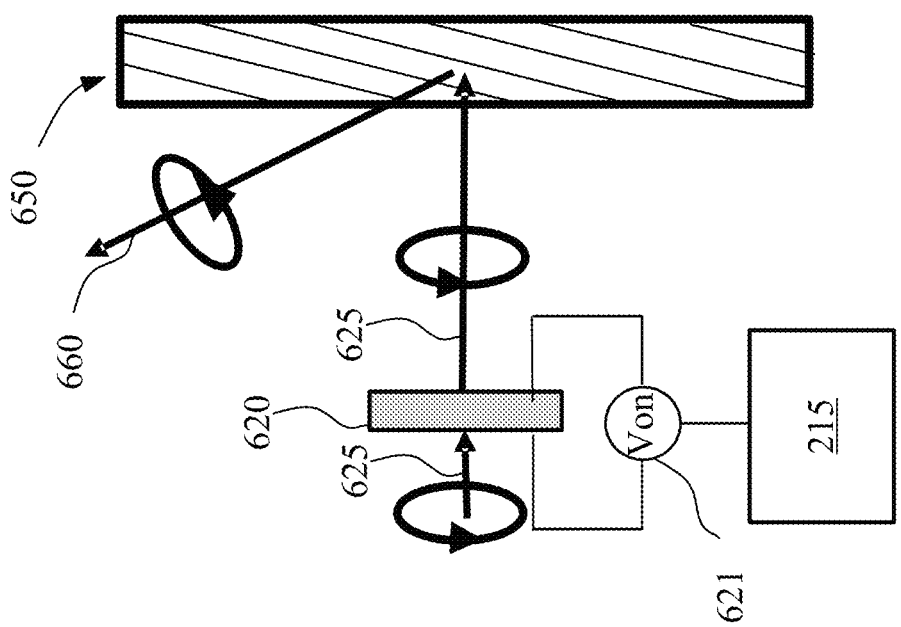

FIGS. 6C and 6D illustrate schematic diagrams of a reflective-type indirectly switchable grating 650 in a diffraction state and a non-diffraction state, respectively, according to an embodiment of the present disclosure. The polarization switch 620 may be disposed at a light incidence side of the grating 650. The controller 215 may control the power source 621 to control the polarization switch 620. The polarization switch 620 may switch or maintain a polarization of an image light incident onto the grating 650. By switching or maintaining the polarization of the image light incident onto the grating 650, the controller 215 may indirectly switch the grating 650 between operating in a diffraction state when the incident image light has the first polarization, and operating in a non-diffraction state when the incident image light has the second polarization. The first and second polarizations may be orthogonal linear polarizations or circular polarizations. For illustrative purposes, the first and second polarizations are shown in FIGS. 6A-6D as orthogonal circular polarizations with opposite handednesses.

In the embodiments shown in FIGS. 6A-6D, the controller 215 may control a voltage supplied by the power source 621 to the polarization switch 620. The descriptions of the controller 215 controlling the voltage to control the switching state and the non-switching state of the polarization switch 620 can refer to the above descriptions relating to the polarization switch 470. The indirectly switchable gratings 605 and 650 may be implemented in various devices, systems, and assemblies disclosed herein, including those described above and shown in other figures for providing increased overall output FOV. The gratings 605 and 650 may be circular polarization selective (or sensitive, dependent), and may be active or passive.

In some embodiments, the indirectly switchable transmissive-type grating 605 shown in FIGS. 6A and 6B may be a transmissive-type PVH grating, and the indirectly switchable reflective-type grating 650 shown in FIGS. 6C and 6D may be a reflective-type PVH grating. A PVH grating may include a PVH layer (or film) having optically anisotropic molecules (e.g., LC molecules) arranged in a three-dimensional ("3D") orientational pattern. The PVH layer may be configured to diffract an incident image light via Bragg diffraction. The PVH layer may be referred to as a left-handed PVH or a right-handed PVH, based on a handedness of helix twists in the PVH layer. The PVH layer may be configured to substantially diffract a circularly polarized light having a handedness that is the same as the handedness of the helix twist in the PVH layer, and substantially transmit a circularly polarized light having a handedness that is opposite to the handedness of the helix twist in the PVH layer. For example, a left-handed PVH layer may be configured to substantially diffract a left-handed circularly polarized ("LHCP") light and substantially transmit a right-handed circularly polarized ("RHCP") light. A right-handed PVH layer may be configured to substantially diffract an RHCP light beam and substantially transmit an LHCP light. For discussion purposes, the grating 605 shown in FIGS. 6A and 6B may include a right-handed transmissive PVH layer, and the grating 650 shown in FIGS. 6C and 6D may include a right-handed reflective PVH layer.

In some embodiments, the polarization switch 620 may include an SHWP. As shown in FIG. 6A, the controller 215 may control the voltage supplied by the power source 621 to the polarization switch 620 to be higher than a predetermined voltage value (and sufficiently high), thereby controlling the polarization switch 620 to operate in the non-switching state. In the non-switching state, the polarization switch 620 may transmit an RHCP light 625 as an RHCP light 630 without affecting the handedness. The grating 605 including a right-handed transmissive PVH layer may substantially forwardly diffract the RHCP light 630 to, e.g., a +1$^{st}$ order, as an LHCP light 640. That is, the right-handed transmissive PVH layer may diffract the RHCP light 630 and switch the handedness of the polarization to left handedness. As shown in FIG. 6B, the controller 215 may control the voltage supplied by the power source 621 to the polarization switch 620 to be lower than or equal to the predetermined voltage value, thereby controlling the polarization switch 620 to operate in the switching state. In the switching state, the polarization switch 620 may reverse the handedness of the RHCP light 625 to be left handedness. Thus, an image light 635 output from the polarization switch 620 may be an LHCP light 635. The grating 605 including the right-handed transmissive PVH layer may substantially transmit the LHCP light 635 to the 0$^{th}$ order as an LHCP light 645. That is, the right-handed transmissive PVH layer may transmit the LHCP light 635 without affecting the handedness of the polarization.

As shown in FIG. 6C, the controller 215 may control the voltage supplied by the power source 621 to the polarization switch 620 to be is higher than a predetermined voltage value (and sufficiently high), thereby controlling the polarization switch 620 to operate in the non-switching state. When operating in the non-switching state, the polarization switch 620 may transmit the RHCP light 625 as an RHCP light 630, without affecting the handedness. The grating 650 including a right-handed reflective PVH layer may substantially backwardly diffract the RHCP light 630 to, e.g., a +1$^{st}$ order, as an RHCP light 660. As shown in FIG. 6D, the controller 215 may control the voltage supplied by the power source 621 to the polarization switch 620 to be lower than or equal to the predetermined voltage value, thereby controlling the polarization switch 620 to operate in the switching state. When operating in the switching state, the polarization switch 620 may reverse the handedness of the RHCP light 625, and transmit the RHCP light 625 as an LHCP light 635. The grating 650 including the right-handed reflective PVH layer may substantially transmit the LHCP light 635 to the 0$^{th}$ order as an LHCP light 665.

In the following, exemplary waveguide display systems for providing an expanded overall output FOV will be described. In some embodiments, the polarization of the in-coupled image light may change while propagating inside the one or more waveguides. A retardation film (e.g., a polarization correction film) may be disposed adjacent or on the respective waveguide to counter the change in the polarization, thereby preserving the polarization of the in-coupled image light while the in-coupled image light propagates inside the one or more waveguides. Thus, for discussion purposes, the polarization of an in-coupled image light (or a TIR propagating light) is presumed to be unaffected while propagating inside the one or more waveguides. For illustrative purposes, various waveguide display systems for one-dimensional ("1D") pupil expansion and FOV expansion (e.g., in an x-axis direction) are used as examples to explain the principle of the FOV expansion (or providing an expanded FOV), such as those shown in FIGS. 7A-13.

In some embodiments, two-dimensional ("2D") pupil expansion and FOV expansion (e.g., in both x-axis direction and y-axis direction) may be achieved by introducing an additional diffractive optical element (e.g., a folding or redirecting element) that folds the in-coupled image light by 90° toward the out-coupling element. In some embodiments, the out-coupling elements shown in the FIGS. 7A-13 may include the folding function, and the redirecting element may be omitted. Thus, although 1D pupil expansion and FOV expansion (e.g., in an x-axis direction) are used to explain the principle of the embodiments shown in FIGS. 7A-13, the waveguide display systems included in FIGS. 7A-13 can provide 2D pupil expansion and FOV expansion. For illustrative purposes, in some embodiments, the waveguide display systems for providing an expanded overall output FOV are presumed to include linear polarization selective or dependent gratings, although other suitable polarization selective or dependent gratings may be used, such as circular polarization selective or dependent gratings. The same or similar design principles for the waveguide display assemblies including linear polarization selective or dependent gratings may be applicable to the waveguide display assemblies including circular polarization dependent gratings.

Figure 7A:
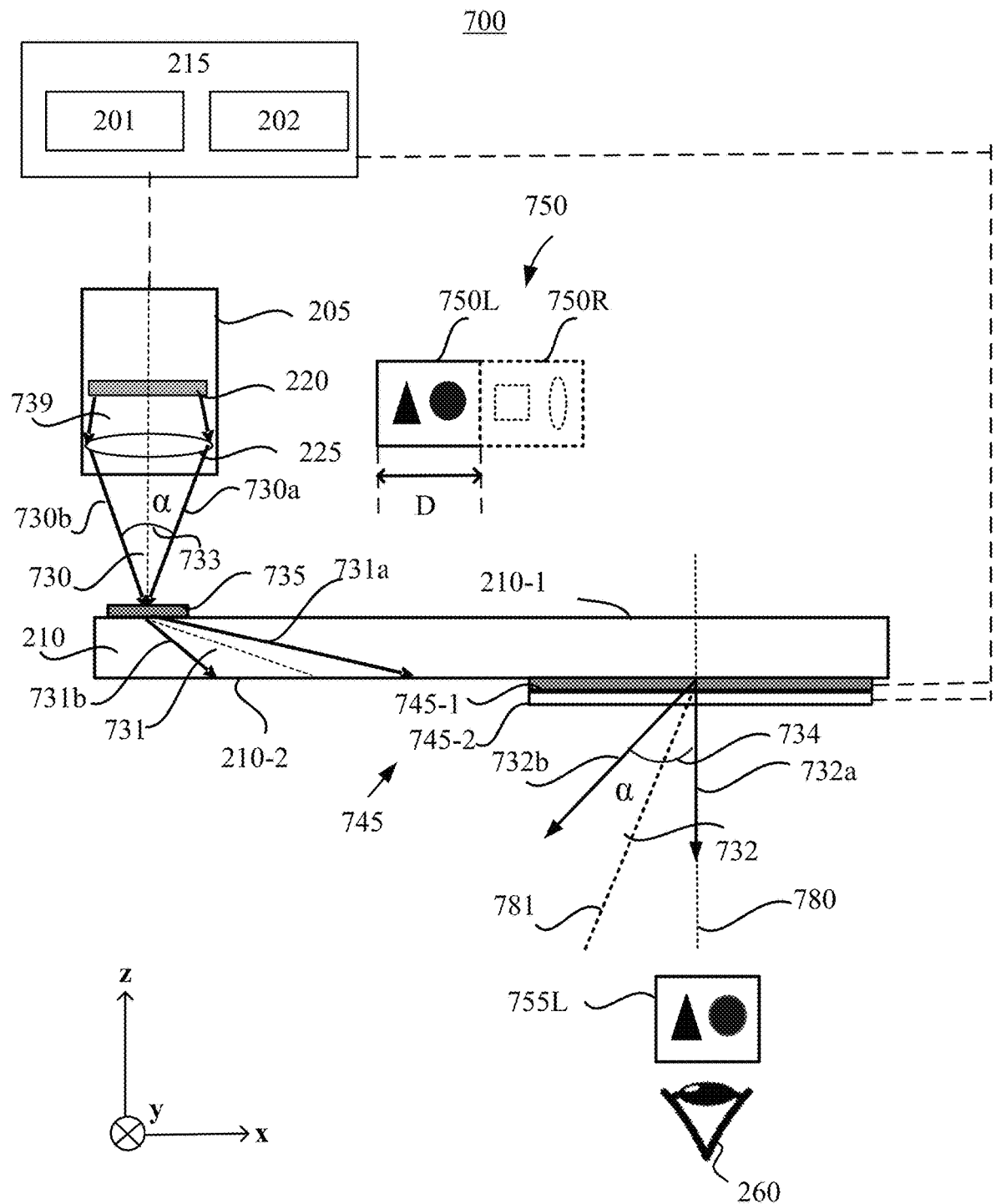
FIGS. 7A-7C illustrate schematic diagrams of an optical system configured to provide an expanded FOV, according to an embodiment of the present disclosure.
Figure 7B:
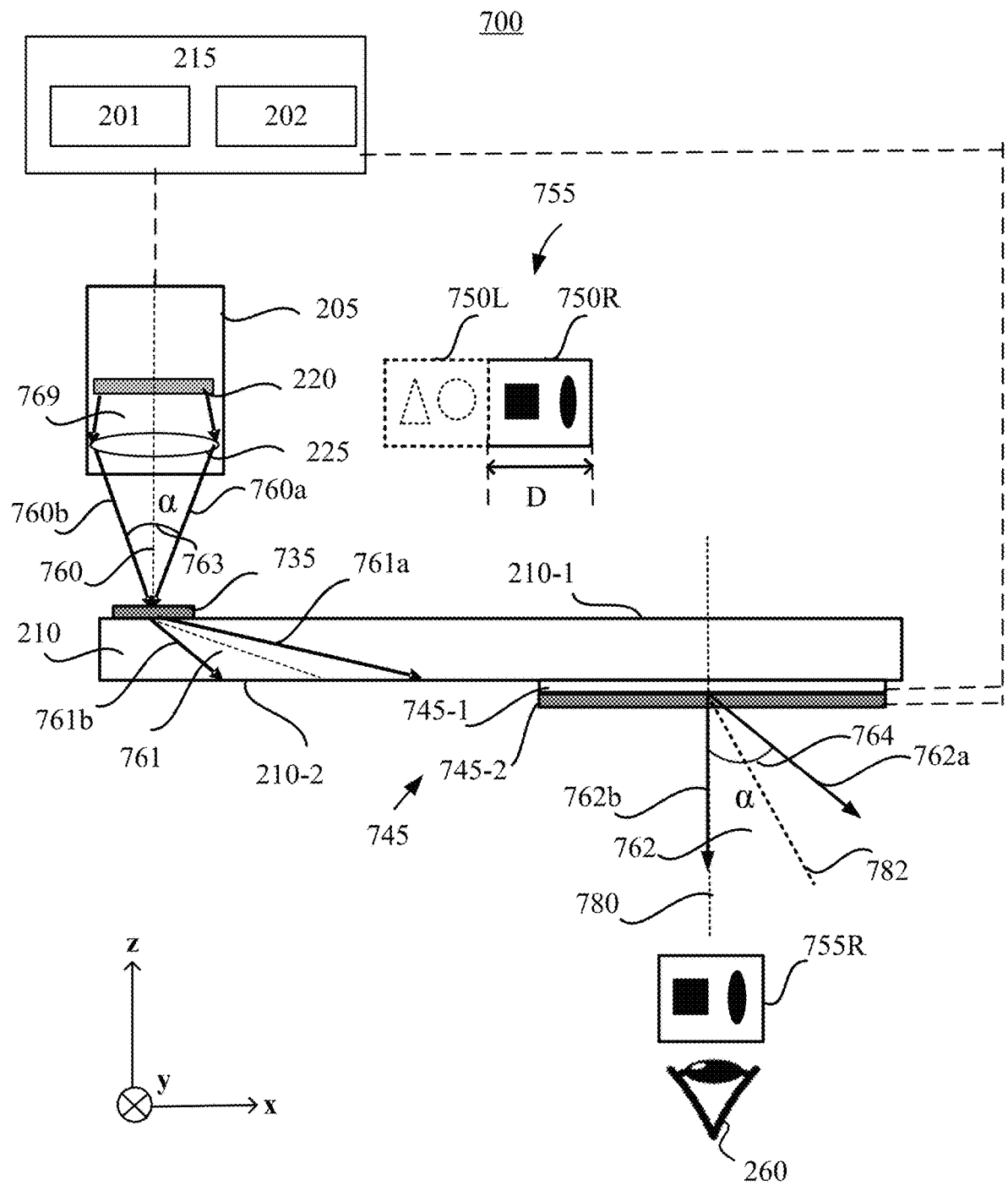
Figure 7C:
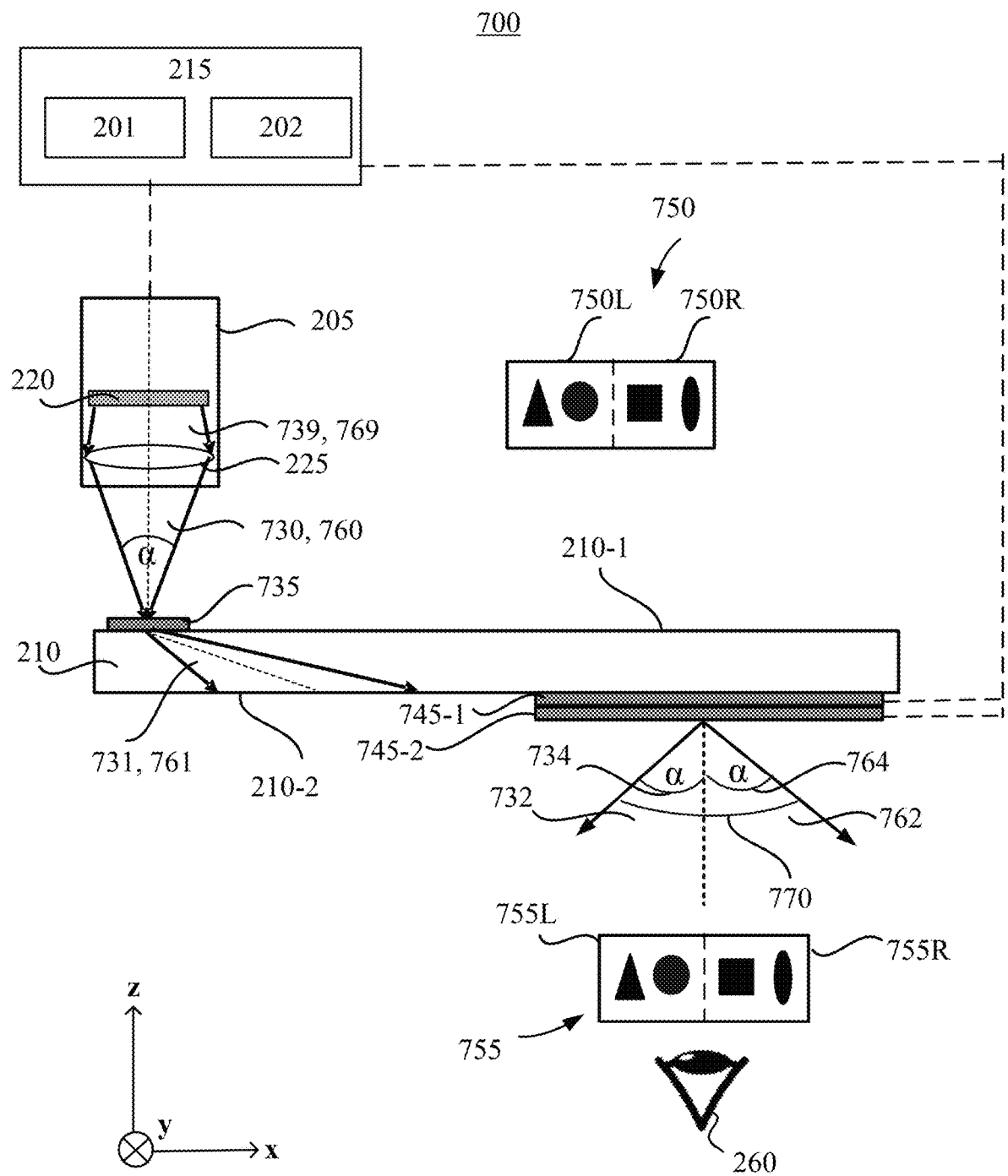

FIGS. 7A-7C illustrate schematic diagrams of an optical system 700 configured to provide an increased or expanded overall output FOV, according to an embodiment of the present disclosure. The optical system 700 may be a waveguide display system 700. The optical system 700 may include elements that are similar to or the same as those included in other optical systems disclosed herein and shown in other figures. Features shown in other figures, even if not explicitly described below for the simplicity of discussion, may also be applicable to the embodiment shown in FIGS. 7A-7C. Descriptions of the same or similar elements or features can refer to the above corresponding descriptions, including those rendered in connection with FIGS. 2-6D.

Similar to the optical system (or waveguide display system) 200 shown in FIG. 2, the optical system 700 may include the light source assembly 205, the waveguide 210, and the controller 215. The light source assembly 205 may include the light source 220 and the light conditioning system 225. The light source 220 may also be referred to as the display element 220. An in-coupling element 735 and an out-coupling element 745 may be coupled to the waveguide 210. The in-coupling element 735 may be any of the in-coupling elements disclosed herein, such as the in-coupling element 235 shown in FIG. 2. The out-coupling element 745 may be any of the out-coupling elements disclosed herein, such as the out-coupling element 245 shown in FIG. 2. In the embodiment shown in FIGS. 7A-7C, the in-coupling element 735 may include one in-coupling grating (also referred to as 735 for discussion purposes) that may be a switchable or a non-switchable grating. The out-coupling element 745 may include a first out-coupling grating 745-1 and a second out-coupling grating 745-2, at least one (e.g., each) of which may be a directly switchable grating.

A first vector sum of the in-plane projections of the grating vectors of the in-coupling grating 735 and the first out-coupling grating 745-1 may be a non-null vector, and a second vector sum of the in-plane projections of the grating vectors of the in-coupling grating 735 and the second out-coupling grating 745-2 may be a non-null vector. In other words, the in-plane projections of the grating vectors of the in-coupling grating 735 and the first out-coupling grating 745-1 may be unequal to one another, and the in-plane projections of the grating vectors of the in-coupling grating 735 and the second out-coupling grating 745-2 may be unequal to one another. In some embodiments, directions of the first vector sum and the second vector sum may be different from one another, e.g., the directions of the first vector sum and the second vector sum may be anti-parallel. For example, one of the first vector sum and the second vector sum may be a vector with a positive direction (e.g., in +x-axis direction), and the other may be a vector with a negative direction (e.g., in −x-axis direction). In some embodiments, magnitudes of the first vector sum and the second vector sum may be different from one another. In some embodiments, magnitudes of the first vector sum and the second vector sum may be substantially the same.

In some embodiments, at least one (e.g., each) of the first out-coupling grating 745-1 or the second out-coupling grating 745-2 may be a grating with slanted microstructures (e.g., a slant grating). The in-plane projections of the grating vectors of the first out-coupling grating 745-1 and the second out-coupling grating 745-2 may be different in at least one of the direction or the magnitude. In some embodiments, the directions of the in-plane projections of the grating vectors of the first out-coupling grating 745-1 and the second out-coupling grating 745-2 may be substantially parallel to one another, and the magnitudes of the in-plane projections of the grating vectors of the first out-coupling grating 745-1 and the second out-coupling grating 745-2 may be different from one another. In some embodiments, the grating periods of the first out-coupling grating 745-1 and the second out-coupling grating 745-2 may be different from one another, and the slant angles of the first out-coupling grating 745-1 and the second out-coupling grating 745-2 may be substantially the same.

In some embodiments, the grating periods of the in-coupling grating 735, the first out-coupling grating 745-1, and the second out-coupling grating 745-2 may be different from one another. For example, the grating period of one of the first out-coupling grating 745-1 and the second out-coupling grating 745-2 may be larger than the grating period of the in-coupling grating 735, and the grating period of the other one of the first out-coupling grating 745-1 and the second out-coupling grating 745-2 may be smaller than the grating period of the in-coupling grating 735. In some embodiments, the grating periods of the first out-coupling grating 745-1 and the second out-coupling grating 745-2 may be substantially the same, and the slant angles of the first out-coupling grating 745-1 and the second out-coupling grating 745-2 may have different absolute values and the same sign. In some embodiments, the slant angles of the in-coupling grating 735, the first out-coupling grating 745-1, and the second out-coupling grating 745-2 may have different absolute values and the same sign. For example, the slant angle of one of the first out-coupling grating 745-1 and the second out-coupling grating 745-2 may be larger than the slant angle of the in-coupling grating 735, and the slant angle of the other one of the first out-coupling grating 745-1 and the second out-coupling grating 745-2 may be smaller than the slant angle of the in-coupling grating 735.

In some embodiments, the directions of the in-plane projections of the grating vectors of the first out-coupling grating 745-1 and the second out-coupling grating 745-2 may be substantially anti-parallel to one another, and the magnitudes of the in-plane projections of the grating vectors of the first out-coupling grating 745-1 and the second out-coupling grating 745-2 may be substantially the same. In some embodiments, the grating periods of the first out-coupling grating 745-1 and the second out-coupling grating 745-2 may be substantially the same, and the slant angles of the first out-coupling grating 745-1 and the second out-coupling grating 745-2 may have substantially the same absolute value and opposite signs. For example, the slant angle of one of the first out-coupling grating 745-1 and the second out-coupling grating 745-2 may be a positive slant angle (e.g., +β), and the slant angle of the other one of the first out-coupling grating 745-1 and the second out-coupling grating 745-2 may be a negative slant angle (e.g., −β).

In some embodiments, the directions of the in-plane projections of the grating vectors of the first out-coupling grating 745-1 and the second out-coupling grating 745-2 may be substantially anti-parallel to one another, and the magnitudes of the in-plane projections of the grating vectors of the first out-coupling grating 745-1 and the second out-coupling grating 745-2 may be different from each other. For example, the grating periods of the first out-coupling grating and the second out-coupling grating may be substantially the same, and the slant angles of the first out-coupling grating and the second out-coupling grating may have different absolute values and opposite signs.

For a directly switchable grating included in the in-coupling element 735 or the out-coupling element 745, a power source may be electrically coupled with the directly switchable grating to provide a voltage to electrodes included in the directly switchable grating for switching the directly switchable grating. For an indirectly switchable grating included in the in-coupling element 735 or the out-coupling element 745, a polarization switch may be coupled with the indirectly switchable grating to switch the grating to operate in the diffraction state for an incident light having a first polarization, or to operate in the non-diffraction state for an incident light having a second polarization different from the first polarization. The directly switchable grating may be any suitable directly switchable grating, such as the diffractive optical element 301 shown in FIGS. 3A and 3B, or the diffractive optical element 501 shown in FIGS. 5A and 5B.

In FIGS. 7A-7C, the in-coupling element 735 and the out-coupling element 745 are shown as disposed at the first surface 210-1 and the second surface 201-2 of the waveguide 210, respectively, for illustrative purposes. The first out-coupling grating 745-1 and the second out-coupling grating 745-2 are shown as being stacked together in FIGS. 7A-7C, although in other embodiments, the out-coupling gratings may be disposed side by side. The first out-coupling grating 745-1 and the second out-coupling grating 745-2 may be electrically coupled with a power source (not shown), which may be controlled by the controller 215 to independently provide voltages to the first out-coupling grating 745-1 and the second out-coupling grating 745-2 for independently switching the respective out-coupling grating to operate in a diffraction state or a non-diffraction state for an incident light.

In some embodiments, the light source assembly 205 may generate a virtual image 750 having a predetermined image size. For discussion purposes, the light source 220 may be referred to as the display element 220. The display element 220 may include a display panel configured to display at least an image portion of a virtual image. The image size of the virtual image 750 may be larger than the size of the full light-generating area of the display element 220. For example, the image size of the virtual image 750 may be two times, three times, or four times, etc. of the size of the display element 220. The virtual image 750 may be spatially divided into two image portions (e.g., a first image portion 750L and a second image portion 750R). Each of the first image portion 750L and the second image portion 750R may have an image portion size (e.g., a diagonal length). In some embodiments, the image portion sizes of the first image portion 750L and the second image portion 750R may be different.

In some embodiments, the image portion sizes of the first image portion 750L and the second image portion 750R may be equal (or the same). In some embodiments, the equal image portion size (e.g., a diagonal length) may be substantially equal to a size (e.g., a diagonal length) of a full light-generating area of a display panel included in the display element 220 (or may include, correspond to, or be determined by a full scanning range or area of a laser scanner when the display element 220 includes a laser scanning display panel). That is, each image portion may be displayed by the display element 220 based on the full light-generating area of the display panel (or the full scanning range or area of the laser scanner). That is, an image light based on each image portion may be generated by the full light-generating area of the display element. Each image light may be converted into each input image light by a lens (e.g., a collimating lens) included in the light source assembly 205.

For illustrative purposes, in FIGS. 7A-7C, the first image portion 750L may be a left image portion (or left half) of the virtual image 750, and the second image portion 750R may be a right image portion (or right half) of the virtual image 750. The display element 220 may display an image portion of the virtual image 750 during each time period (e.g., each sub-frame of a display frame). Thus, the display element 220 may display a plurality of image portions of the virtual image 750 during a plurality of sub-frames of the display frame. During each sub-frame, substantially the entire (or full) light-generating area of the display element 220 may generate an image light based on (e.g., corresponding to) a single image portion (e.g., the first image portion or the second image portion) of the virtual image 750. The image light may be converted into an input image light with an input FOV by a lens (e.g., a collimating lens) included in the light conditioning system 225. In other words, during each sub-frame, the light source assembly 205 may output an input image light representing an image portion of the virtual image 750 generated by the full light-generating area of the display element 220.

A display frame for displaying the virtual image 750 may include two consecutive sub-frames. During a first sub-frame, as shown in FIG. 7A, the controller 215 may control the light source assembly 205 to output a first input image light 730 representing a first image portion 750L and having a first input FOV 733 toward an input region of the waveguide 210. For example, the controller 215 may control the display element 220 to generate a first image light 739 corresponding to, based on, or representing the first image portion 750L having an image portion size (e.g., ½ of the image size of the virtual image 750) by the full light-generating area of the display element 220, and output the first image light 739 to the light conditioning system 225. The first image light 739 may be an unpolarized image light or a polarized image light.

The light conditioning system 225 (which may include a collimating lens) may condition (e.g., collimate) the first image light 739, and output the first input image light 730 representing the first image portion 750L and having the first input FOV 733 toward the input region of the waveguide 210. The light conditioning system 225 may transform a linear distribution of pixels in the first image portion 750L having the image portion size into an angular distribution of pixels in the first input image light 730 having the first input FOV 733. In some embodiments, the first input FOV 733 may have an angular size represented by the angle α. The first input image light 730 having the first input FOV 733 may be bounded by first input rays 730a and 730b. For example, the first input ray 730a may be the rightmost ray of the first input image light 730, and the first input ray 730b may be the leftmost ray of the first input image light 730.

The in-coupling grating 735 may be configured to operate in the diffraction state to couple, via diffraction, the first input image light 730 having the first input FOV 733 into the waveguide 210, as a first in-coupled image light 731 bounded by first in-coupled rays 731a and 731b. In some embodiments, when the in-coupling grating 735 is a switchable grating, the controller 215 may configure the in-coupling grating 735 to operate in the diffraction state. In some embodiments, when the in-coupling grating 735 is a non-switchable grating, the in-coupling grating 735 may fixedly operate in the diffraction state. The first in-coupled image light 731 may propagate toward an output region of the waveguide 210 via TIR.

The controller 215 may configure the first out-coupling grating 745-1 to operate in the diffraction state to couple, via diffraction, the first in-coupled image light 731 out of the waveguide 210 as a first output image light 732 bounded by first output rays 732a and 732b. The first output ray 732a may be output at a first output angle (or a first diffraction angle), and the first output ray 732b may be output at a second output angle (or a second diffraction angle). In some embodiments, the grating vectors (e.g., the relative directions of the grating vectors) of the in-coupling grating 735 and the first out-coupling grating 745-1 may be configured, such that the first out-coupling grating 745-1 may operate in the diffraction state to couple, via diffraction, the first in-coupled image light 731 out of the waveguide 210 as the first output image light 732 propagating toward a first side (e.g., a left side) of a surface normal 780 of the waveguide 210.

In some embodiments, the first output image light 732 may have a first output FOV 734 corresponding to an angular region bounded by the first output rays 732a and 732b. For example, the first output angle (or the first diffraction angle) of the first output ray 732a may be about (or close to) zero, and the second output angle (or the second diffraction angle) of the first output ray 732b may be about +α. In some embodiments, the first output FOV 734 may have an angular size represented by the angle α. In some embodiments, a symmetry axis 781 of the first output FOV 734 may have an angle of +α/2 with respect to the surface normal 780 of the waveguide 210. That is, during the first sub-frame, the controller 215 may configure the first out-coupling grating 745-1 to operate in the diffraction state to deliver the first output FOV (e.g., a) 734 toward the first side (e.g., a left side) of the surface normal 780 of the waveguide 210.

In addition, the controller 215 may configure the second out-coupling grating 745-2 to operate in the non-diffraction state to transmit, with substantially zero or negligible diffraction, the first output image light 732 toward the eye 260. As the first output FOV (e.g., α) 734 is substantially equal to the first input FOV (e.g., α) 733, during the first sub-frame, the eye 260 may perceive a first image 755L that has a substantially same content (and size) as the first image portion 750L (e.g., a left half of the virtual image 750) displayed by the display element 220.

During a second sub-frame, as shown in FIG. 7B, the controller 215 control the light source assembly 205 to output a second input image light 760 having a second input FOV 763 toward the input region of the waveguide 210. The image portion size of the second image portion 750R and the image portion size of the first image portion 750L may be the same or different. For example, the controller 215 may control the display element 220 to output a second image light 769 corresponding to, based on, or representing the second image portion 750R having an image portion size (e.g., ½ of the image size of the virtual image 750). Similar to the first image light 739, the second image light 769 may be generated by the full light-generating area of the display element 220. The second image light 769 may be an unpolarized image light or a polarized image light.

The light conditioning system 225 (which may include a collimating lens) may condition the second image light 769 and output the second input image light 760 having the second input FOV 763 toward the input region of the waveguide 210. The collimating lens included in the light conditioning system 225 may be configured to transform or convert a linear distribution of pixels in the second image portion 750R (e.g., a right half of the virtual image 750) having the image portion size into an angular distribution of pixels in the second input image light 760 having the second input FOV 763. In some embodiments, the second input FOV 763 may have an angular size represented by the angle α. The second input image light 760 having the second input FOV 763 (e.g., α) may be bounded by second input rays 730a and 730b. For example, the second input rays 760a and 760b may be the rightmost ray and the leftmost ray of the second input image light 760.

The in-coupling grating 735 may be configured to operate in the diffraction state to couple, via diffraction, the second input image light 760 having the second input FOV (e.g., α) 763 into the waveguide 210, as a second in-coupled image light 761 bounded by second in-coupled rays 761a and 761b. For example, the in-coupling grating 735 may couple, via diffraction, the second input rays 760a and 760b into the waveguide 210 as the second in-coupled rays 761a and 761b, respectively. The second in-coupled image light 761 may propagate toward an output region of the waveguide 210 via TIR.

The controller 215 may configure the first out-coupling grating 745-1 to operate in the non-diffraction state to transmit, with substantially zero or negligible diffraction, the second in-coupled image light 761 toward the second out-coupling grating 745-2. The controller 215 may configure the second out-coupling grating 745-2 to operate in the diffraction state to couple, via diffraction, the second in-coupled image light 761 out of the waveguide 210 as a second output image light 762 bounded by second output rays 762a and 762b. For example, the controller 215 may configure the second out-coupling grating 745-2 to operate in the diffraction state to couple, via diffraction, the second in-couped ray 761a out of the waveguide 210 as the second output ray 762a at a third output angle (or a third diffraction angle), and the second in-couped ray 761b out of the waveguide 210 as the second output ray 762b at a fourth output angle (or a fourth diffraction angle).

In some embodiments, the grating vectors (e.g., the relative directions of the grating vectors) of the in-coupling grating 735 and the second out-coupling grating 745-2 may be configured, such that the second out-coupling grating 745-2 may operate in the diffraction state to couple, via diffraction, the second in-coupled image light 761 out of the waveguide 210 as the second output image light 762 propagating toward a second side (e.g., a right side) of the surface normal 780 of the waveguide 210. In some embodiments, the second output image light 762 may have a second output FOV 764 corresponding to an angular region bounded by the second output rays 762a and 762b. For example, the third output angle (or the third diffraction angle) of the second output ray 762a may be about −α, and the fourth output angle (or the fourth diffraction angle) of the second output ray 762b may be about (or close to) zero.

In some embodiments, the second output FOV 764 may have an angular size represented by the angle α. In some embodiments, a symmetry axis 782 of the second output FOV 764 may have an angle of −α/2 with respect to the surface normal 780 of the waveguide 210. That is, the controller 215 may configure the second out-coupling grating 745-2 to operate in the diffraction state to deliver the second output FOV (e.g., α) 764 toward the second side (e.g., a right side) of the surface normal 780 of the waveguide 210. As the second output FOV (e.g., α) 764 is substantially equal to the second input FOV 763 (e.g., α), during the second sub-frame, the eye 260 may perceive a second image 755R having a substantially same content (and size) as the second image portion 750R (e.g., a right half) of the virtual image 750 displayed by the display element 220.

As shown in FIG. 7C, the input image lights 730 and 760 may have substantially the same input FOV. That is, the symmetry axis of the input FOVs of the input image lights 730 and 760 may be the same, and the angular size of the input FOVs of the input image lights 730 and 760 may be the same. The symmetry axis of the input FOV of the input image lights 730 and 760 may be perpendicular to the in-coupling element 735. The first output FOV 734 of the output image light 732 delivered toward the first side of the surface normal 780 of the waveguide 210 by the first out-coupling grating 745-1 during the first sub-frame and the second output FOV 764 of the output image light 762 delivered toward the second side of the surface normal 780 of the waveguide 210 by the second out-coupling grating 745-2 during the second sub-frame may have a substantially narrow overlapping area (or overlapping FOV portion). An angular size of the overlapping FOV portion may be smaller than a predetermined percentage of the first output FOV 734 (or the second output FOV 764). For example, the predetermined percentage of the first output FOV 734 (or the second output FOV 764) may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%.

Thus, during the display frame of the virtual image 750 displayed by the display element 220, an overall (or combined) output FOV 770 may be substantially equal to a combination of the first output FOV 734 (e.g., α) and the second output FOV 764 (e.g., α). The combined output FOV 770 may be doubled as compared to the first input FOV 732

(e.g., α) or the second input FOV 762 (e.g., α). Accordingly, during the display frame of the virtual image 750, the eye 260 may perceive an image 755 that is formed by the first image 755L and the second image 755R corresponding to the first image portion (e.g., the left half) and the second image portion (e.g., the right half) of the image 755. Compared to a conventional waveguide display system (e.g., the conventional waveguide display system 100 shown in FIG. 1A) in which the output FOV 134 is substantially equal to the input FOV 133, through configuring the grating vectors (e.g., relative directions of the grating vectors) of the in-coupling gratings and the out-coupling gratings coupled to the waveguide 210, the disclosed optical system 700 may provide an expanded overall output FOV as compared to the input FOV, e.g., the overall output FOV 770 may be two times of the input FOV 733 or 763.

Figure 8A:
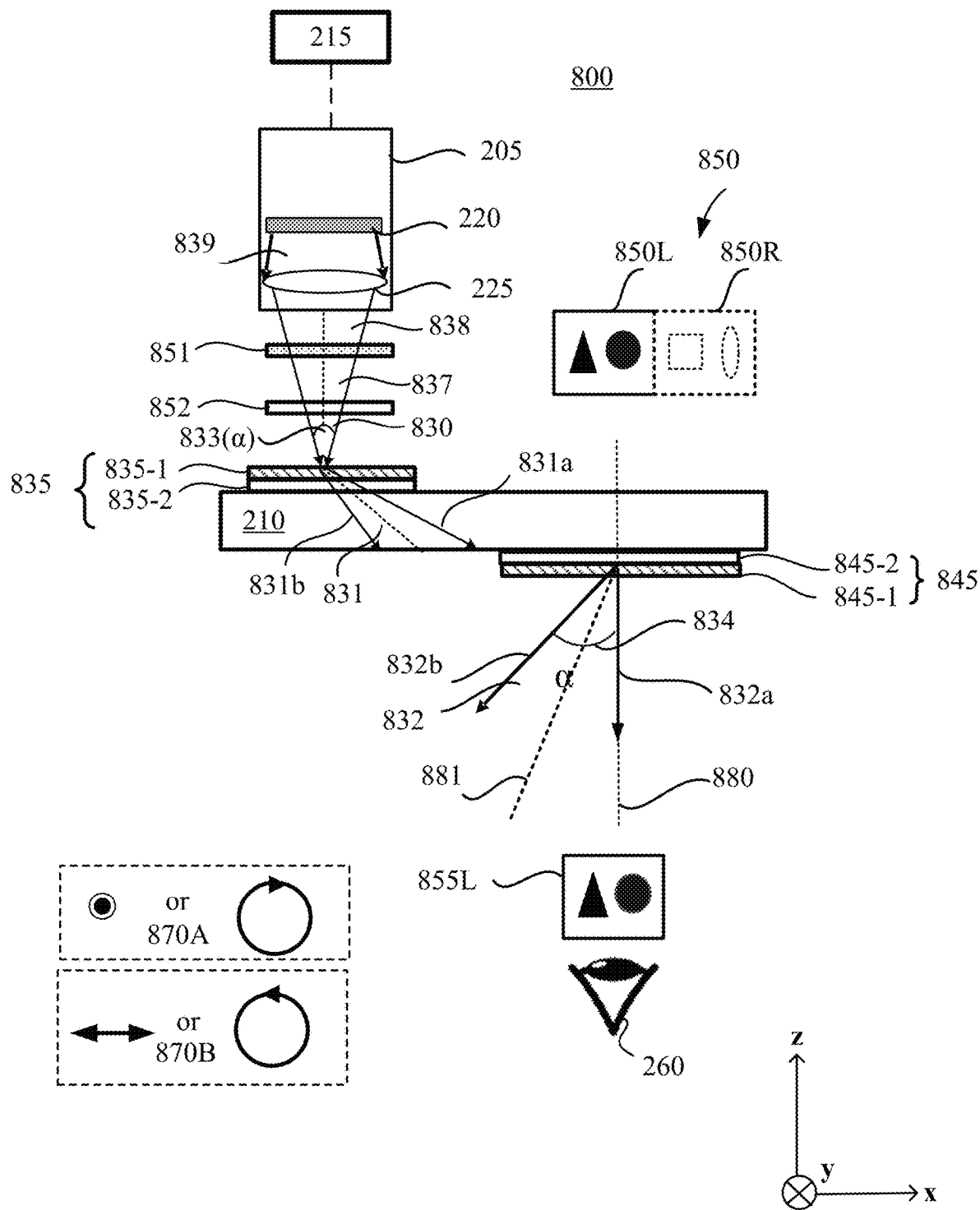
FIGS. 8A-8C illustrate schematic diagrams of an optical system configured to provide an expanded FOV, according to another embodiment of the present disclosure.
Figure 8B:
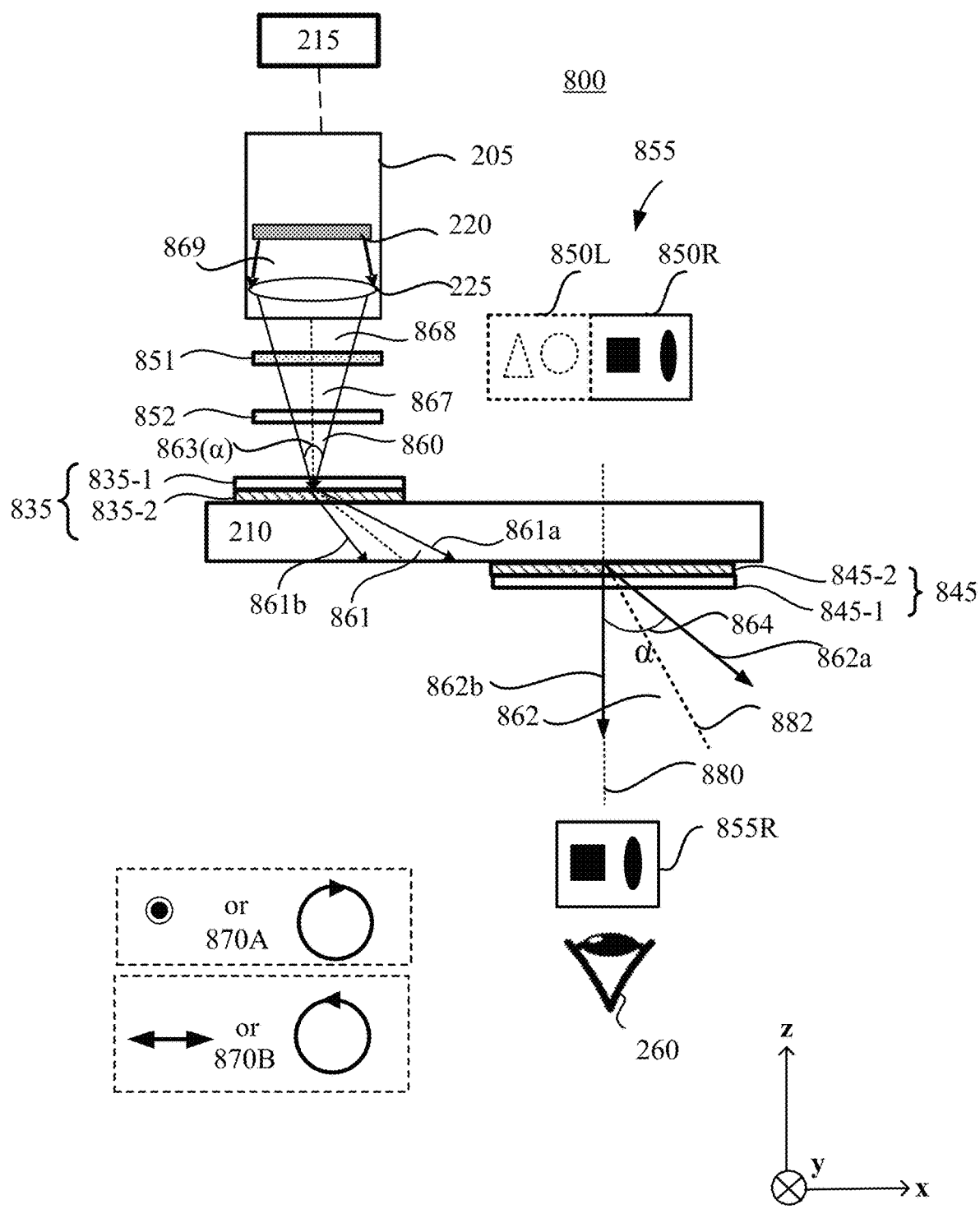
Figure 8C:
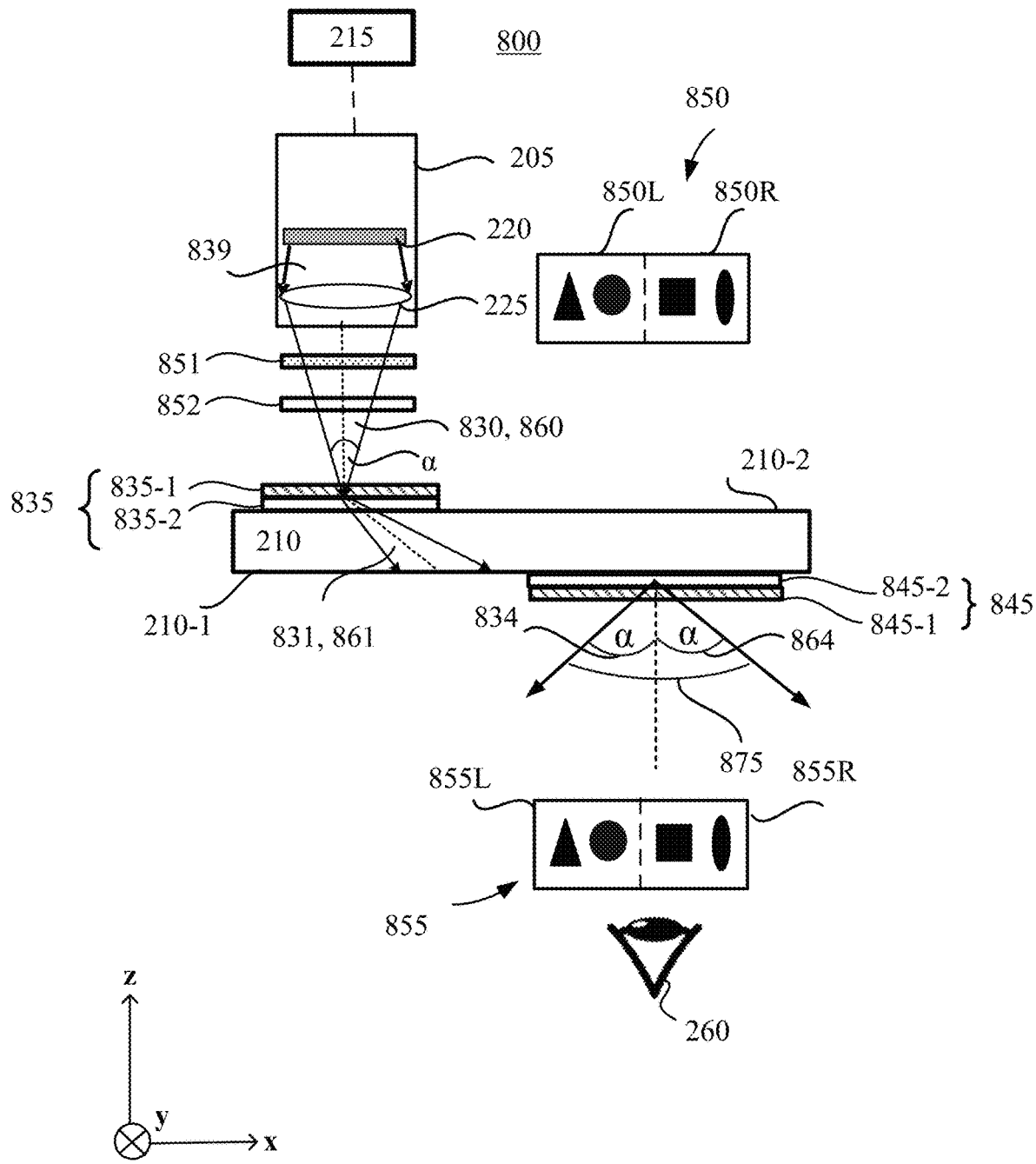

FIGS. 8A-8C illustrate schematic diagrams of an optical system 800 configured to provide an increased overall output FOV, according to an embodiment of the present disclosure. The optical system 800 may be a waveguide display system 800. The optical system 800 may include elements that are similar to or the same as those included in other optical systems disclosed herein and shown in other figures. Features shown in other figures, even if not explicitly described below for the simplicity of discussion, may also be applicable to the embodiment shown in FIGS. 8A-8C. Descriptions of the same or similar elements or features can refer to the above corresponding descriptions, including those rendered in connection with FIGS. 2-7C.

As shown in FIGS. 8A-8C, the optical system 800 may include the light source assembly 205, which may include the light source 220 and the light conditioning system 225. The optical system 800 may also include the waveguide 210 and the controller 215. The waveguide 210 may be coupled with an in-coupling element 835 and an out-coupling element 845. In the embodiment shown in FIGS. 8A-8C, the in-coupling element 835 may include a first in-coupling grating 835-1 and a second in-coupling grating 835-2. At least one (e.g., each) of the first in-coupling grating 835-1 and the second in-coupling grating 835-2 may be an indirectly switchable grating. The out-coupling grating 845 may include a first out-coupling grating 845-1 and a second out-coupling grating 845-2. At least one (e.g., each) of the first out-coupling grating 845-1 and the second out-coupling grating 845-2 may be an indirectly switchable grating. Each indirectly switchable grating may be an indirectly switchable grating shown in FIGS. 4A and 4B, FIGS. 6A and 6B, or FIGS. 6C and 6D. In some embodiments, the in-coupling grating element 835 may include a single in-coupling grating, such as 835-1 or 8355-2, which may be polarization nonselective.

In the embodiment shown in FIGS. 8A-8C, the in-coupling gratings 835-1 and 835-2 may be configured to diffract image lights having different polarizations, respectively, e.g., orthogonal linear polarizations, or orthogonal circular polarizations, i.e., with opposite handednesses. The out-coupling gratings 845-1 and 845-2 may be configured to diffract image lights having different (e.g., orthogonal) polarizations, respectively. One of the in-coupling gratings 835-1 and 835-2 may have a same polarization selectivity as one of the out-coupling gratings 845-1 and 845-2, and the other one of the in-coupling gratings 835-1 and 835-2 may have a same polarization selectivity as the other one of the out-coupling gratings 845-1 and 845-2.

For discussion and illustrative purposes, the first in-coupling grating 835-1 and the first out-coupling grating 845-1 are presumed to have the same polarization sensitivity (or selectivity), and the second in-coupling grating 835-2 and the second out-coupling grating 845-2 are presumed to have the same polarization sensitivity (or selectivity). For example, when an incident light has a first polarization 870A, the first in-coupling grating 835-1 and the first out-coupling grating 845-1 may be configured to operate in the diffraction state for the incident light having the first polarization 870A, and the second in-coupling grating 835-2 and the out-second coupling grating 845-2 may be configured to operate in the non-diffraction state for the incident light having the first polarization 870A. When an incident light has a second polarization 870B (orthogonal to the first polarization 870A), the first in-coupling grating 835-1 and the first out-coupling grating 845-1 may be configured to operate in the non-diffraction state for the incident light having the second polarization 870B, and the second in-coupling grating 835-2 and the second out-coupling grating 845-2 may be configured to operate in the diffraction state for the incident light having the second polarization 870B.

In some embodiments, the first in-coupling grating 835-1 and the first out-coupling grating 845-1 operating in the diffraction state may form a first set of coupling gratings, and the second in-coupling grating 835-2 and the second out-coupling grating 845-2 operating in the diffraction state may form a second set of coupling gratings. A first vector sum of the in-plane projections of the grating vectors of the first in-coupling grating 835-1 and the first out-coupling grating 845-1 in the first set may be a non-null vector, and a second vector sum of the in-plane projections of the grating vectors of the second in-coupling grating 835-2 and the second out-coupling grating 845-2 may be a non-null vector. In other words, the in-plane projections of the grating vectors of the first in-coupling grating 835-1 and the first out-coupling grating 845-1 may be unequal to one another, and the in-plane projections of the grating vectors of the second in-coupling grating 835-2 and the second out-coupling grating 845-2 may be unequal to one another.

In some embodiments, directions of the first vector sum and the second vector sum may be different from one another, e.g., the directions of the first vector sum and the second vector sum may be anti-parallel. For example, one of the first vector sum and the second vector sum may be a vector with a positive direction, and the other may be a vector with a negative direction. In some embodiments, magnitudes of the first vector sum and the second vector sum may be different from one another. In some embodiments, magnitudes of the first vector sum and the second vector sum may be substantially the same.

In some embodiments, at least one (e.g., each) of the first out-coupling grating 845-1 or the second out-coupling grating 845-2 may be a grating with slanted microstructures (e.g., a slant grating). The in-plane projections of the grating vectors of the first out-coupling grating 845-1 and the second out-coupling grating 845-2 may be different in at least one of the direction or the magnitude. In some embodiments, the directions of the in-plane projections of the grating vectors of the first out-coupling grating 845-1 and the second out-coupling grating 845-2 may be substantially parallel to one another, and the magnitudes of the in-plane projections of the grating vectors of the first out-coupling grating 845-1 and the second out-coupling grating 845-2 may be different from one another. In some embodiments, the grating periods of the first out-coupling grating 845-1 and the second out-coupling grating 845-2 may be different from one another, and the slant angles of the first out-coupling grating 845-1 and the second out-coupling grating 845-2 may be substantially the same.

In some embodiments, the grating periods of the in-coupling grating 835-1 or 835-2, the first out-coupling grating 845-1, and the second out-coupling grating 845-2 may be different from one another. For example, the grating period of one of the first out-coupling grating 845-1 and the second out-coupling grating 845-2 may be larger than the grating period of the in-coupling grating 835-1 or 835-2, and the grating period of the other one of the first out-coupling grating 845-1 and the second out-coupling grating 845-2 may be smaller than the grating period of the in-coupling grating 835-1 or 835-2. In some embodiments, the grating periods of the first out-coupling grating 845-1 and the second out-coupling grating 845-2 may be substantially the same, and the slant angles of the first out-coupling grating 845-1 and the second out-coupling grating 845-2 may have different absolute values and the same sign. In some embodiments, the slant angles of the in-coupling grating 835-1 or 835-2, the first out-coupling grating 845-1, and the second out-coupling grating 845-2 may have different absolute values and the same sign. For example, the slant angle of one of the first out-coupling grating 845-1 and the second out-coupling grating 845-2 may be larger than the slant angle of the in-coupling grating 835-1 or 835-2, and the slant angle of the other one of the first out-coupling grating 845-1 and the second out-coupling grating 845-2 may be smaller than the slant angle of the in-coupling grating 835-1 or 835-2.

In some embodiments, the directions of the in-plane projections of the grating vectors of the first out-coupling grating 845-1 and the second out-coupling grating 845-2 may be substantially anti-parallel to one another, and the magnitudes of the in-plane projections of the grating vectors of the first out-coupling grating 845-1 and the second out-coupling grating 845-2 may be substantially the same. In some embodiments, the grating periods of the first out-coupling grating 845-1 and the second out-coupling grating 845-2 may be substantially the same, and the slant angles of the first out-coupling grating 845-1 and the second out-coupling grating 845-2 may have substantially the same absolute value and opposite signs. For example, the slant angle of one of the first out-coupling grating 845-1 and the second out-coupling grating 845-2 may be a positive slant angle (e.g., $+\beta$), and the slant angle of the other one of the first out-coupling grating 845-1 and the second out-coupling grating 845-2 may be a negative slant angle (e.g., $-\beta$).

In some embodiments, the directions of the in-plane projections of the grating vectors of the first out-coupling grating 845-1 and the second out-coupling grating 845-2 may be substantially anti-parallel to one another, and the magnitudes of the in-plane projections of the grating vectors of the first out-coupling grating 845-1 and the second out-coupling grating 845-2 may be different from each other. For example, the grating periods of the first out-coupling grating and the second out-coupling grating may be substantially the same, and the slant angles of the first out-coupling grating and the second out-coupling grating may have different absolute values and opposite signs.

The optical system 800 may include a polarization switch 852 disposed at a light incidence side of the in-coupling element 835. The polarization switch 852 may be an embodiment of the polarization switch 470 shown in FIG. 4A and FIG. 4B, or the polarization switch 620 shown in FIGS. 6A-6D. The controller 215 may control the operation state (e.g., a switching state or a non-switching state) of the polarization switch 852 to configure the operating state (diffraction state or non-diffraction state) of the in-coupling gratings 835-1 and 835-2 and the out-coupling gratings 845-1 and 845-2. By controlling the operating state (switching state or non-switching state) of the polarization switch 852, the controller 215 may indirectly control a polarization of an image light incident onto the in-coupling gratings 835-1 and 835-2 (and hence the polarization of the image light incident onto the out-coupling gratings 845-1 and 845-2). Accordingly, the controller 215 may control the operating state (diffraction state or non-diffraction state) of the in-coupling gratings 835-1 and 835-2 and the out-coupling gratings 845-1 and 845-2. The controller 215 may be electrically coupled (e.g., through wired or wireless connections) with the light source assembly 205 and the polarization switch 852. For example, the controller 215 may be electrically connected with a power source coupled with the polarization switch 852. The wired or wireless electrical connections and communications between the controller 215 and other elements are not shown in FIG. 8A and FIG. 8B for the simplicity of illustration.

In some embodiments, the controller 215 may control or configure the light source assembly 205 to emit an unpolarized image light. The optical system 800 may include a polarizer 851 disposed between the light source assembly 205 and the polarization switch 852. The polarizer 851 may be configured to convert the unpolarized image light generated by the light source assembly 205 into a polarized image light having one of the first polarization 870A or the second polarization 870B, depending on the transmission axis of the polarizer 851. For discussion purposes, in FIGS. 8A and 8B, the polarizer 851 is presumed to be a linear polarizer configured to convert the unpolarized image light into the linearly polarized image light 803A having the first polarization 870A (e.g., a linear polarization in the y-axis direction).

A display frame of a virtual image 850 displayed by the display element 220 may include or may be divided into two consecutive sub-frames. During a first sub-frame, as shown in FIG. 8A, the controller 215 may be configured to control the display element 220 to display a first image portion 850L having an image portion size (e.g., ½ of the image size of the virtual image 850). For example, the controller 215 may control the display element 220 to output a first image light 839 corresponding to, based on, or representing the first image portion 850L. The first image light 839 may be generated by the full light-generating area of the display element 220. In some embodiments, the first image light 839 may be an unpolarized image light. The light conditioning system 225 may condition the first image light 839 and output a first unpolarized image light 838 having a first input FOV 833 (e.g., having an angular size represented by the angle $\alpha$). The light conditioning system 225 may be configured to transform a linear distribution of pixels in the first image portion 850L having the image portion size into an angular distribution of pixels in the first unpolarized image light 838 having the first input FOV 833.

The polarizer 851 may be configured to convert the first unpolarized image light 838 into a first linearly polarized image light 837 having the first polarization 870A. The controller 215 may control the polarization switch 852 to operate in the non-switching state. As a result, the first linearly polarized image light 837 having the first polarization 870A may transmit through the polarization switch 852 as a first input image light 830 having the first polarization 870A. The first input image light 830 may have the same FOV (i.e., the first input FOV 833) as the first unpolarized image light 838.

The first in-coupling grating 835-1 may be configured to diffract an image light having the first polarization 870A and transmit an image light having the second polarization 870B with substantially zero or negligible diffraction, and the second in-coupling grating 835-2 may be configured to diffract an image light having the second polarization 870B and transmit an image light having the first polarization 870A with substantially zero or negligible diffraction. Thus, the first in-coupling grating 835-1 may be configured, e.g., by the controller 215, to operate in the diffraction state to couple, via diffraction, the first input image light 830 having the first input FOV 833 (e.g., α) into the waveguide 210, as a first in-coupled image light 831 bounded by first in-coupled rays 831a and 831b. For discussion purposes, first polarization 870A of the first in-coupled image light 831 is presumed to be preserved when the first in-coupled image light 831 propagates inside the waveguide 210.

The second out-coupling grating 845-2 may be configured to diffract an image light having the second polarization 870B and transmit an image light having the first polarization 870A with substantially zero or negligible diffraction. The second out-coupling grating 845-2 may function as an optically uniform plate for the first in-coupled image light 831 having the first polarization 870A, and may transmit the first in-coupled image light 831 having the first polarization 870A, with substantially zero or negligible diffraction, toward the first out-coupling grating 845-1. The first out-coupling grating 845-1 may be configured to diffract an image light having the first polarization 870A and transmit an image light having the second polarization 870B with substantially zero or negligible diffraction. The first out-coupling grating 845-1 may be configured to operate in the diffraction state to couple, via diffraction, the first in-coupled image light 831 having the first polarization 870A out of the waveguide 210 as a first output image light 832 bounded by first output rays 832a and 832b. For example, the first out-coupling grating 845-1 may be configured to couple, via diffraction, the first in-couped ray 831a out of the waveguide 210 as the first output ray 832a at a first output angle (or a first diffraction angle) and the first in-couped ray 831b out of the waveguide 210 as the first output ray 832b at a second output angle (or a second diffraction angle). The first output angle and the second output angle may have the same absolute value and opposite signs.

In some embodiments, the grating vectors (e.g., the relative directions of the grating vectors) of the first in-coupling grating 835-1 and the first out-coupling grating 845-1 may be configured, such that the first out-coupling grating 845-1 may couple, via diffraction, the first in-coupled image light 831 out of the waveguide 210 as the first output image light 832 propagating toward a first side (e.g., a left side) of a surface normal 880 of the waveguide 210. For example, the first output angle (or the first diffraction angle) of the first output ray 832a may be about zero, and the second output angle (or the second diffraction angle) of the first output ray 832b may be about +α. In some embodiments, the first output image light 832 may have a first output FOV 834 corresponding to an angular region bounded by the first output rays 832a and 832b. In some embodiments, the first output FOV 834 may have an angular size represented by the angle α. In some embodiments, a symmetric axis 881 of the first output FOV 834 may have an angle of +α/2 with respect to the surface normal 880 of the waveguide 210. That is, the controller 215 may configure the first out-coupling grating 845-1 to operate in the diffraction state to deliver the output image light 832 having the first output FOV (e.g., α) 834 toward the first side (e.g., a left side) of the surface normal 880 of the waveguide 210. As the first output FOV (e.g., α) 834 is substantially equal to the first input FOV 833 (e.g., α), during the first sub-frame, the eye 260 may perceive a first image 855L having a substantially same content (and size) as the first image portion 850L (e.g., a left half) of the virtual image 850 displayed by the display element 220.

During a second sub-frame, as shown in FIG. 8B, the controller 215 may be configured to control the display element 220 to display a second image portion 850R having an image portion size (e.g., ½ of the image size of the virtual image 850). For example, the controller 215 may control the display element 220 to output a second image light 869 corresponding to, based on, or representing the second image portion 850R. The second image light 869 may be generated by the full light-generating area of the display element 220. For example, the second image light 869 may be an unpolarized image light. The light conditioning system 225 may condition the second image light 869 and output a second unpolarized image light 868 having a second input FOV 863 (e.g., having an angular size represented by the angle α). The light conditioning system 225 may be configured to transform a linear distribution of pixels in the second image portion 850R having the image portion size into an angular distribution of pixels in the second unpolarized image light 868 having a second input FOV 863. The polarizer 851 may be configured to convert the second unpolarized image light 868 into a second linearly polarized image light 867 having the first polarization 870A. The controller 215 may control the polarization switch 852 to operate in the switching state. As a result, the second linearly polarized image light 867 having the first polarization 870A may transmit through the polarization switch 852 as a second input image light 860 having the second polarization 870B. The second input image light 860 may have the same FOV (i.e., the second input FOV 863) as the second unpolarized image light 868.

As the first in-coupling grating 835-1 may be configured to diffract an image light having the first polarization 870A and transmit an image light having the second polarization 870B with substantially zero or negligible diffraction, the first in-coupling grating 835-1 may transmit the second input image light 860 having the second polarization 870B toward the second in-coupling grating 835-2, with substantially zero or negligible diffraction. As the second in-coupling grating 835-2 may be configured to diffract an image light having the second polarization 870B and transmit an image light having the first polarization 870A with substantially zero or negligible diffraction, the second in-coupling grating 835-2 may operate in the diffraction state to couple, via diffraction, the second input image light 860 having the second input FOV 863 (e.g., α) into the waveguide 210, as a second in-coupled image light 861 bounded by second in-coupled rays 861a and 861b. For discussion purposes, the second polarization 870B of the second in-coupled image light 861 is presumed to be preserved when the second in-coupled image light 861 propagates inside the waveguide 210.

As the second out-coupling grating 845-2 may be configured to diffract an image light having the second polarization 870B and transmit an image light having the first polarization 870A with substantially zero or negligible diffraction, the second out-coupling grating 845-2 may be configured to operate in the diffraction state to couple, via diffraction, the second in-coupled image light 861 having the second polarization 870B out of the waveguide 210 as a second output image light 862 bounded by second output rays 862a and 862b. For example, the first out-coupling grating 845-1 may be configured to couple, via diffraction, the first in-couped ray 861a out of the waveguide 210 as the second output ray 862a at a third output angle (or a third diffraction angle) and the first in-couped ray 861b out of the waveguide 210 as the second output ray 862b at a fourth output angle (or a fourth diffraction angle). The second output image light 862 may be presumed to have the second polarization 870B. As the first out-coupling grating 845-1 may be configured to diffract an image light having the first polarization 870A and transmit an image light having the second polarization 870B with substantially zero or negligible diffraction, the first out-coupling grating 845-1 may transmit the second output image light 862 having the second polarization 870B toward the eye 260, with substantially zero or negligible diffraction.

In some embodiments, the grating vectors (e.g., the directions of the grating vectors) of the second in-coupling grating 835-2 and second out-coupling grating 845-2 may be configured, such that the second out-coupling grating 845-2 may couple, via diffraction, the second in-coupled image light 861 out of the waveguide 210 as the second output image light 862 propagating toward a second side (e.g., a right side) of the surface normal 880 of the waveguide 210. For example, the third output angle (or the third diffraction angle) of the second output ray 862a may be about −α, and the fourth output angle (or the fourth diffraction angle) of the second output ray 862b may be about zero. In some embodiments, a propagating direction of the second output image light 862 may have an angle of −α/2 with respect to the surface normal 880 of the waveguide 210. In some embodiments, the second output image light 862 may have a second output FOV 864 corresponding to an angular region bounded by the second output rays 862a and 862b. In some embodiments, the second output FOV 864 may have an angular size represented by the angle α. In some embodiments, a symmetric axis 882 of the first output FOV 834 may have an angle of −α/2 with respect to the surface normal 880 of the waveguide 210. That is, the controller 215 may configure the second out-coupling grating 845-2 to operate in the diffraction state to deliver the second output image light 862 having the second output FOV 864 (e.g., α) toward the second side (e.g., a right side) of the surface normal 880 of the waveguide 210. As the second output FOV 864 (e.g., α) is substantially equal to the second input FOV 863 (e.g., α), during the second sub-frame, the eye 260 may perceive a second image 855R that has a substantially same content (and size) as the second image portion 850R (e.g., a right half) of the virtual image 850 displayed by the display element 220.

As shown in FIG. 8C, the input image lights 830 and 860 may have substantially the same input FOV, for example, the symmetry axes of the input FOVs of the input image lights 830 and 860 may be the same, and the angular sizes of the input FOVs of the input image lights 830 and 860 may be the same. In addition, the symmetry axes of the input FOVs of the input image lights 830 and 860 may be perpendicular to the in-coupling element 835. During the display frame of the virtual image 850 displayed by the display element 220, the first output image light 832 having the first output FOV 834 delivered toward the first side of the surface normal 880 of the waveguide 210 by the first out-coupling grating 845-1 during the first sub-frame and the second output image light 862 having the second output FOV 864 delivered toward the second side of the surface normal 880 of the waveguide 210 by the second out-coupling grating 845-2 during the second sub-frame may have a substantially narrow overlapping area (or overlapping FOV portion). An angular size of the overlapping FOV portion may be smaller than a predetermined percentage of the first output FOV 834 (or the second output FOV 864). For example, the predetermined percentage of the first output FOV 834 (or the second output FOV 864) may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%.

Thus, during the display frame of the virtual image 850 displayed by the display element 220, an overall combined output FOV 875 may be substantially equal to a combination of the first output FOV 834 (e.g., α) and the second output FOV 864 (e.g., α). In some embodiments, the overall output FOV 875 may be doubled as compared to the input FOV (e.g., α) 833 shown in FIG. 8A, or the input FOV (e.g., α) 863 shown in FIG. 8B. Accordingly, during the display frame of the virtual image 850 displayed by the display element 220, the eye 260 may perceive an image 855 formed by the first image 855L delivered during the first sub-frame and the second image 855R delivered during the second sub-frame corresponding to the first image portion (e.g., a left half) and the second image portion (e.g., a right half) of the image 855, respectively.

Referring to FIGS. 8A-8C, compared to a conventional waveguide display system (e.g., the conventional waveguide display system 100 shown in FIG. 1A) in which the output FOV 134 is substantially equal to the input FOV 133, through configuring the grating vectors (e.g., relative directions of the grating vectors) of the in-coupling gratings and the out-coupling gratings coupled to the waveguide 210, the optical system 800 may be configured to provide an expanded overall output FOV as compared to the input FOV. For example, the overall output FOV 875 may be two times of the input FOV 833 or 863. In some embodiments, the light source assembly 205 may emit a linearly polarized image light having the first polarization 870A or the second polarization 870B, and the polarizer 851 may be omitted. Accordingly, the power efficiency of the optical system 800 may be improved.

Figure 9A:
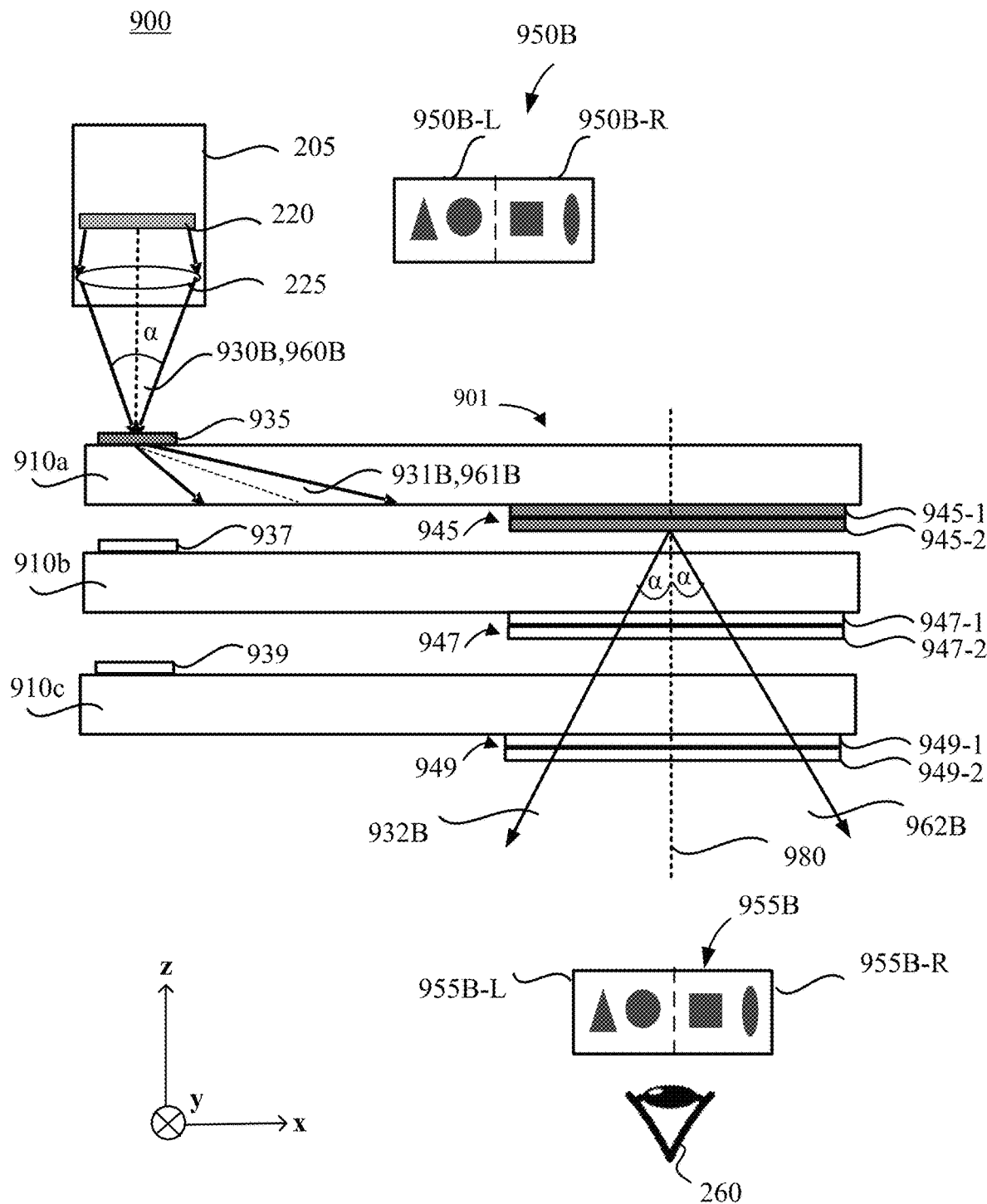
FIGS. 9A-9C illustrate schematic diagrams of an optical system configured to provide an expanded FOV, according to another embodiment of the present disclosure.
Figure 9B:
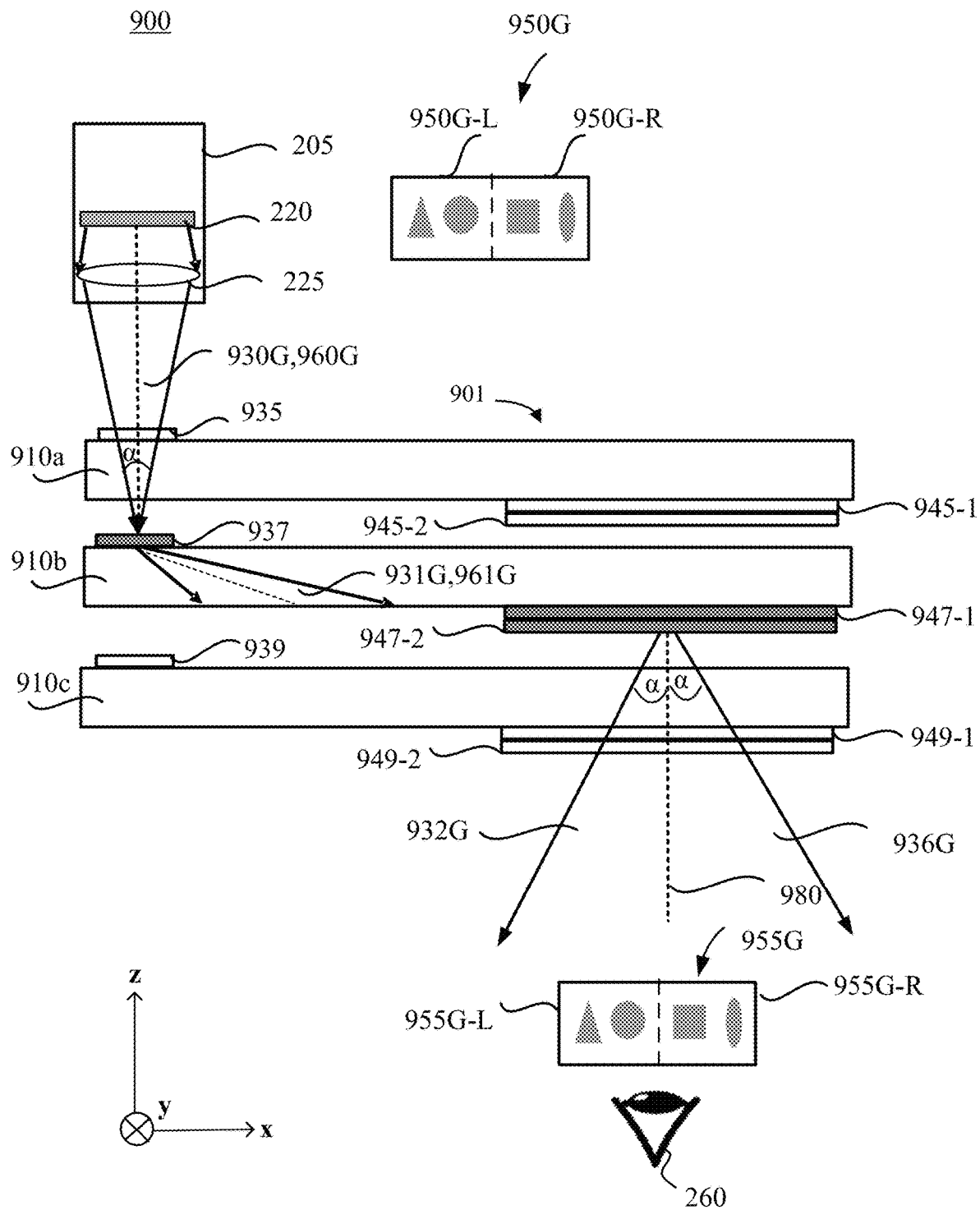
Figure 9C:
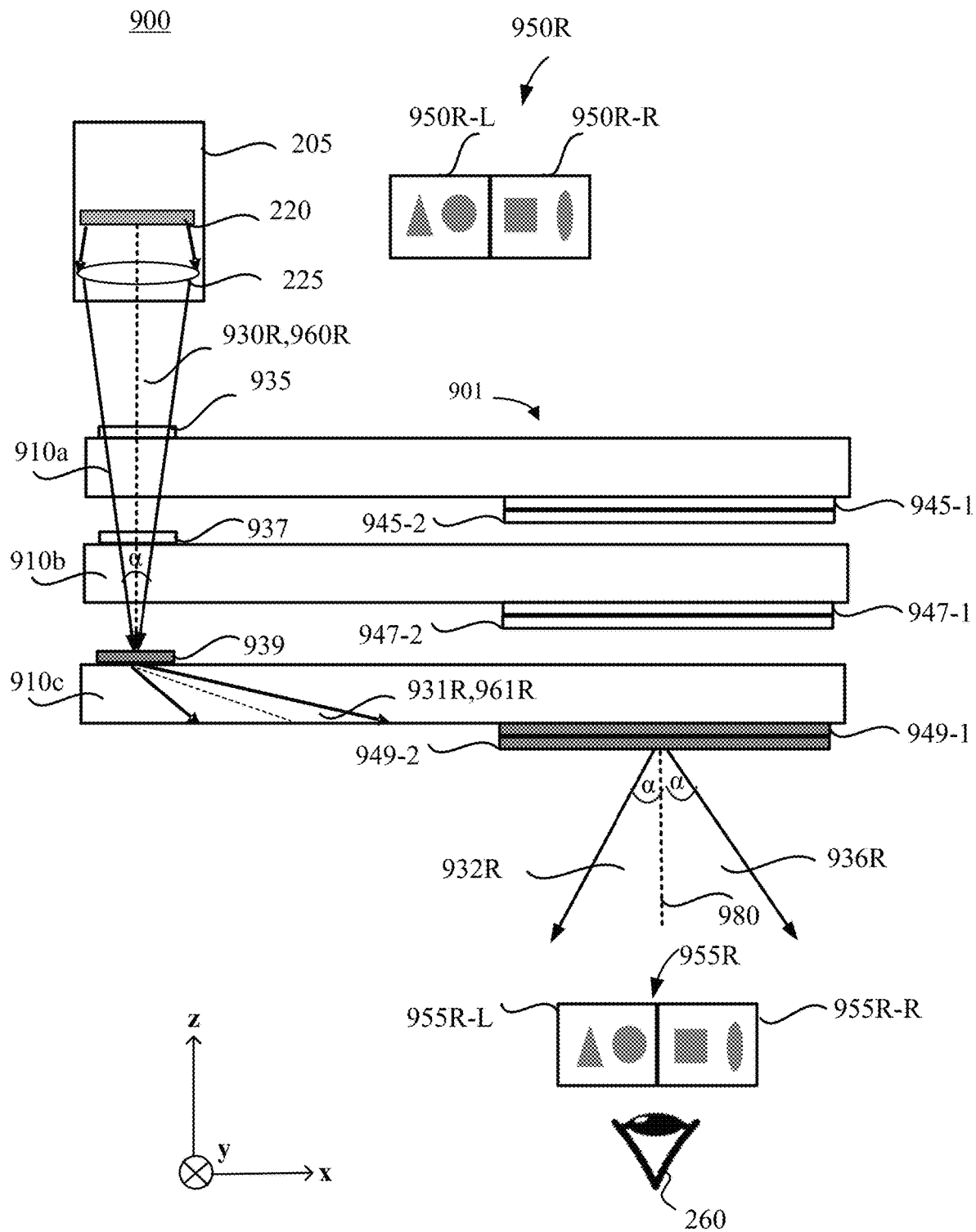

FIGS. 9A-9C illustrate schematic diagrams of an optical system 900 configured to provide an increased overall output FOV, according to an embodiment of the present disclosure. The optical system 900 may include a waveguide display system. The optical system 900 may include elements that are similar to or the same as those included in other optical systems disclosed herein and shown in other figures. Features shown in other figures, even if not explicitly described below for the simplicity of discussion, may also be applicable to the embodiment shown in FIGS. 9A-9C. Descriptions of the same or similar elements or features can refer to the above corresponding descriptions, including those rendered in connection with FIGS. 2-8C.

As shown in FIGS. 9A-9C, the optical system 900 may include the light source assembly 205, which may include the light source 220 and the light conditioning system 225. The optical system 900 may also include a waveguide stack 901 and the controller 215. The waveguide stack 901 may include a plurality of waveguides stacked together, and may be configured to deliver single-color images of different colors in a time-multiplexing manner. For illustrative purposes, three waveguides 910a, 910a, and 910c are shown. Other suitable number of waveguides may be used, such as two, four, five, six, etc. In some embodiments, for a wave guiding to occur in the waveguides, the waveguides may be separated by air gaps. In some embodiments, the air gaps between the neighboring waveguides may be at least partially filled with a material (e.g., a liquid glue) having a refractive index lower than that of the waveguides. At least one (e.g., each) of the waveguides (910a, 910b, and 910c) may be coupled with an in-coupling element (935, 937, or 939) and an out-coupling element (945, 947, or 949).

The in-coupling element (935, 937, or 939) may be configured to couple an image light received from the light source assembly 205 into the waveguide as an in-coupled image light. The out-coupling element (945, 947, or 949) may be configured to couple the in-coupled image light out of the waveguide toward the eye 260. At least one (e.g., each) of the in-coupling elements (935, 937, and 939) may include a directly switchable grating disclosed herein. At least one (e.g., each) of the out-coupling elements (945, 947, and 949) may include a plurality of directly switchable gratings disclosed herein. A waveguide (910*a*, 910*b*, or 910*c*), the corresponding in-coupling element (935, 937, or 939) and out-coupling element (945, 947, or 949) disposed at the waveguide may form a waveguide display assembly. In the embodiments shown in FIGS. 9A-9C, the optical system 900 may include three waveguide display assemblies.

In some embodiments, the gratings coupled with the respective waveguide (910*a*, 910*b*, or 910*c*) may be configured for a respective operation wavelength range. For example, the waveguide 910*a* may be coupled with an in-coupling grating 935 and two out-coupling gratings 945-1 and 945-2 configured for a wavelength band corresponding to the first primary color (e.g., blue). The waveguide 910*b* may be coupled with an in-coupling grating 937 and two out-coupling gratings 947-1 and 947-2 configured for a wavelength band corresponding to the second primary color (e.g., green). The waveguide 910*c* may be coupled with an in-coupling grating 939 and two out-coupling gratings 949-1 and 949-2 configured for a wavelength band corresponding to the third primary color (e.g., red).

The optical system 900 may be configured to deliver a polychromatic image (e.g., a full-color image) with an expanded overall output FOV to an eyebox of the optical system 900. In some embodiments, a display image of a polychromatic image generated by the light source assembly 205 may include six sub-frames. The polychromatic image may be a virtual image. The polychromatic image may be separated into three single-color images 950B, 950G, and 950R. The controller 215 may control the display element 220 to display single-color images 950B, 950G, and 950R of different primary colors (e.g., red, green, and blue) in a time-multiplexing manner (e.g., in consecutive sub-frames). Each single-color image 950B, 950G, or 950R may be spatially divided into a first image portion (e.g., a left half) and a second image portion (e.g., a right half) having a substantially same (or equal) size. The first image portion and the second image portion may be associated with input image lights having a substantially same input FOV (e.g., an input FOV). In addition, when displaying a single-color image 950B, 950G, or 950R of a predetermined primary color (e.g., red, green, or blue), the controller 215 may control the display element 220 to display the first image portion and the second image portion of the single-color image 950B, 950G, or 950R in a time-multiplexing manner, i.e., in two consecutive sub-frames, similar to the embodiments described above in connection with FIGS. 7A-7C.

Similar to the operational principles for sequential transmission of the first image portion 750L and the second image portion 750R of the virtual image 750 in two consecutive sub-frames as shown in FIGS. 7A-7C, in the embodiments shown in FIGS. 9A-9C, through configuring the grating vectors of the in-coupling grating and the out-coupling grating in respective set of coupling gratings, the respective waveguide display assembly (a respective waveguide and a corresponding set of coupling gratings) may be configured to deliver a single-color image 950B, 950G, or 950R of a respective primary color (e.g., red, green, or blue) and with an expanded overall output FOV (e.g., doubled as compared to the input FOV) to the eyebox of the optical system 900, during a respective set of two consecutive sub-frames. For example, during a first set of two consecutive sub-frames, the first waveguide display assembly (formed by the waveguide 910*a* and a set of coupling gratings 935 and 945) may be configured to deliver a single-color image 950B of a first primary color (e.g., blue) and having an expanded overall output FOV (e.g., doubled as compared to the input FOV) to the eyebox.

During a second set of two consecutive sub-frames (e.g., a third sub-frame and a fourth sub-frame), the second waveguide display assembly (formed by the waveguide 910*b* and a set of coupling gratings 937 and 947) may be configured to deliver a single-color image 950G of a second primary color (e.g., green) and having an expanded overall output FOV (e.g., doubled as compared to the input FOV) to the eyebox. During a third set of two consecutive sub-frames (e.g., a fifth sub-frame and a sixth sub-frame), the third waveguide display assembly (formed by the waveguide 910*c* and a set of coupling gratings 939 and 949) may be configured to deliver a single-color image 950R of a third primary color (e.g., red) and having an expanded overall output FOV to the eyebox. Thus, during the entire display frame including the first sub-frame to the sixth sub-frame, a polychromatic image (e.g., a full-color image) with an expanded overall output FOV (e.g., doubled as compared to the input FOV) may be delivered to the eyebox.

For example, as shown in FIG. 9A, during the first sub-frame and the second sub-frame, the display element 220 may display the single-color image 950B of a first primary color, e.g., blue. During the first sub-frame, the controller 215 may control the display element 220 to display a first image portion 950B-L having an image portion size (e.g., ½ of the image size of the blue image 950B). The light source assembly 205 may output a first image light 930B having an input FOV (e.g., having an angular size represented by the angle α). The first image light 930B may be generated by the full light-generating area of the display element 220.

The controller 215 may configure the in-coupling grating 935 and the out-coupling grating 945-1 coupled with the waveguide 910*a* to operate in a diffraction state, and configure the remaining in-coupling and out-coupling gratings to operate in a non-diffraction state. Thus, the in-coupling grating 935 may couple, via diffraction, the first input image light 930B into the waveguide 910*a* as a first in-coupled image light 931B. The out-coupling grating 945-1 may couple the first in-coupled image light 931B out of the waveguide 910*a* as a first output image light 932B propagating toward a first side (e.g., a left side) of a surface normal 980 of the waveguide 910*a*. In some embodiments, the first output image light 932B may have an output FOV having an angular size that is substantially equal to the angular size of the input FOV of the first input image light 930B. For example, the output FOV of the first output image light 932B may have an angular size represented by the angle α.

During the second sub-frame, the controller 215 may be configured to control the display element 220 to display a second image portion 950B-R having an image portion size (e.g., ½ of the image size of the blue image 950B). The light source assembly 205 may output a second image light 960B having the input FOV that is the same as the input FOV of the first image light 930B (e.g., having an angular size represented by the angle α). The second image light 960B may be generated by the full light-generating area of the display element 220. The controller 215 may configure the in-coupling grating 935 and the out-coupling grating 945-2 coupled with the waveguide 910*a* to operate in a diffraction state, and configure the remaining in-coupling and out-coupling gratings to operate in a non-diffraction state. Thus, the in-coupling grating 935 may couple, via diffraction, the second input image light 960B into the waveguide 910*a* as a second in-coupled image light 961B. The out-coupling grating 945-2 may couple the second in-coupled image light 961B out of the waveguide 910*a* as a second output image light 962B propagating toward a second side (e.g., a right side) of the surface normal 980 of the waveguide 910*a*. In some embodiments, the second output image light 962B may have an output FOV having an angular size that is substantially equal to the angular size of the input FOV of the second input image light 960B. For example, the output FOV of the second output image light 962B may have an angular size represented by the angle α.

Thus, during the first sub-frame and the second sub-frame, a combination of the first output image light 932B and the second output image light 962B may be delivered to the eyebox via the in-coupling grating 935, the waveguide 910*a*, and the out-coupling gratings 945-1 and 945-2. The overall output FOV, which is a combination of the first output image light 932B and the second output image light 962B, may be doubled as compared to the input FOV. The eye 260 may perceive a single-color (blue) image 955B associated with an output image light having the increased overall output FOV (e.g., which is doubled as compared to the input FOV).

As shown in FIG. 9B, during the third sub-frame and the fourth sub-frame, the display element 220 may display a single-color image 950G of a second primary color, e.g., green. During the third sub-frame, the controller 215 may control the display element 220 to display a first image portion 950G-L having an image portion size (e.g., ½ of the image size of the green image 950G). The light source assembly 205 may output a third image light 930G having the input FOV (e.g., having an angular size represented by the angle α). The third image light 930G may be generated by the full light-generating area of the display element 220.

The controller 215 may configure the in-coupling grating 937 and the out-coupling grating 947-1 coupled with the waveguide 910*b* to operate in a diffraction state, and configure the remaining in-coupling and out-coupling gratings to operate in a non-diffraction state. Thus, the in-coupling grating 937 may couple, via diffraction, the third input image light 930G into the waveguide 910*b* as a third in-coupled image light 931G. The out-coupling grating 947-1 may couple the third in-coupled image light 931G out of the waveguide 910*b* as a third output image light 932G propagating toward a first side (e.g., a left side) of a surface normal 980 of the waveguide 910*b*. In some embodiments, the third output image light 932G may have an output FOV having an angular size that is substantially equal to the angular size of the input FOV of the third input image light 930G. For example, the output FOV of the third output image light 932G may have an angular size represented by the angle α.

During the fourth sub-frame, the controller 215 may be configured to control the display element 220 to display a second image portion 950G-R having an image portion size (e.g., ½ of the image size of the green image 950G). The light source assembly 205 may output a fourth image light 960G having the input FOV (e.g., having an angular size represented by the angle α). The fourth image light 960G may be generated by the full light-generating area of the display element 220. The controller 215 may configure the in-coupling grating 937 and the out-coupling grating 947-2 coupled with the waveguide 910*b* to operate in a diffraction state, and configure the remaining in-coupling and out-coupling gratings to operate in a non-diffraction state. Thus, the in-coupling grating 937 may couple, via diffraction, the fourth input image light 960G into the waveguide 910*b* as a fourth in-coupled image light 961G. The out-coupling grating 947-2 may couple the fourth in-coupled image light 961G out of the waveguide 910*b* as a fourth output image light 962G propagating toward a second side (e.g., a right side) of the surface normal 980 of the waveguide 910*b*. In some embodiments, the fourth output image light 962G may have an output FOV having an angular size that is substantially equal to the angular size of the input FOV of the fourth input image light 960G. For example, the output FOV of the fourth output image light 962G may have an angular size represented by the angle α.

Thus, during the third sub-frame and the fourth sub-frame, a combination of the third output image light 932G and the fourth output image light 962G may be delivered to the eyebox via the in-coupling grating 937, the waveguide 910*b*, and the out-coupling gratings 947-1 and 947-2. The overall output FOV, which is the combination of the third output image light 932G and the fourth output image light 962G, may be doubled as compared to the input FOV. The eye 260 may perceive a single-color (green) image 955G associated with an output image light having the increased overall output FOV (e.g., which is doubled as compared to the input FOV).

As shown in FIG. 9C, during the fifth sub-frame and the sixth sub-frame, the display element 220 may display a single-color image 950R of a third primary color, e.g., red. During the fifth sub-frame, the controller 215 may control the display element 220 to display a first image portion 950R-L having the image portion size (e.g., ½ of the image size of the red image 950R). The light source assembly 205 may output a fifth image light 930R having the input FOV (e.g., having an angular size represented by the angle α). The fifth image light 930R may be generated by the full light-generating area of the display element 220. The controller 215 may configure the in-coupling grating 939 and the out-coupling grating 949-1 coupled with the waveguide 910*c* to operate in a diffraction state, and configure the remaining in-coupling and out-coupling gratings to operate in a non-diffraction state. Thus, the in-coupling grating 939 may couple, via diffraction, the fifth input image light 930R into the waveguide 910*c* as a fifth in-coupled image light 931R. The out-coupling grating 949-1 may couple the fifth in-coupled image light 931R out of the waveguide 910*c* as a fifth output image light 932R propagating toward a first side (e.g., a left side) of a surface normal 980 of the waveguide 910*c*. In some embodiments, the fifth output image light 932R may have an output FOV having an angular size that is substantially equal to the angular size of the input FOV of the fifth input image light 930R. For example, the output FOV of the fifth output image light 932R may have an angular size represented by the angle α.

During the sixth sub-frame, the controller 215 may be configured to control the display element 220 to display a second image portion 950R-R having the image portion size (e.g., ½ of the image size of the red image 950R). The light source assembly 205 may output a sixth image light 960R having the input FOV (e.g., having an angular size represented by the angle α). The sixth image light 960R may be generated by the full light-generating area of the display element 220. The controller 215 may configure the in-coupling grating 939 and the out-coupling grating 949-2 coupled with the waveguide 910*c* to operate in a diffraction state, and configure the remaining in-coupling and out-coupling gratings to operate in a non-diffraction state. Thus, the in-coupling grating 939 may couple, via diffraction, the sixth input image light 960R into the waveguide 910*c* as a sixth in-coupled image light 961R. The out-coupling grating 949-2 may couple the sixth in-coupled image light 961R out of the waveguide 910*c* as a sixth output image light 962R propagating toward a second side (e.g., a right side) of the surface normal 980 of the waveguide 910*c*. In some embodiments, the sixth output image light 962R may have an output FOV having an angular size that is substantially equal to the angular size of the input FOV of the sixth input image light 960R. For example, the output FOV of the sixth output image light 962R may have an angular size represented by the angle α.

Thus, during the fifth sub-frame and the sixth sub-frame, a combination of the fifth output image light 932R and the sixth output image light 962R may be delivered to the eyebox via the in-coupling grating 939, the waveguide 910*c*, and the out-coupling gratings 949-1 and 949-2. The overall output FOV, which is the combination of the fifth output image light 932R and the sixth output image light 962R, may be doubled as compared to the input FOV. The eye 260 may perceive a single-color (red) image 955R associated with an output image light having the increased overall output FOV (e.g., which is doubled as compared to the input FOV).

Referring to FIGS. 9A-9C, during the entire display frame including the first sub-frame to the sixth sub-frame, a sequential transmission of image lights of different colors (e.g., blue, green, red) and expanded overall output FOVs may be realized. A final image may be perceived by the eye 260 as a polychromatic image with an expanded overall output FOV. In some embodiments, the operation wavelength spectra of the gratings coupled to one waveguide (e.g., 910*a*, 910*b*, or 910*c*) may be configured to be substantially non-overlapping with the operation wavelength spectra of the gratings coupled to another waveguide (e.g., 910*a*, 910*b*, or 910*c*). For example, the operation wavelength spectra of the gratings (e.g., the in-coupling grating 935 and out-coupling gratings 945-1 and 945-2) coupled to the waveguide 910*a*, the gratings (e.g., the in-coupling grating 937 and out-coupling gratings 947-1 and 947-2) coupled to the waveguide 910*b*, and the gratings (e.g., the in-coupling grating 939 and out-coupling gratings 949-1 and 949-2) coupled to the waveguide 910*c* may be substantially non-overlapping with one another, such that the crosstalk between the out-coupling gratings and the crosstalk between the in-coupling gratings may be minimized or reduced. That is, in some embodiments, the out-coupling gratings (945-1 and 945-2, 947-1 and 947-2, 949-1 and 949-2) and the in-coupling gratings (935, 937, and 939) may each have a predetermined wavelength selectivity, e.g., the gratings may diffract incoming lights within a predetermined wavelength band or range and transmit incoming lights outside of the predetermined wavelength band with substantially zero or negligible diffraction. For example, each of the out-coupling gratings (945-1 and 945-2, 947-1 and 947-2, 949-1 and 949-2) and the in-coupling gratings (935, 937, and 939) may be fabricated to operate in a Bragg regime to have a predetermined wavelength selectivity.

In some embodiments, when the in-coupling gratings (935, 937, and 939) are substantially wavelength selective, non-switchable gratings may be used as the in-coupling gratings (935, 937, and 939) in the optical system 900. In some embodiments, when the out-coupling gratings (945-1 and 945-2, 947-1 and 947-2, 949-1 and 949-2) and the in-coupling gratings (935, 937, and 939) are wavelength selective, the optical system 900 may be configured to simultaneously deliver the first image portions (e.g., 950B-L, 905G-L, and 950R-L) of the single-color images (e.g., 950B, 905G, and 950R) of different colors in a first sub-frame, and simultaneously deliver the second image portions (e.g., 950B-R, 905G-R, and 950R-R) of the single-color images (e.g., 950B, 905G, and 950R) of different colors in a second sub-frame. That is, the display frame of the polychromatic image formed by the single-color images 950B, 950G, and 950R may be divided into two sub-frames. Thus, during the two sub-frames, the polychromatic image light having an increased overall output FOV may be output to the eyebox to be perceived by the eye 265. When the number of the sub-frames into which the display frame is divided is reduced from six to two, and out-coupling gratings (945-1 and 945-2, 947-1 and 947-2, 949-1 and 949-2) with a slower switching speed may be used.

Figure 10A:
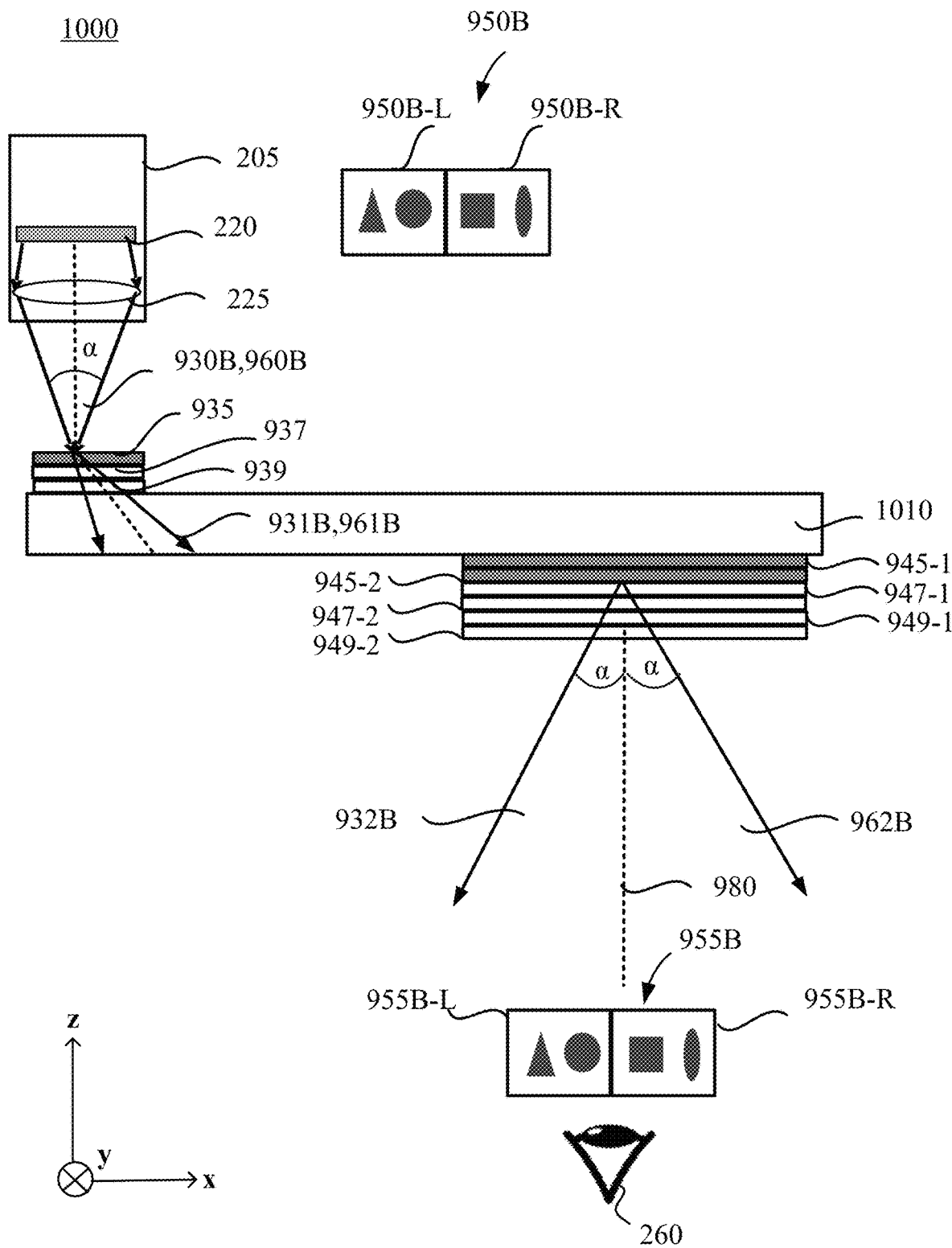
FIGS. 10A-10C illustrate schematic diagrams of an optical system configured to provide an expanded FOV, according to another embodiment of the present disclosure.
Figure 10B:
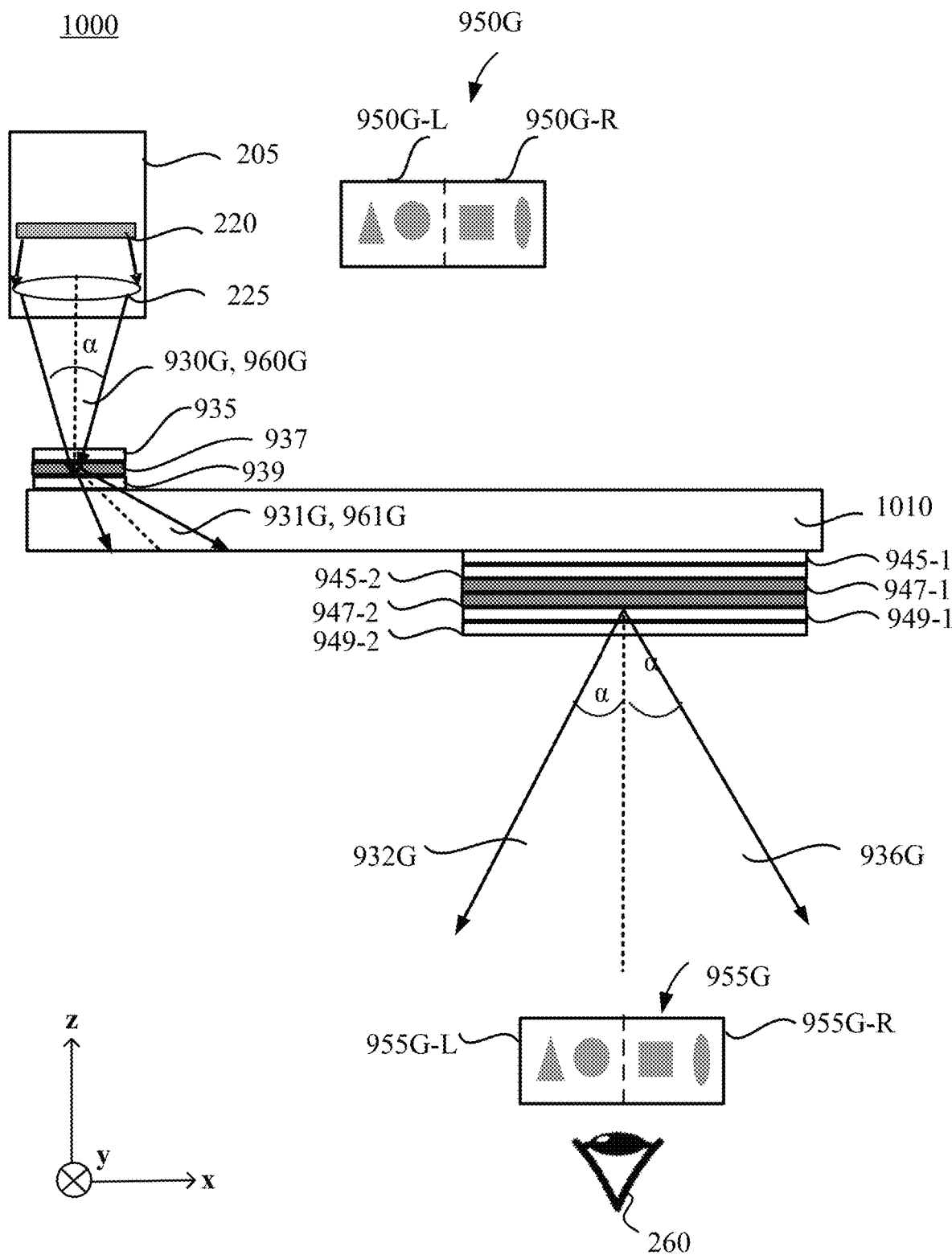
Figure 10C:
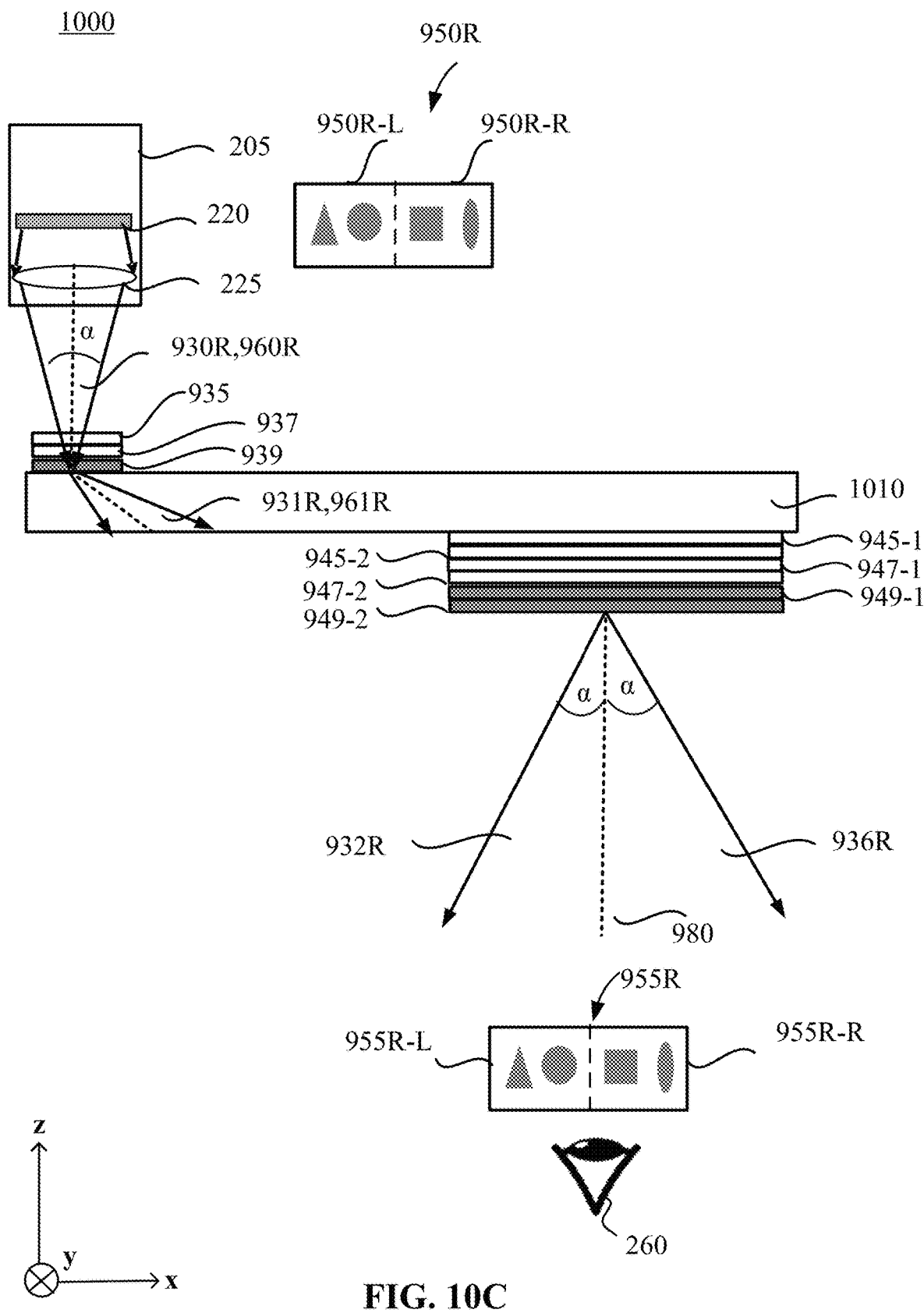

In some embodiments, instead of being disposed at the respective waveguides in the waveguide stack 901, the in-coupling gratings 935, 937, and 939 may be stacked and attached to a common (e.g., a single) waveguide, and the out-coupling gratings 945-1 and 945-2, 947-1 and 947-2, 949-1 and 949-2 may be stacked and attached to the same common waveguide. An exemplary structure is shown in FIGS. 10A-10C. The stack of the in-coupling gratings and the stack of the out-coupling gratings may both be disposed at the first surface or the second surface of a common, single waveguide 1010, or may be disposed at the first surface and the second surface, respectively. Descriptions of the operation scheme for realizing a time-sequential transmission of the image lights of different colors and an expanded overall output FOV as compared to the input FOV may refer to the descriptions rendered above in connection with FIGS. 9A-9C. The embodiments shown in FIGS. 9A-10C may be used for delivering monochromatic image lights. For color images, the image lights of different colors may be spatially and/or temporally multiplexed. In some embodiments, the number of waveguides in the stack may be reduced from three to two. For separate transmission of image lights of different colors, one waveguide may be configured for red and green and the other waveguide may be configured for green and blue.

FIGS. 7A-10C illustrate the principle for providing an increased overall output FOV (e.g., two times of the input FOV). The principle is described using doubling the input FOV as an example. The same principle may be applied to triple, quadruple, etc., the input FOV to obtain an increased output FOV. FIGS. 11A-11D illustrate schematic diagrams of an optical system 1100 configured to provide an increased overall output FOV, according to another embodiment of the present disclosure. The optical system 1100 may be referred to as a waveguide display system 1100. The optical system 1100 may include elements that are similar to or the same as those included in other optical systems disclosed herein and shown in other figures. Features shown in other figures, even if not explicitly described below for the simplicity of discussion, may also be applicable to the embodiment shown in FIGS. 11A-11D. Descriptions of the same or similar elements or features can refer to the above corresponding descriptions, including those rendered in connection with FIGS. 2-10C.

As shown in FIGS. 11A-11D, the optical system 1100 may include the light source assembly 205, the waveguide 210, and the controller 215. The light source assembly 205 may include the light source 220 and the light conditioning system 225. An in-coupling element 1135 and an out-coupling element 1145 may be coupled to the waveguide 210. In the embodiment shown in FIGS. 11A-11D, the in-coupling element 1135 may include one in-coupling grating (also referred to as 1135 for discussion purposes) that may be a switchable or a non-switchable grating. The out-coupling element 1145 may include a first out-coupling grating 1145-1, a second out-coupling grating 1145-2, and a third out-coupling grating 1145-3 stacked together, at least one (e.g., each) of which may be a directly switchable grating.

An in-coupling grating 1135 and an out-coupling grating 1145-1, 1145-2, or 1145-3 operating in a diffraction state to direct the image light into and out of the waveguide 210 may be referred to as a set of coupling gratings. In some embodiments, the in-coupling grating 1135 and the first out-coupling grating 1145-1 may form a first set of coupling gratings. The in-coupling grating 1135 and the second out-coupling grating 1145-2 may form a second set of coupling gratings. The in-coupling grating 1135 and the third out-coupling grating 1145-3 may form a third set of coupling gratings. That is, the first to third set of coupling gratings may share a common in-coupling grating 1135.

A vector sum of the in-plane projections of the grating vectors associated with the in-coupling grating 1135 and the first out-coupling grating 1145-1 of the first set may be a first vector sum. A vector sum of the in-plane projections of the grating vectors associated with the in-coupling grating 1135 and the second out-coupling grating 1145-2 of the second set may be a second vector sum. A vector sum of the in-plane projections of the grating vectors associated with the in-coupling grating 1135 and the third out-coupling grating 1145-3 of the third set may be a third vector sum. At least one of the first vector sum, the second vector sum, or the third vector sum may be a non-null vector. In some embodiments, at least two of the first vector sum, the second vector sum, or the third vector sum may be a non-null vector, and the remaining one of the first vector sum, the second vector sum, or the third vector sum may be a null vector. For example, in the embodiment shown in FIGS. 11A-11D, the first vector sum and the third vector sum may be non-null vectors. In other words, the in-plane projections of the grating vectors of the in-coupling grating 1135 and the first out-coupling grating 1145-1 may be unequal to one another, and the in-plane projections of the grating vectors of the in-coupling grating 1135 and the third out-coupling grating 1145-3 may be unequal to one another.

In some embodiments, directions of the first vector sum and the third vector sum may be different from one another, e.g., the directions of the first vector sum and the third vector sum may be anti-parallel. For example, one of the first vector sum and the third vector sum may be a vector with a positive direction (e.g., a +x-axis direction), and the other may be a vector with a negative direction (e.g., a −x-axis direction). In some embodiments, magnitudes of the first vector sum and the third vector sum may be different from one another. In some embodiments, magnitudes of the first vector sum and the third vector sum may be substantially the same. In some embodiments, the second vector sum may be a null vector. In other words, the in-plane projections of the grating vectors of the in-coupling grating 1135 and the second out-coupling grating 1145-2 may have anti-parallel directions and a substantially same magnitude.

In some embodiments, at least two of the first out-coupling grating 1145-1, the second out-coupling grating 1145-2, or the third out-coupling grating 1145-3 may be gratings having slanted microstructures (e.g., slant gratings). For example, the first out-coupling grating 1145-1 and the third out-coupling grating 1145-3 may be gratings having slanted microstructures, and the second out-coupling grating 1145-2 may be a grating having non-slanted microstructures. In some embodiments, the in-coupling grating 1135 may be a grating having non-slanted microstructures (e.g., a non-slant grating). The in-plane projections of the grating vectors of the first out-coupling grating 1145-1, the second out-coupling grating 1145-2, and the third out-coupling grating 1145-3 may be different in at least one of the direction or the magnitude.

In some embodiments, the directions of the in-plane projections of the grating vectors of the first out-coupling grating 1145-1, the second out-coupling grating 1145-2, and the third out-coupling grating 1145-3 may be substantially parallel to one another, and the magnitudes of the in-plane projections of the grating vectors of the first out-coupling grating 1145-1, the second out-coupling grating 1145-2, and the third out-coupling grating 1145-3 may be different from one another. For example, the grating periods of the first out-coupling grating 1145-1, the second out-coupling grating 1145-2, and the third out-coupling grating 1145-3 may be different from one another, and the slant angles of the first out-coupling grating 1145-1, the second out-coupling grating 1145-2, and the third out-coupling grating 1145-3 may be substantially the same.

In some embodiments, the grating periods of the in-coupling grating 1135 and the second out-coupling grating 1145-2 may be substantially the same, and the grating periods of the in-coupling grating 1135, the first out-coupling grating 1145-1, and the third out-coupling grating 1145-3 may be different from one another. For example, the grating period of one of the first out-coupling grating 1145-1 and the third out-coupling grating 1145-3 may be larger than the grating period of the in-coupling grating 1135, and the grating period of the other one of the first out-coupling grating 1145-1 and the third out-coupling grating 1145-3 may be smaller than the grating period of the in-coupling grating 1135.

In some embodiments, the grating periods of the first out-coupling grating 1145-1, the second out-coupling grating 1145-2, and the third out-coupling grating 1145-3 may be substantially the same, and the slant angles of the first out-coupling grating 1145-1, the second out-coupling grating 1145-2, and the third out-coupling grating 1145-3 may have different absolute values and the same sign. In some embodiments, the slant angles of the in-coupling grating 1135, the first out-coupling grating 1145-1, and the third out-coupling grating 1145-3 may have different absolute values and the same sign. For example, the slant angle of one of the first out-coupling grating 1145-1 and the third out-coupling grating 1145-3 may be larger than the slant angle of the in-coupling grating 1135, and the slant angle of the other one of the first out-coupling grating 1145-1 and the third out-coupling grating 1145-3 may be smaller than the slant angle of the in-coupling grating 1135.

In some embodiments, at least two directions of the in-plane projections of the grating vectors of the first out-coupling grating 1145-1, the second out-coupling grating 1145-2, and the third out-coupling grating 1145-3 may be different from one another. For example, the directions of the in-plane projections of the grating vectors of the first out-coupling grating 1145-1 and the third out-coupling grating 1145-3 may be anti-parallel to one another. The direction of the in-plane projection of the grating vector of the second out-coupling grating 1145-2 may be substantially parallel to the direction of the in-plane projection of the grating vector of one of the first out-coupling grating 1145-1 and the third out-coupling grating 1145-3, and anti-parallel to the direction of the in-plane projection of the grating vector of the other one of the first out-coupling grating 1145-1 and the third out-coupling grating 1145-3. In some embodiments, the direction of the in-plane projection of the grating vector of the second out-coupling grating 1145-2 may be anti-parallel to the direction of the in-plane projection of the grating vector of the in-coupling grating 1135.

In some embodiments, at least two magnitudes of the in-plane projections of the grating vectors of the first out-coupling grating 1145-1, the second out-coupling grating 1145-2, and the third out-coupling grating 1145-3 may be different from one another. For example, the magnitudes of the in-plane projections of the grating vectors of the first out-coupling grating 1145-1 and the third out-coupling grating 1145-3 may be substantially the same, and may be different from the magnitude of the in-plane projection of the grating vector of the in-coupling grating 1135. The magnitude of the in-plane projection of the grating vector of the second out-coupling grating 1145-2 may be substantially the same as the magnitude of the in-plane projection of the grating vector of the in-coupling grating 1135.

In some embodiments, the magnitudes of the in-plane projections of the grating vectors of the first out-coupling grating 1145-1, the second out-coupling grating 1145-2, and the third out-coupling grating 1145-3 may be different from one another. For example, the magnitude of the in-plane projection of the grating vector of the second out-coupling grating 1145-2 may be substantially the same as the magnitude of the in-plane projection of the grating vector of the in-coupling grating 1135, the magnitude of the in-plane projection of the grating vector of the first out-coupling grating 1145-1 may be smaller than the magnitude of the in-plane projection of the grating vector of the in-coupling grating 1135, and the magnitude of the in-plane projection of the grating vector of the third out-coupling grating 1145-3 may be larger than the magnitude of the in-plane projection of the grating vector of the in-coupling grating 1135.

In some embodiments, the grating periods of the first out-coupling grating 1145-1, the second out-coupling grating 1145-2, and the third out-coupling grating 1145-3 may be substantially the same, and the slant angles of the first out-coupling grating 1145-1, the second out-coupling grating 1145-2, and the third out-coupling grating 1145-3 may be different from one another. In some embodiments, the slant angles of the first out-coupling grating 1145-1 and the third out-coupling grating 1145-3 may have substantially the same absolute value and opposite signs. For example, the slant angle of one of the first out-coupling grating 1145-1 and the third out-coupling grating 1145-3 may be a positive slant angle (e.g., +β), and the slant angle of the other one of the first out-coupling grating 1145-1 and the third out-coupling grating 1145-3 may be a negative slant angle (e.g., −β).

In some embodiments, the absolute value of the slant angle of the second out-coupling grating 1145-2 may be substantially the same as the absolute value of the slant angle of the in-coupling grating 1135, and the absolute value of the slant angle of the first out-coupling grating 1145-1 (or the third out-coupling grating 1145-3) may be different from the absolute value of the slant angle of the in-coupling grating 1135. In some embodiments, the slant angles of the first out-coupling grating 1145-1 and the third out-coupling grating 1145-3 may have different absolute values and opposite signs. For example, the absolute value of the slant angle of the second out-coupling grating 1145-2 may be substantially the same as the absolute value of the slant angle of the in-coupling grating 1135, the absolute value of the slant angle of one of the first out-coupling grating 1145-1 and the third out-coupling grating 1145-3 may be larger than the absolute value of the slant angle of the in-coupling grating 1135, and the absolute value of the slant angle of the other one of the first out-coupling grating 1145-1 and the third out-coupling grating 1145-3 may be smaller than the absolute value of the slant angle of the in-coupling grating 1135.

The display element 220 may be configured to display a plurality of image portions of a virtual image 1150. The virtual image 1150 may be spatially divided (e.g., equally divided) into three image portions (e.g., a first or left image portion 1150L, a second or middle image portion 1150M, and a third or right image portion 1150R). In some embodiments, each of the first image portion 1150L, the second image portion 1150M, and the third image portion 1150R may have a predetermined equal image portion size (e.g., an equal diagonal length). In some embodiments, the image portion size of the first image portion 1150L, the second image portion 1150M, or the third image portion 1150R may substantially correspond to a size of a full light-generating area of the display element 220 (e.g., a full light-generating area of the display panel included in the display element 220 or a full scanning range or area of the laser scanner when the display element 220 includes a laser scanning display panel).

Figure 11A:
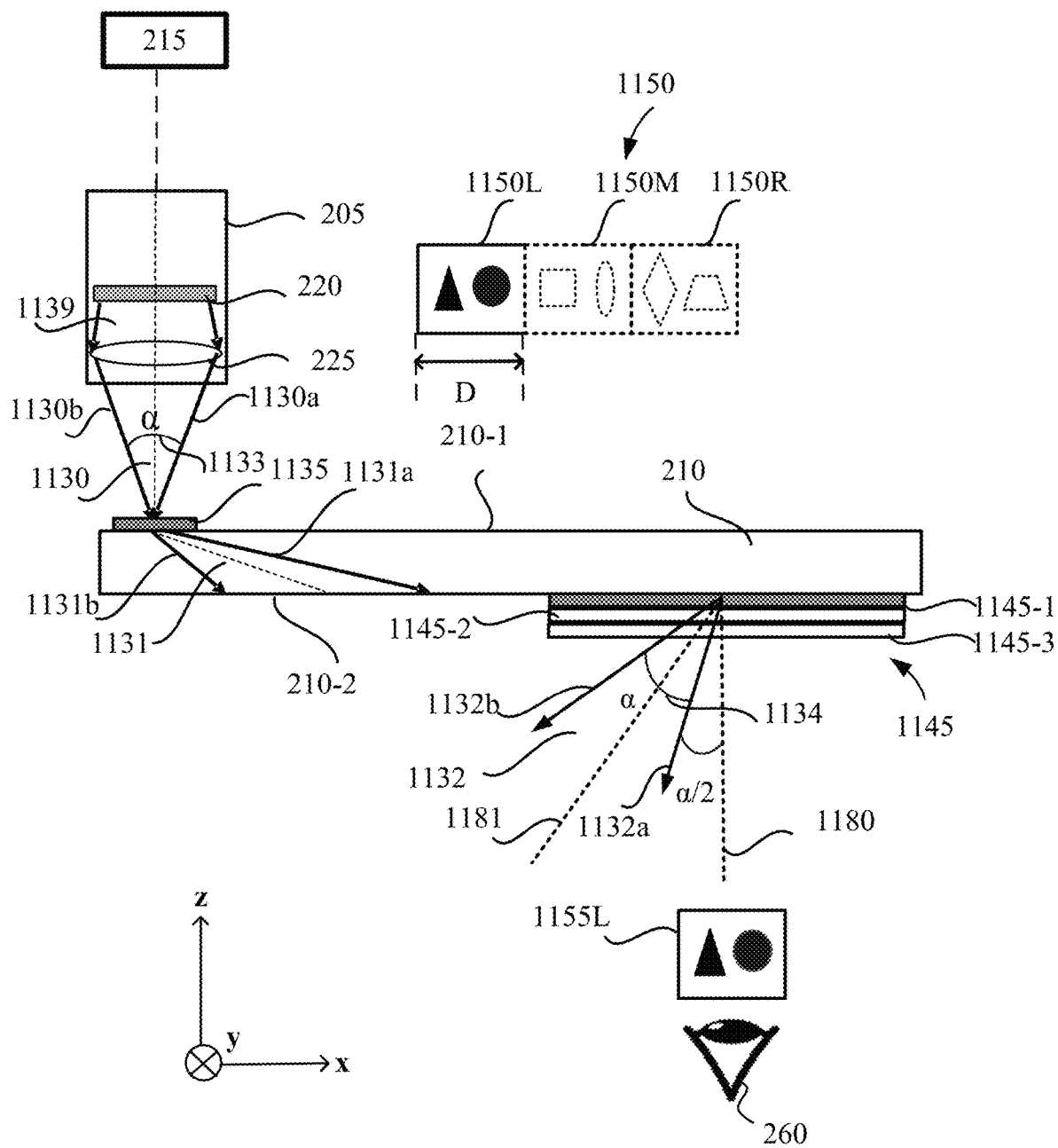
FIGS. 11A-11D illustrate schematic diagrams of an optical system configured to provide an expanded FOV, according to another embodiment of the present disclosure.

A display frame of the virtual image 1150 displayed by the display element 220 may be divided into or may include three consecutive sub-frames. During a first sub-frame, as shown in FIG. 11A, the controller 215 may control the light source assembly 205 to output a first input image light 1130 representing a first image portion 1150L and having a first input FOV 1133 toward an input region of the waveguide 210. The first image portion 1150L may have an image portion size (e.g., ⅓ of the image size of the virtual image 1150). For example, the controller 215 may control the display element 220 to output a first image light 1139 corresponding to, base on, or representing the first image portion 1150L. The first image light 1139 may be generated by the full light-generating area of the display element 220. The first image light 1139 may be an unpolarized image light or a polarized image light. The light conditioning system 225 may transform a linear distribution of pixels in the first image portion 1150L of the virtual image 1150 into an angular distribution of pixels, and output a first input image light 1130 having a first input FOV 1133 toward an input region of the waveguide 210. In some embodiments, the first input FOV 1133 may have an angular size represented by the angle α. The first input image light 1130 having the first input FOV 1133 (e.g., α) may be bounded by first input rays 1130a and 1130b. For example, the first input ray 1130a may be the rightmost ray of the first input image light 1130, and the first input ray 1130b may be the leftmost ray of the first input image light 1130.

The in-coupling grating 1135 may be configured to operate in the diffraction state to couple, via diffraction, the first input image light 1130 having the first input FOV 1133 (e.g., α) into the waveguide 210, as a first in-coupled image light 1131 bounded by first in-coupled rays 1131a and 1131b. For example, the in-coupling grating 1135 may couple, via diffraction, the first input rays 1130a and 1130b into the waveguide 210 as the first in-coupled rays 1131a and 1131b, respectively. In some embodiments, when the in-coupling grating 1135 is a switchable grating, the controller 215 may configure the in-coupling grating 1135 to operate in the diffraction state. In some embodiments, when the in-coupling grating 1135 is a non-switchable grating, the in-coupling grating 1135 may fixedly operate in the diffraction state. The first in-coupled image light 1131 may propagate toward an output region of the waveguide 210 via TIR.

The controller 215 may configure the first out-coupling grating 1145-1 to operate in the diffraction state to couple, via diffraction, the first in-coupled image light 1131 out of the waveguide 210 as a first output image light 1132 bounded by first output rays 1132a and 1132b. For example, the controller 215 may configure the first out-coupling grating 1145-1 to operate in the diffraction state to couple, via diffraction, the first in-couped ray 1131a out of the waveguide 210 as the first output ray 1132a at a first output angle (or a first diffraction angle) and the first in-couped ray 1131b out of the waveguide 210 as the first output ray 1132b at a second output angle (or a second diffraction angle). In some embodiments, the grating vectors of the in-coupling grating 1135 and the first out-coupling grating 1145-1 may be configured, such that the first out-coupling grating 1145-1 may operate in the diffraction state to couple, via diffraction, the first in-coupled image light 1131 out of the waveguide 210 as the first output image light 1132 propagating toward a first side (e.g., a left side) of a surface normal 1180 of the waveguide 210.

In some embodiments, the first output image light 1132 may have a first output FOV 1134 corresponding to an angular region bounded by the first output rays 1132a and 1132b. For example, the first output angle (or the first diffraction angle) of the first output ray 1132a may be about $+\alpha/2$, and the second output angle (or the second diffraction angle) of the first output ray 1132b may be about $+3\alpha/2$. In some embodiments, the first output FOV 1134 may have an angular size represented by the angle $\alpha$. In some embodiments, a symmetry axis 1181 of the first output FOV 1134 may have an angle of $+a$ with respect to the surface normal 1180 of the waveguide 210. That is, the controller 215 may configure the first out-coupling grating 1145-1 to operate in the diffraction state to deliver the first output FOV (e.g., $\alpha$) 1134 toward the first side (e.g., a left side) of the surface normal 1180 of the waveguide 210. In other words, the controller 215 may configure the first out-coupling grating 1145-1 to operate in the diffraction state to rotate the first output FOV (e.g., $\alpha$) 1134 by an angle of $+a$ with respect to the surface normal 1180 of the waveguide 210.

In addition, the controller 215 may configure the second out-coupling grating 1145-2 and the third out-coupling grating 1145-3 to operate in the non-diffraction state to transmit, with substantially zero or negligible diffraction, the first output image light 1132 toward the eye 260. As the first output FOV (e.g., $\alpha$) 1134 is substantially equal to the first input FOV (e.g., $\alpha$) 1133, during the first sub-frame, the eye 260 may perceive a first image 1155L that has a substantially same content (and size) as the first image portion 1150L (e.g., a left image portion) of the virtual image 1150 displayed by the display element 220.

Figure 11B:
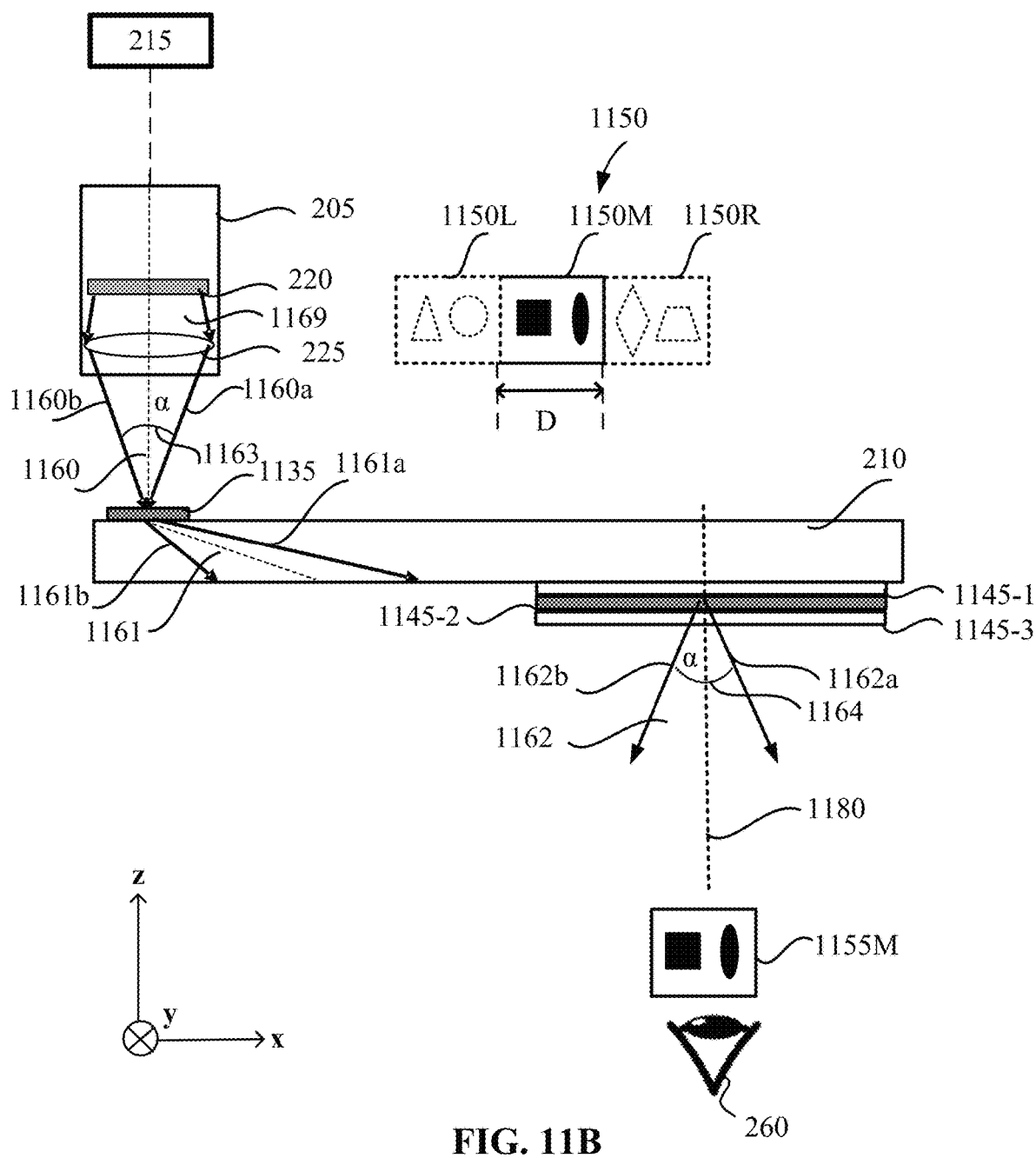

During a second sub-frame, as shown in FIG. 11B, the controller 215 may control the display element 220 to display the second image portion 1150M having an image portion size (e.g., ⅓ of the image size of the virtual image 1150). For example, the controller 215 may control the display element 220 to output a second image light 1169 corresponding to the second image portion 1150M. The second image light 1169 may be generated by the full light-generating area of the display element 220. The second image light 1169 may be an unpolarized image light or a polarized image light. The light conditioning system 225 may transform a linear distribution of pixels in the second image portion 1150M (e.g., a middle image portion) of the virtual image 1150 into an angular distribution of pixels, and output a second input image light 1160 having a second input FOV 1163 toward the input region of the waveguide 210. In some embodiments, the second input FOV 1163 may have an angular size represented by the angle $\alpha$, i.e., the same as the first input FOV 1133. The second input image light 1160 having the second input FOV (e.g., $\alpha$) 1163 may be bounded by second input rays 1160a and 1160b. For example, the second input ray 1160a may be the rightmost ray of the second input image light 1160, and the second input ray 1160b may be the leftmost ray of the second input image light 1160.

The in-coupling grating 1135 may be configured to operate in the diffraction state to couple, via diffraction, the second input image light 1160 having the second input FOV (e.g., $\alpha$) 1163 into the waveguide 210, as a second in-coupled image light 1161 bounded by second in-coupled rays 1161a and 1161b. For example, the in-coupling grating 1135 may couple, via diffraction, the second input rays 1160a and 1160b into the waveguide 210 as the second in-coupled rays 1161a and 1161b, respectively. The second in-coupled image light 1161 may propagate toward an output region of the waveguide 210 via TIR.

The controller 215 may configure the first out-coupling grating 1145-1 to operate in the non-diffraction state to transmit, with substantially zero or negligible diffraction, the second in-coupled image light 1161 toward the second out-coupling grating 1145-2. The controller 215 may configure the second out-coupling grating 1145-2 to operate in the diffraction state to couple, via diffraction, the second in-coupled image light 1161 out of the waveguide 210 as a second output image light 1162 bounded by second output rays 1162a and 1162b. For example, the controller 215 may configure the second out-coupling grating 1145-2 to operate in the diffraction state to couple, via diffraction, the second in-couped ray 1161a out of the waveguide 210 as the second output ray 1162a at a third output angle (or a third diffraction angle) and the second in-couped ray 1161b out of the waveguide 210 as the second output ray 1162b at a fourth output angle (or a fourth diffraction angle).

In some embodiments, the directions of the in-plane projections of the grating vectors of the in-coupling grating 1135 and the second out-coupling grating 1145-2 may be antiparallel to one another, and the magnitudes of the in-plane projections of the grating vectors of the in-coupling grating 1135 and the second out-coupling grating 1145-2 may be substantially the same, such that the second out-coupling grating 1145-2 may operate in the diffraction state to couple, via diffraction, the second in-coupled image light 1161 out of the waveguide 210 as the second output image light 1162. In some embodiments, the second output image light 1162 may have a second output FOV 1164 corresponding to an angular region bounded by the second output rays 1162a and 1162b. For example, the third output angle (or the third diffraction angle) of the second output ray 1162a may be about $-\alpha/2$, and the fourth output angle (or the fourth diffraction angle) of the second output ray 1162b may be about $+\alpha/2$. In some embodiments, the second output FOV 1164 may have an angular size represented by the angle $\alpha$, i.e., the same as the input FOV 1163.

That is, the controller 215 may configure the second out-coupling grating 1145-2 to operate in the diffraction state to deliver the second output FOV (e.g., $\alpha$) 1164 to the eyebox without rotating the second output FOV 1164 relative to the second input FOV 1163. In other words, a symmetry axis of the second output FOV 1164 may be substantially parallel to the surface normal 1180 of the waveguide 210. In addition, the controller 215 may configure the third out-coupling grating 1145-3 to operate in the non-diffraction state to transmit, with substantially zero or negligible diffraction, the second output image light 1162 toward the eye 260. As the second output FOV (e.g., α) 1164 is substantially equal to the second input FOV (e.g., α) 1163, during the second sub-frame, the eye 260 may perceive a second image 1155R that has a substantially same content (and size) as the second image portion 1150M (e.g., a middle image portion) of the virtual image 1150 displayed by the display element 220.

Figure 11C:
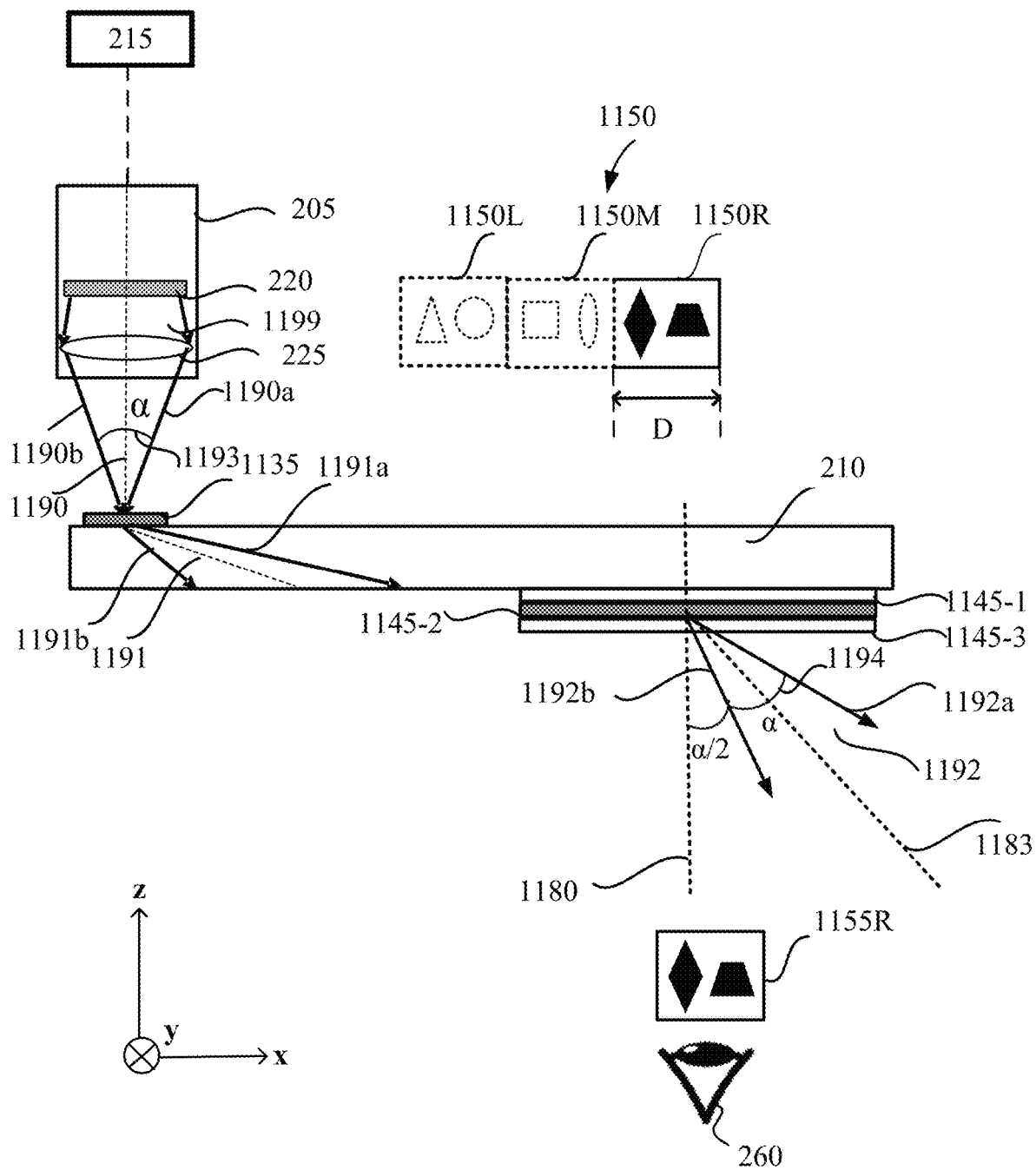

During a third sub-frame, as shown in FIG. 11C, the controller 215 may control the display element 220 to display the third image portion 1150R having an image portion size (e.g., ⅓ of the image size of the virtual image 1150). For example, the controller 215 may control the display element 220 to output a third image light 1199 corresponding to, based on, or representing the third image portion 1150R. The third image light 1199 may be generated by the full light-generating area of the display element 220. The third image light 1199 may be an unpolarized image light or a polarized image light. The light conditioning system 225 may transform a linear distribution of pixels in the third image portion 1150R (e.g., a right half of the virtual image 1150) into an angular distribution of pixels, and output a third input image light 1190 having a third input FOV 1193 toward the input region of the waveguide 210. In some embodiments, the third input FOV 1193 may have an angular size represented by the angle α, i.e., the same as the first input FOV 1133 and the second input FOV 1163. The third input image light 1190 having the third input FOV (e.g., α) 1193 may be bounded by third input rays 1190a and 1190b. For example, the third input ray 1190a may be the rightmost ray of the third input image light 1190, and the third input ray 1190b may be the leftmost ray of the third input image light 1190.

The in-coupling grating 1135 may be configured to operate in the diffraction state to couple, via diffraction, the third input image light 1190 having the third input FOV (e.g., α) 1193 into the waveguide 210, as a third in-coupled image light 1191 bounded by third in-coupled rays 1191a and 1191b. For example, the in-coupling grating 1135 may couple, via diffraction, the third input rays 1190a and 1190b into the waveguide 210 as the third in-coupled rays 1191a and 1191b, respectively. The third in-coupled image light 1191 may propagate toward an output region of the waveguide 210 via TIR.

The controller 215 may configure the first out-coupling grating 1145-1 and the second out-coupling grating 1145-2 to operate in the non-diffraction state to transmit, with substantially zero or negligible diffraction, the third in-coupled image light 1191 toward the third out-coupling grating 1145-3. The controller 215 may configure the third out-coupling grating 1145-3 to operate in the diffraction state to couple, via diffraction, the third in-coupled image light 1191 out of the waveguide 210 as a third output image light 1192 bounded by third output rays 1192a and 1192b. For example, the controller 215 may configure the third out-coupling grating 1145-3 to operate in the diffraction state to couple, via diffraction, the third in-couped ray 1191a out of the waveguide 210 as the third output ray 1192a at a fifth output angle (or a fifth diffraction angle) and the third in-couped ray 1191b out of the waveguide 210 as the third output ray 1192b at a sixth output angle (or a sixth diffraction angle).

In some embodiments, the grating vectors (e.g., the relative directions of the grating vectors) of the in-coupling grating 1135 and the third out-coupling grating 1145-3 may be configured, such that the third out-coupling grating 1145-3 may operate in the diffraction state to couple, via diffraction, the third in-coupled image light 1191 out of the waveguide 210 as the third output image light 1192 propagating toward a second side (e.g., a right side) of the surface normal 1180 of the waveguide 210. In some embodiments, the third output image light 1192 may have a third output FOV 1194 corresponding to an angular region bounded by the third output rays 1192a and 1192b. For example, the fifth output angle (or the fifth diffraction angle) of the third output ray 1192a may be about −3α/2, and the sixth output angle (or the sixth diffraction angle) of the third output ray 1192b may be about −α/2. In some embodiments, the third output FOV 1194 may have an angular size represented by the angle α, i.e., the same as the third input FOV 1193.

In some embodiments, a symmetry axis 1183 of the third output FOV 1194 may have an angle of −α with respect to the surface normal 1180 of the waveguide 210. That is, the controller 215 may configure the third out-coupling grating 1145-3 to operate in the diffraction state to deliver the third output FOV (e.g., α) 1194 toward the second side (e.g., a right side) of the surface normal 1180 of the waveguide 210. In other words, the controller 215 may configure the third out-coupling grating 1145-3 to operate in the diffraction state to rotate the third output FOV (e.g., α) 1194 by an angle of −α with respect to the surface normal 1180 of the waveguide 210. As the third output FOV (e.g., α) 1194 is substantially equal to the third input FOV (e.g., α) 1193, during the third sub-frame, the eye 260 may perceive a third image 1155R that has a substantially same content (and size) as the third image portion 1150R (e.g., a right image portion) of the virtual image 1150 displayed by the display element 220.

Figure 11D:
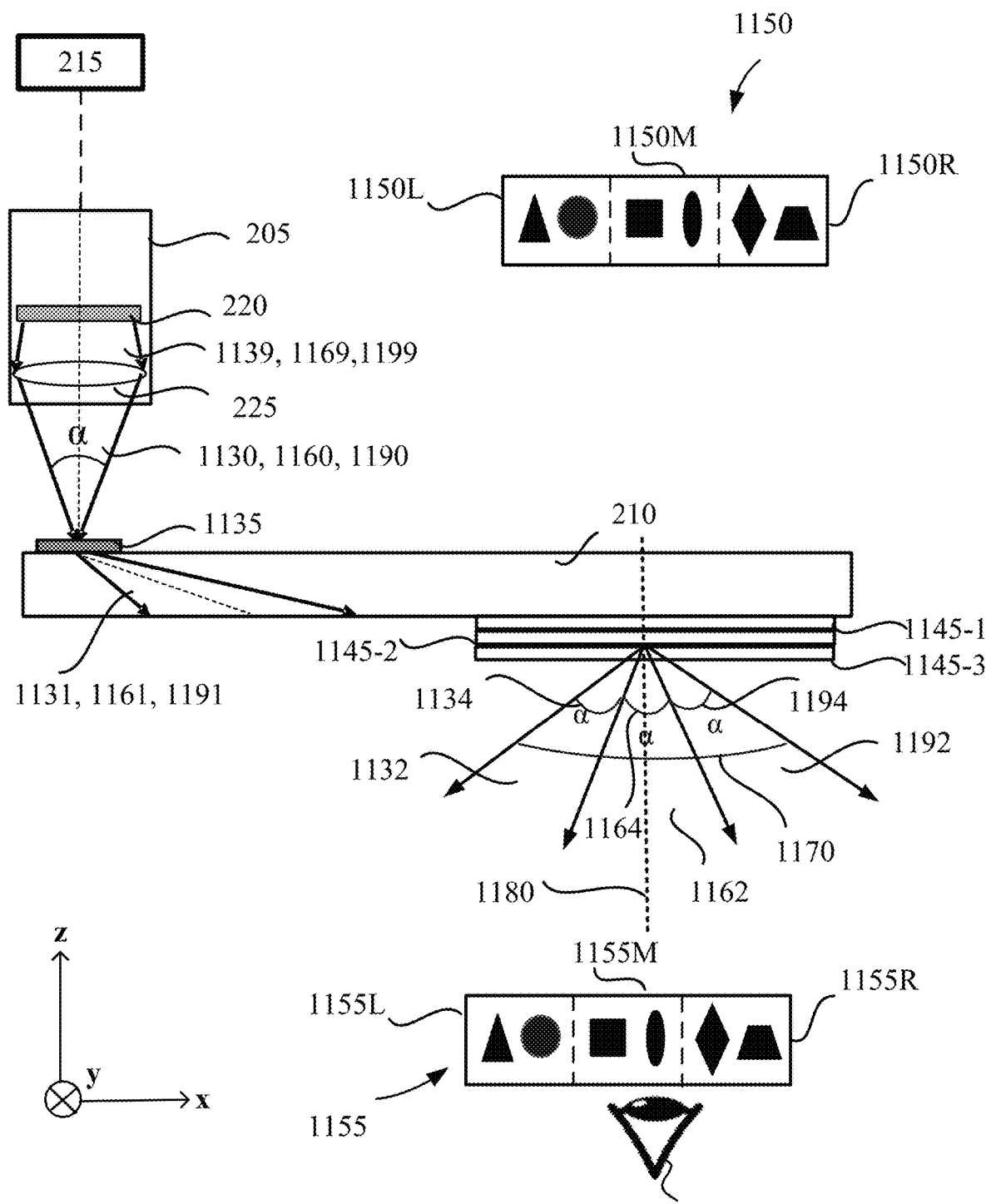

As shown in FIG. 11D, the input image lights 1130, 1160, and 1190 may have substantially the same input FOV. For example, the symmetry axes of the input FOVs of the input image lights 1130, 1160, and 1190 may be the same, and the angular sizes of the input FOVs of the input image lights 1130, 1160, and 1190 may be the same. The symmetry axes of the input FOVs of the input image lights 1130, 1160, and 1190 may be perpendicular to the in-coupling element 1135. In addition, the propagating direction of the center rays of the input image lights 1130, 1160, and 1190 may be parallel to one another, and may be perpendicular to the in-coupling element 1135. During the display frame of the virtual image 1150 displayed by the display element 220, the first output FOV 1134 (e.g., α) delivered by the first out-coupling grating 1145-1 during the first sub-frame, the second output FOV 1164 (e.g., α) delivered by the second out-coupling grating 1145-2 during the second sub-frame, and the third output FOV 1194 (e.g., α) delivered by the third out-coupling grating 1145-3 during the third sub-frame may have a substantially narrow overlapping area (or overlapping FOV portion).

An angular size of the overlapping FOV portion may be smaller than a predetermined percentage of the first output FOV 1134 (or the second output FOV 1164, or the third output FOV 1194). For example, the predetermined percentage of the first output FOV 1134 (or the second output FOV 1164, or the third output FOV 1194) may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. During the display frame of the virtual image 1150 displayed by the display element 220, an overall, combined output FOV 1170 may be substantially equal to a combination of the first output FOV 1134, the second output FOV 1164, and the third output FOV 1194. For example, the overall output FOV 1170 may be three times as large as the input FOV (e.g., the first input FOV 1133, the second input FOV 1163, or the third input FOV 1193). Accordingly, during the display frame of the virtual image 1150 displayed by the display element 220, the eye 260 may perceive an image 1155 that is formed by the first image 1155L, the second image 1155M, and the third image 1155R, which correspond to a first image portion (e.g., a left image portion), a second image portion (e.g., a middle image portion), and a third image portion (e.g., a right image portion) of the image 1155, respectively.

Compared to a conventional waveguide display system (e.g., the conventional waveguide display system 100 shown in FIG. 1A), in which the output FOV 134 is substantially equal to the input FOV 133, through configuring the grating vectors (e.g., relative directions and magnitudes of the grating vectors) of the in-coupling gratings and the out-coupling gratings in a set of coupling gratings, the disclosed optical system 1100 shown in FIGS. 11A-11D may be configured to provide an expanded overall output FOV as compared to the input FOV. FIGS. 11A-11D show the configurations and operation schemes for delivering a single color image with an expanded overall output FOV to the eyebox. Delivering a polychromatic image (e.g., a full-color image) with an expanded overall output FOV (e.g., tripled as compared to the input FOV) to the eyebox may be based on a mechanism similar to that described above in connection with FIGS. 9A-9C or FIGS. 10A-10C.

FIGS. 12A-12D illustrate schematic diagrams of an optical system 1200 configured to provide an increased overall output FOV, according to another embodiment of the present disclosure. The optical system 1200 may be referred to as a waveguide display system. The optical system 1200 may include elements that are similar to or the same as those included in other optical systems disclosed herein and shown in other figures. Features shown in other figures, even if not explicitly described below for the simplicity of discussion, may also be applicable to the embodiment shown in FIGS. 12A-12D. Descriptions of the same or similar elements or features can refer to the above corresponding descriptions, including those rendered in connection with FIGS. 2-11D.

The optical system 1200 may include the light source assembly 205, a waveguide stack 1201, and the controller 215 (not shown in FIGS. 12A-12D). The light source assembly 205 may include the display element 220 and the light conditioning system 225 optically coupled to the display element 220. The display element 220 and the light conditioning system 225 are not shown in FIGS. 12A-12D. Descriptions of the display element 220 and the light conditioning system 225 can refer to the above corresponding descriptions rendered in connection with FIGS. 7A-11D.

The waveguide stack 1201 may include a plurality of waveguides stacked together. For illustrative purposes, three waveguides 1210a, 1210a, and 1210c are shown. Other suitable number of waveguides may be used, such as two, four, five, six, etc. In some embodiments, for a wave guiding to occur in the waveguides, the waveguides may be separated by air gaps. In some embodiments, the air gaps between the neighboring waveguides may be at least partially filled with a material (e.g., a liquid glue) having a refractive index lower than that of the waveguides. At least one (e.g., each) of the waveguides (1210a, 1210a, and 1210c) may be coupled with an in-coupling element (1235, 1237, or 1239) and an out-coupling element (1245, 1247, or 1249). The in-coupling element (1235, 1237, or 1239) may be configured to couple an image light received from the light source assembly 205 into the waveguide, as an in-coupled image light. The out-coupling element (1245, 1247, or 1249) may be configured to couple the in-coupled image light out of the waveguide toward the eye 260. At least one (e.g., each) of the in-coupling elements (1235, 1237, and 1239) may include one or more indirectly switchable gratings described above and shown in other figures. At least one (e.g., each) of the out-coupling elements (1245, 1247, and 1249) may include one or more indirectly switchable gratings described above and shown in other figures. A waveguide (1210a, 1210b, or 1210c) may form a waveguide display assembly with the corresponding in-coupling element (1235, 1237, or 1239) and out-coupling element (1245, 1247, or 1249) coupled to the waveguide.

In the embodiments shown in FIGS. 12A-12D, the optical system 1200 includes three waveguide display assemblies. Each in-coupling element 1235, 1237, or 1239 may include an indirectly switchable in-coupling grating (also referred to as 1235, 1237, or 1239 for discussion purposes), and each out-coupling element 1245, 1247, or 1249 may include an indirectly switchable out-coupling grating (also referred to as 1245, 1247, or 1249 for discussion purposes). An in-coupling grating 1235, 1237, or 1239 and an out-coupling grating 1245, 1247, or 1249 operating in a diffraction state to diffract the image light into and out of a waveguide 1210a, 1210b, or 1210c may be referred to as a set of coupling gratings. In some embodiments, the first in-coupling grating 1235 and the first out-coupling grating 1245 coupled with the waveguide 1210a may form a first set of coupling gratings. The second in-coupling grating 1237 and the second out-coupling grating 1247 coupled with the waveguide 1210b may form a second set of coupling gratings. The third in-coupling grating 1239 and the third out-coupling grating 1249 coupled with the waveguide 1210c may form a third set of coupling gratings.

A vector sum of the in-plane projections of the grating vectors of the first in-coupling grating 1235 and the first out-coupling grating 1245 of the first set may be a first vector sum. A vector sum of the in-plane projections of the grating vectors of the second in-coupling grating 1237 and the second out-coupling grating 1247 of the second set may be a second vector sum. A vector sum of the in-plane projections of the grating vectors of the third in-coupling grating 1239 and the third out-coupling grating 1249 of the third set may be a third vector sum. At least one of the first vector sum, the second vector sum, or the third vector sum may be a non-null vector. In some embodiments, at least two of the first vector sum, the second vector sum, or the third vector sum may be a non-null vector, and the remaining one of the first vector sum, the second vector sum, or the third vector sum may be a null vector.

For example, in the embodiment shown in FIGS. 12A-12D, the first vector sum and the third vector sum may be non-null vectors. In other words, the in-plane projections of the grating vectors of the first in-coupling grating 1235 and the first out-coupling grating 1245 may be unequal to one another, and the in-plane projections of the grating vectors of the third in-coupling grating 1239 and the third out-coupling grating 1249 may be unequal to one another. In some embodiments, directions of the first vector sum and the third vector sum may be different from one another, e.g., the directions of the first vector sum and the third vector sum may be anti-parallel. For example, one of the first vector sum and the third vector sum may be a vector with a positive direction, and the other may be a vector with a negative direction. In some embodiments, magnitudes of the first vector sum and the third vector sum may be different from one another. In some embodiments, magnitudes of the first vector sum and the third vector sum may be substantially the same. In some embodiments, the second vector sum may be a null vector. In other words, the in-plane projections of the grating vectors of the second in-coupling grating 1237 and the second out-coupling grating 1247 may have anti-parallel directions and a substantially same magnitude.

In some embodiments, at least two of the first out-coupling grating 1245, the second out-coupling grating 1247, or the third out-coupling grating 1249 may be gratings having slanted microstructures (e.g., slant gratings). For example, the first out-coupling grating 1245 and the third out-coupling grating 1249 may be gratings having slanted microstructures (e.g., slant gratings), and the second out-coupling grating 1247 may be a grating having non-slanted microstructures (e.g., a non-slant grating). In some embodiments, each of the in-coupling gratings 1235, 1237, and 1239 may be a grating having non-slanted microstructures (e.g., non-slant gratings). In some embodiments, the in-plane projections of the grating vectors of the in-coupling gratings 1235, 1237, and 1239 may be substantially the same. The in-plane projections of the grating vectors of the first out-coupling grating 1245, the second out-coupling grating 1247, and the third out-coupling grating 1249 may be different in at least one of the direction or the magnitude.

In some embodiments, the directions of the in-plane projections of the grating vectors of the first out-coupling grating 1245, the second out-coupling grating 1247, and the third out-coupling grating 1249 may be substantially parallel to one another, and the magnitudes of the in-plane projections of the grating vectors of the first out-coupling grating 1245, the second out-coupling grating 1247, and the third out-coupling grating 1249 may be different from one another. For example, the grating periods of the first out-coupling grating 1245, the second out-coupling grating 1247, and the third out-coupling grating 1249 may be different from one another, and the slant angles of the first out-coupling grating 1245, the second out-coupling grating 1247, and the third out-coupling grating 1249 may be substantially the same. In some embodiments, the grating periods of the in-coupling grating 1235, 1237 or 1239, the first out-coupling grating 1245, and the third out-coupling grating 1249 may be different from one another. For example, the grating period of one of the first out-coupling grating 1245 and the third out-coupling grating 1249 may be larger than the grating period of the in-coupling grating 1235, 1237 or 1239, and the grating period of the other one of the first out-coupling grating 1245 and the third out-coupling grating 1249 may be smaller than the grating period of the in-coupling grating 1235.

In some embodiments, the grating periods of the in-coupling grating 1235, 1237 or 1239 and the second out-coupling grating 1247 may be substantially the same. In some embodiments, the grating periods of the first out-coupling grating 1245, the second out-coupling grating 1247, and the third out-coupling grating 1249 may be substantially the same, and the slant angles of the first out-coupling grating 1245, the second out-coupling grating 1247, and the third out-coupling grating 1249 may have different absolute values and the same sign. In some embodiments, the slant angles of the in-coupling grating 1235, 1237 or 1239, the first out-coupling grating 1245, and the third out-coupling grating 1249 may have different absolute values and the same sign. For example, the slant angle of one of the first out-coupling grating 1245 and the third out-coupling grating 1249 may be larger than the slant angle of the in-coupling grating 1235, 1237 or 1239, and the slant angle of the other one of the first out-coupling grating 1245 and the third out-coupling grating 1249 may be smaller than the slant angle of the in-coupling grating 1235, 1237 or 1239.

In some embodiments, at least two directions of the in-plane projections of the grating vectors of the first out-coupling grating 1245, the second out-coupling grating 1247, and the third out-coupling grating 1249 may be different from one another. For example, the directions of the in-plane projections of the grating vectors of the first out-coupling grating 1245 and the third out-coupling grating 1249 may be anti-parallel to one another. The direction of the in-plane projection of the grating vector of the second out-coupling grating 1247 may be substantially parallel to the direction of the in-plane projection of the grating vector of one of the first out-coupling grating 1245 and the third out-coupling grating 1249, and anti-parallel to the direction of the in-plane projection of the grating vector of the remaining one of the first out-coupling grating 1245 and the third out-coupling grating 1249. In some embodiments, the direction of the in-plane projection of the grating vector of the second out-coupling grating 1247 may be anti-parallel to the direction of the in-plane projection of the grating vector of the in-coupling grating 1237.

In some embodiments, at least two magnitudes of the in-plane projections of the grating vectors of the first out-coupling grating 1245, the second out-coupling grating 1247, and the third out-coupling grating 1249 may be different from one another. For example, the magnitudes of the in-plane projections of the grating vectors of the first out-coupling grating 1245 and the third out-coupling grating 1249 may be substantially the same, and may be different from the magnitude of the in-plane projection of the grating vector of the in-coupling grating 1235 or 1239. The magnitude of the in-plane projection of the grating vector of the second out-coupling grating 1247 may be substantially the same as the magnitude of the in-plane projection of the grating vector of the in-coupling grating 1237. In some embodiments, the magnitudes of the in-plane projections of the grating vectors of the first out-coupling grating 1245, the second out-coupling grating 1247, and the third out-coupling grating 1249 may be different from one another. For example, the magnitude of the in-plane projection of the grating vector of the second out-coupling grating 1247 may be substantially the same as the magnitude of the in-plane projection of the grating vector of the in-coupling grating 1237. The magnitude of the in-plane projection of the grating vector of the first out-coupling grating 1245 may be smaller than the magnitude of the in-plane projection of the grating vector of the in-coupling grating 1235. The magnitude of the in-plane projection of the grating vector of the third out-coupling grating 1249 may be larger than the magnitude of the in-plane projection of the grating vector of the in-coupling grating 1239.

In some embodiments, the grating periods of the first out-coupling grating 1245, the second out-coupling grating 1247, and the third out-coupling grating 1249 may be substantially the same, and the slant angles of the first out-coupling grating 1245, the second out-coupling grating 1247, and the third out-coupling grating 1249 may be different from one another. In some embodiments, the slant angles of the first out-coupling grating 1245 and the third out-coupling grating 1249 may have substantially the same absolute value and opposite signs. For example, the slant angle of one of the first out-coupling grating 1245 and the third out-coupling grating 1249 may be a positive slant angle (e.g., +β), and the slant angle of the other one of the first out-coupling grating 1245 and the third out-coupling grating 1249 may be a negative slant angle (e.g., −β).

In some embodiments, the absolute value of the slant angle of the second out-coupling grating 1247 may be substantially the same as the absolute value of the slant angle of the in-coupling grating 1237, and the absolute value of the slant angle of the first out-coupling grating 1245 (or the third out-coupling grating 1249) may be different from the absolute value of the slant angle of the in-coupling grating 1235 or 1239. In some embodiments, the slant angles of the first out-coupling grating 1245 and the third out-coupling grating 1249 may have different absolute values and opposite signs. For example, the absolute value of the slant angle of the second out-coupling grating 1247 may be substantially the same as the absolute value of the slant angle of the in-coupling grating 1237, the absolute value of the slant angle of one of the first out-coupling grating 1245 and the third out-coupling grating 1249 may be larger than the absolute value of the slant angle of the in-coupling grating 1235 or 1239, and the absolute value of the slant angle of the remaining one of the first out-coupling grating 1245 and the third out-coupling grating 1249 may be smaller than the absolute value of the slant angle of the in-coupling grating 1235 or 1239.

In some embodiments, at least one (e.g., each) of the in-coupling grating (e.g., 1235, 1237, or 1239) may be associated with a polarization switch (e.g., 1252A, 1252B, or 1252C). In some embodiments, the polarization switch (e.g., 1252A, 1252B, or 1252C) may be disposed at a light incidence side of the corresponding in-coupling grating (e.g., 1235, 1237, or 1239). An image light may pass through the polarization switch before the image light is incident onto the in-coupling element. The polarization switch (e.g., 1252A, 1252B, or 1252C) may be controlled by the controller 215 to operate in a switching state or a non-switching state. Under the control of the controller 215, the polarization switch (e.g., 1252A, 1252B, or 1252C) may control the polarization of the image light before the image light is incident onto the in-coupling grating (e.g., 1235, 1237, or 1239), thereby switching the in-coupling grating (e.g., 1235, 1237, or 1239) to operate in the diffraction state or the non-diffraction state for the image light.

Figure 12A:
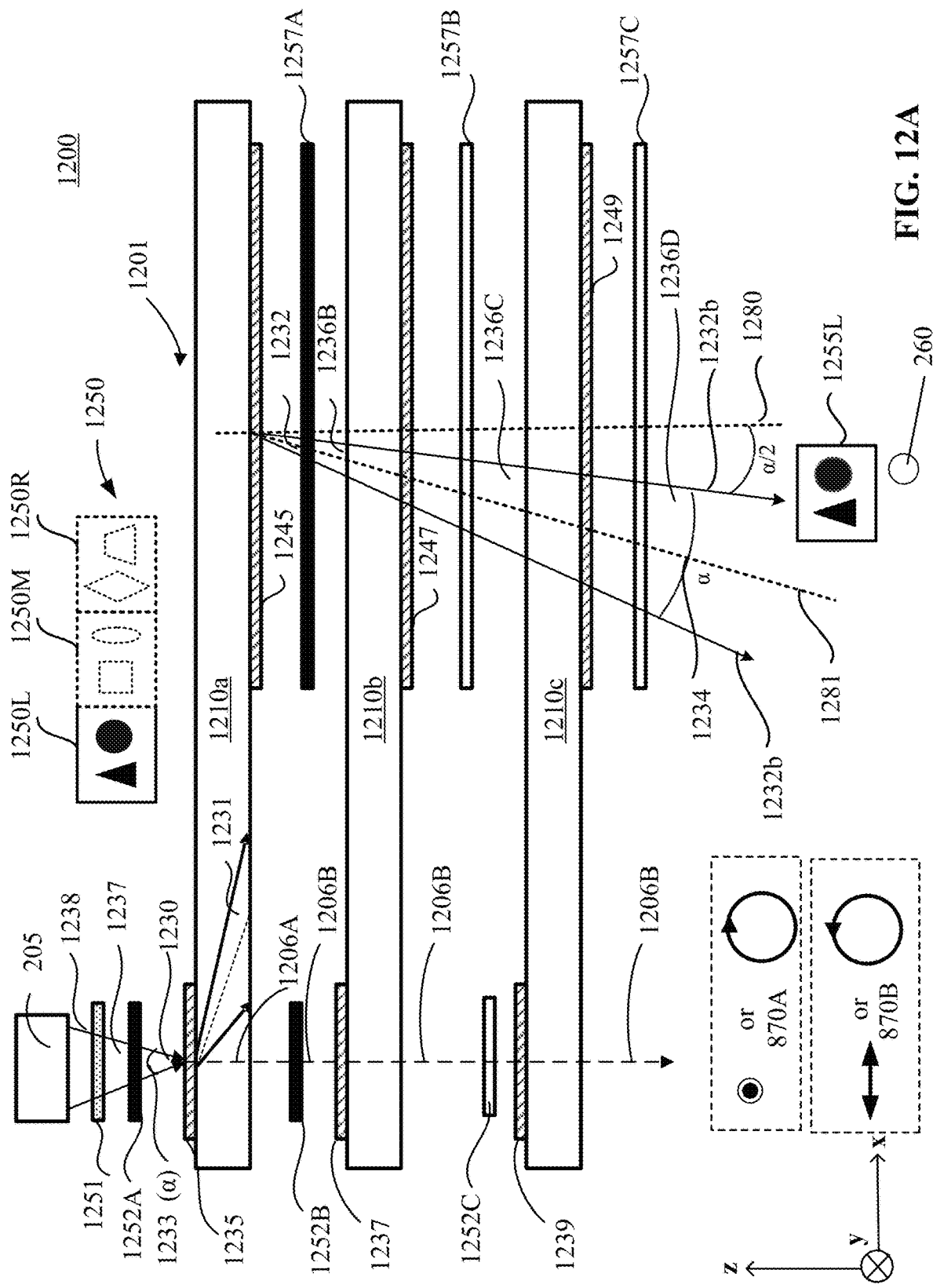
FIGS. 12A-12D illustrate schematic diagrams of an optical system configured to provide an expanded FOV, according to another embodiment of the present disclosure.

In some embodiments, at least one (e.g., each) of the out-coupling gratings (e.g., 1245, 1247, or 1249) may be coupled with a polarization switch (e.g., 1257A, 1257B, or 1257C). For example, the polarization switch 1257A may be associated with the out-coupling grating 1247, the polarization switch 1257B may be associated with the out-coupling grating 1249. The polarization switch 1257C may not be associated with an out-coupling grating. In some embodiments, the polarization switch 1257C may be omitted. As shown in FIG. 12A, the out-coupling grating 1245 may not be associated with a polarization switch. In some embodiments, the out-coupling grating 1245 may be associated with a polarization switch disposed between the waveguide 1210a and the out-coupling grating 1245. For the simplicity of illustration, the polarization switch that may be associated with the out-coupling grating 1245 is omitted.

The in-coupling gratings 1235, 1237, and 1239 and the out-coupling gratings 1245, 1247, and 1249 of the waveguide stack 1201 may be polarization selective gratings having the same polarization selectivity or different polarization selectivities. In some embodiments, the in-coupling grating 1235 and the out-coupling grating 1245 may have the same polarization selectivity. In some embodiments, the in-coupling grating 1237 and the out-coupling grating 1247 may have the same polarization selectivity. In some embodiments, the in-coupling grating 1239 and the out-coupling grating 1249 may have the same polarization selectivity. For discussion purposes, in FIGS. 12A-12D, the in-coupling gratings 1235, 1237, and 1239 and the out-coupling gratings 1245, 1247, and 1249 of the waveguide stack 1201 may be configured to have the same polarization selectivity. For example, the in-coupling gratings 1235, 1237, and 1239 and the out-coupling gratings 1245, 1247, and 1249 may be diffract image lights having a same polarization, e.g., the first polarization 870A, and transmit image lights having a different polarization, e.g., the second polarization 870B orthogonal to the first polarization 870A, with substantially zero or negligible diffraction. The linear polarizations 870A and 870B are used as example polarizations. In some embodiments, circular polarizations with opposite handednesses may be used as the first polarization 870A and the second polarization 870B, respectively.

The light source assembly 205 may be configured or controlled, e.g., by the controller 215, to emit an unpolarized image light. The optical system 1200 may include a polarizer 1251 disposed between the light source assembly 205 and the waveguide stack 1201. The polarizer 1251 may be configured to convert the unpolarized image light into a polarized image light having the first polarization 870A or the second polarization 870B. For discussion purposes, the polarizer 1251 is shown as a linear polarizer configured to convert the unpolarized image light into a linearly polarized image light having the second polarization 870B.

Similar to the optical system 1100 shown in FIGS. 11A-11D, the display element 220 (not shown) may be configured to display a virtual image 1250 with a predetermined image size. The virtual image 1250 may be spatially divided (e.g., equally divided) into three image portions each having an image portion size (e.g., a diagonal length), e.g., a first (left) image portion 1250L, a second (middle or center) image portion 1250M, and a third (right) image portion 1250R. In some embodiments, the image portion size of each image portion may substantially correspond to a size of a full light-generating area of the display panel included in the display element 220 (or the full scanning range or area of the laser scanner when the display element 220 includes a laser scanning display panel). A collimating lens included in the light conditioning system 225 (not shown) may transform the first image portion 1250L, the second image portion 1250M, and the third image portion 1250R having a substantially same image portion size into image lights having a substantially same input FOV.

A display frame of the virtual image 1250 displayed by the display element 220 may include or may be divided into three consecutive sub-frames. During a first sub-frame, as shown in FIG. 12A, the controller 215 may control or configure the polarization switches 1252A, 1252B, and 1257A to operate in a switching state, and control or configure the polarization switches 1252C, 1257B, and 1257C to operate in a non-switching state. For illustration purposes, a polarization switch operating in the switching state is depicted as a rectangle filled with black color, and a polarization switch operating in the non-switching state is depicted as a rectangle filled with white color (or a un-filled rectangle).

The controller 215 may control the display element 220 to display the first image portion 1250L having an image portion size (e.g., ⅓ of the image size of the virtual image 1250). For example, the controller 215 may control the display element 220 to output a first image light corresponding to the first image portion 1250L. The first image light may be generated by the full light-generating area of the display element 220. For example, the first image light may be an unpolarized image light. The light conditioning system 225 (not shown) may transform a linear distribution of pixels in the first image portion 1250L of the virtual image 1250 into an angular distribution of pixels, and output a first unpolarized image light 1238 having a predetermined FOV 1233 (e.g., having an angular size represented by the angle α). The polarizer 1251 may convert the first unpolarized image light 1238 into a first linearly polarized image light 1237 having the second polarization 870B. The polarization switch 1252A operating in the switching state may transmit the first linearly polarized image light 1237 having the second polarization 870B as a first input image light 1230 having the first polarization 870A. The first input image light 1230 may have a substantially same FOV (referred to as a first input FOV) as the predetermined FOV 1233 of the first unpolarized image light 1238. The first input FOV is also referred to as 1233 for discussion purposes.

As the in-coupling grating 1235 may be configured to diffract an image light having the first polarization 870A and transmit an image light having the second polarization 870B with substantially zero or negligible diffraction, the in-coupling grating 1235 may couple, via diffraction, the first input image light 1230 having the first polarization 870A into the waveguide 1210*a* via diffraction, as a first in-coupled image light 1231. The first polarization 870A of the first in-coupled image light 1231 is presumed to be preserved when the first in-coupled image light 1231 propagates inside the waveguide 1210*a* through TIR toward the out-coupling grating 1245.

The out-coupling grating 1245 may be configured to couple, via diffraction, the first in-coupled image light 1231 having the first polarization 870A out of the waveguide 1210*a*, as a first output image light 1232 bounded by first output rays 1232*a* and 1232*b*. The first output image light 1232 is presumed to have the first polarization 870A. In some embodiments, the grating vectors of the in-coupling grating 1235 and the out-coupling grating 1245 may be configured such that the out-coupling grating 1245 operating in the diffraction state may couple, via diffraction, the first in-coupled image light 1231 out of the waveguide 1210*a*, as the first output image light 1232 propagating toward a first side (e.g., a left side) of a surface normal 1280 of the waveguide 1210*a*.

In some embodiments, the first output image light 1232 may have a first output FOV 1234 corresponding to an angular region bounded by the first output rays 1232*a* and 1232*b*. For example, the first output angle (or the first diffraction angle) of the first output ray 1232*a* may be about +α/2, and the second output angle (or the second diffraction angle) of the first output ray 1232*b* may be about +3α/2. In some embodiments, the first output FOV 1234 may have an angular size represented by the angle α, i.e., the same as the angular size of the input FOV 1233. In some embodiments, a symmetry axis 1281 of the first output FOV 1234 may have an angle of +α with respect to the surface normal 1280 of the waveguide 1210*a*.

That is, the controller 215 may configure the out-coupling grating 1245 to operate in the diffraction state to deliver the first output FOV (e.g., α) 1234 toward the first side (e.g., a left side) of the surface normal 1280 of the waveguide 1210*a*. In other words, the controller 215 may configure the out-coupling grating 1245 to operate in the diffraction state to rotate the first output FOV (e.g., α) 1234 by an angle of +α with respect to the surface normal 1280 of the waveguide 1210*a*.

At the out-coupling side of the waveguide stack 1201, the polarization switch 1257A operating in the switching state may convert the first output image light 1232 having the first polarization 870A into an image light 1236B having the second polarization 870B. As the out-coupling element 1247 may be configured to diffract an image light having the first polarization 870A and transmit an image light having the second polarization 870B, the image light 1236B having the second polarization 870B output from the polarization switch 1257A may travel through the waveguide 1210*b* and the out-coupling grating 1247 without being diffracted (i.e., the diffraction may be substantially zero or negligible). The polarization switch 1257B operating in the non-switching state may transmit the image light 1236B having the second polarization 870B without affecting the polarization of the image light 1236B. The image light output from the polarization switch 1257B may be denoted as an image light 1236C having the second polarization 870B.

As the out-coupling element 1249 may be configured to diffract an image light having the first polarization 870A and transmit an image light having the second polarization 870B, the image light 1236C having the second polarization 870B may travel through the waveguide 1210*c* and the out-coupling grating 1249 without being diffracted. The image light output from the out-coupling grating 1249 may be denoted as an image light 1236D having the second polarization 870B. The polarization switch 1257C operating in the non-switching state may transmit the image light 1236D having the second polarization 870B without affecting the polarization. The image light 1236D output from the polarization switch 1257C may propagate toward the first side (e.g., a left side) of the surface normal 1280 of the waveguide 1210*c* and have an FOV that is substantially the same as the first output FOV 1234 of the first output image light 1232 out-coupled by the out-coupling grating 1245. As the first output FOV (e.g., α) 1234 is substantially equal to the first input FOV (e.g., α) 1233, during the first sub-frame, the eye 260 may perceive a first image 1255L that has a substantially same content (and size) as the first image portion 1250L (e.g., a left image portion) of the virtual image 1250.

In some embodiments, at the in-coupling side of the waveguide stack 1201, a portion 1206A of the first input image light 1230 having the first polarization 870A may not be coupled into the waveguide 1210*a* by the in-coupling grating 1235. Rather, the portion 1206A may travel through the waveguide 1210*a* toward the waveguide 1210*b*. The polarization switch 1252B operating in the switching state may convert the portion 1206A having the first polarization 870A into an image light 1206B having the second polarization 870B. As the in-coupling grating 1237 may be configured to diffract an image light having the first polarization 870A, and transmit an image light having the second polarization 870B, the image light 1206B having the second polarization 870B output from the polarization switch 1252B may not be coupled into the waveguide 1210*b* by the in-coupling grating 1237. Rather, the image light 1206B may travel through the in-coupling grating 1237 and the waveguide 1210*b* toward the waveguide 1210*c*. The polarization switch 1252C operating in the non-switching state may transmit the image light 1206B having the second polarization 870B without affecting the polarization. As the in-coupling grating 1239 may be configured to diffract an image light having the first polarization 870A, and transmit an image light having the second polarization 870B, the image light 1206B having the second polarization 870B output from the polarization switch 1252C may not be coupled into the waveguide 1210c by the in-coupling grating 1239. Rather, the image light 1206B may travel through the in-coupling grating 1239 and the waveguide 1210c.

Figure 12B:
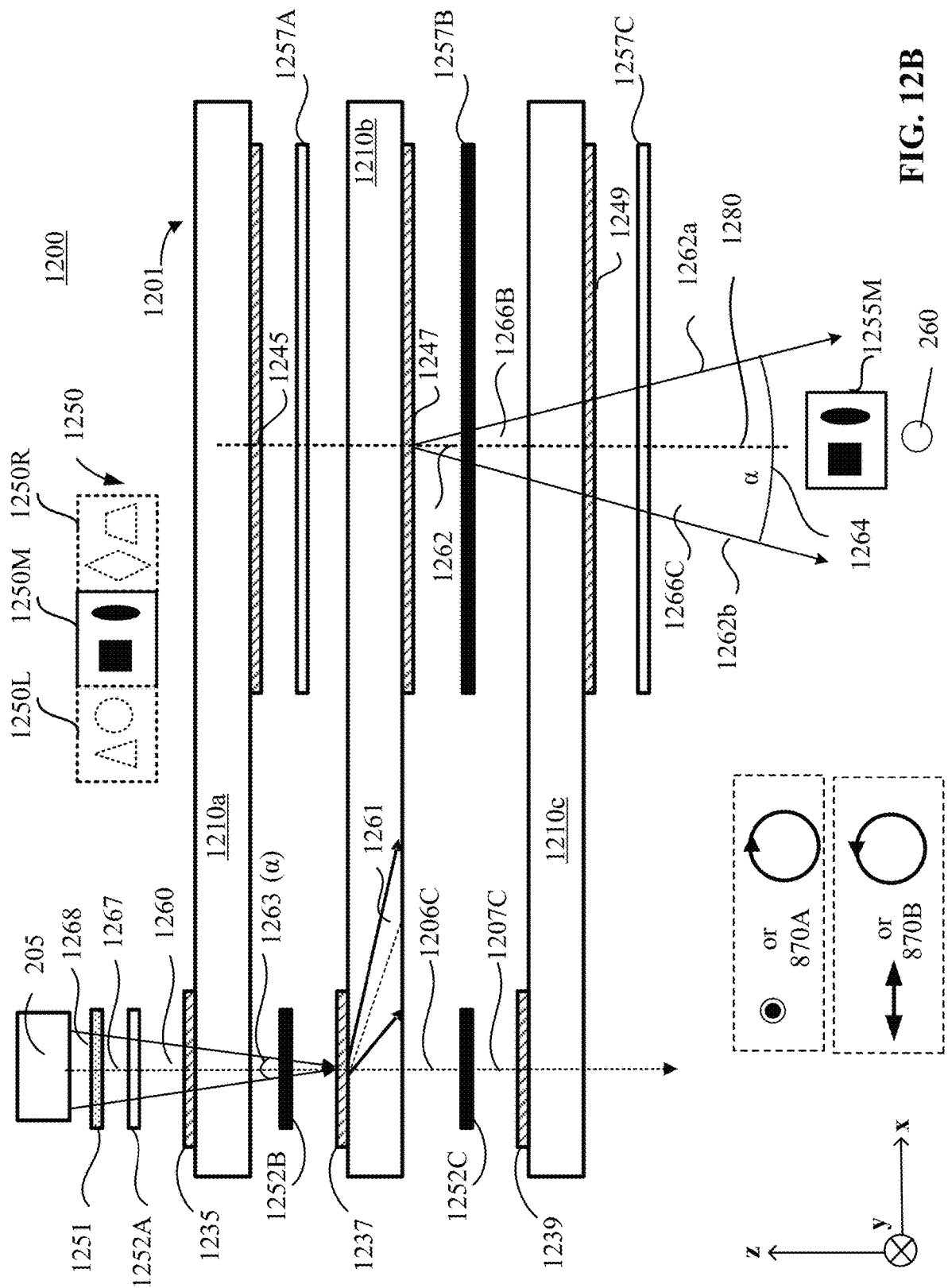

During a second sub-frame, as shown in FIG. 12B, the controller 215 may control or configure the polarization switches 1252A, 1257A, and 1257C to operate in a non-switching state, and control or configure the polarization switches 1252B, 1252C, and 1257B to operate in a switching state. The controller 215 may control the display element 220 to display the second image portion 1250M having an image portion size (e.g., ⅓ of the image size of the virtual image 1250). For example, the controller 215 may control the display element 220 to output a second image light corresponding to the second image portion 1250M. The second image light may be generated by the full light-generating area of the display element 220. The second image light may be an unpolarized or polarized image light. The light conditioning system 225 (not shown) may transform a linear distribution of pixels in the second image portion 1250M of the virtual image 1250 into an angular distribution of pixels, and output a second unpolarized image light 1268 having an input FOV 1263 (e.g., having an angular size represented by the angle α), which may be the same as the input FOV 1233. The polarizer 1251 may convert the second unpolarized image light 1268 into a second linearly polarized image light 1267 having the second polarization 870B. The polarization switch 1252A operating in the non-switching state may transmit the second linearly polarized image light 1267 having the second polarization 870B as a second input image light 1260 having the second polarization 870B. The second input image light 1260 may have an FOV (e.g., a second input FOV) that is the same as the FOV 1263 of the second unpolarized image light 1268. The second input FOV is also referred to as 1263 for discussion purposes.

As the in-coupling grating 1235 may be configured to diffract an image light having the first polarization 870A and transmit an image light having the second polarization 870B, the second input image light 1260 having the second polarization 870B may not be coupled into the waveguide 1210a by the in-coupling grating 1235. Rather, the second input image light 1260 having the second polarization 870B may travel through the in-coupling grating 1235 and the waveguide 1210a toward the waveguide 1210b. The polarization switch 1252B operating in the switching state may change the polarization of the second input image light 1260 from the second polarization 870B to the first polarization 870A. Thus, the second input image light 1260 may have the first polarization 870A.

As the in-coupling grating 1237 may be configured to diffract an image light having the first polarization 870A and transmit an image light having the second polarization 870B, the in-coupling grating 1237 may couple the second input image light 1260 having the first polarization 870A into the waveguide 1210b, as a second in-coupled image light 1261. The second in-coupled image light 1261 is presumed to have the first polarization 870A, which is presumed to be preserved when the second in-coupled image light 1261 propagates inside the waveguide 1210b through TIR toward the out-coupling grating 1247. The second in-coupled image light 1261 having the first polarization 870A may be coupled out of the waveguide 1210b via the out-coupling grating 1247 as a second output image light 1262 bounded by second output rays 1262a and 1262b. The second output image light 1262 is presumed to have the first polarization 870A.

The out-coupling grating 1247 operating in the diffraction state may couple, via diffraction, the second in-coupled image light 1261 out of the waveguide 1210a, as the second output image light 1262. In some embodiments, the second output image light 1262 may have a second output FOV 1264 corresponding to an angular region bounded by the second output rays 1262a and 1262b. For example, the third output angle (or the third diffraction angle) of the second output ray 1262a may be about −α/2, and the fourth output angle (or the fourth diffraction angle) of the second output ray 1262b may be about +α/2. In some embodiments, the second output FOV 1264 may have an angular size represented by the angle α, i.e., the same as the input FOV 1263. A symmetry axis of the second output FOV 1264 may have a direction that is substantially parallel or coincident with the surface normal 1280 of the waveguide 1210b. That is, the controller 215 may configure the out-coupling grating 1247 to operate in the diffraction state to deliver the second output FOV (e.g., α) 1264 to the eyebox without rotating the second output FOV 1264 relative to the surface normal 1280 of the waveguide 1210b.

The polarization switch 1257B operating in the switching state may convert the second output image light 1262 having the first polarization 870A output from the out-coupling grating 1247 into an image light 1266B having the second polarization 870B. As the out-coupling grating 1249 may be configured to diffract an image light having the first polarization 870A and transmit an image light having the second polarization 870B, the image light 1266B having the second polarization 870B may travel through the waveguide 1210c and the out-coupling grating 1249 toward the polarization switch 1257C. The polarization switch 1257C operating in the non-switching state may transmit the image light 1266B having the second polarization 870B toward the eyebox as an image light 1266C with the same polarization. The image light 1266C may propagate in a direction substantially parallel to the surface normal 1280. The FOV of the image light 1266C may be substantially the same as the second output FOV 1264. As the second output FOV 1264 (e.g., α) is substantially equal to the second input FOV 1263 (e.g., α), during the second sub-frame, the eye 260 may perceive a second image 1255M that has a substantially same content (and size) as the second image portion 1250M (e.g., a middle image portion) of the virtual image 1250 displayed by the display element 220.

Referring back to the in-coupling side of the waveguide stack 1201, as shown in FIG. 12B, a portion 1206C of the second input image light 1260 having the first polarization 870A may not be coupled into the waveguide 1210b. Rather, the portion 1206C (also referred to the image light 1206C) may travel through the waveguide 1210b toward the polarization switch 1252C. The polarization switch 1252C operating in the switching state may convert the image light 1206C having the first polarization 870A into an image light 1207C having the second polarization 870B. As the in-coupling grating 1239 is configured to diffract an image light having the first polarization 870A and transmit an image light having the second polarization 870B, the image light 1207C having the second polarization 870B may not be coupled into the waveguide 1210c by the in-coupling grating 1239. Rather, the image light 1207C may travel through the in-coupling grating 1239 and the waveguide 1210c.

Figure 12C:
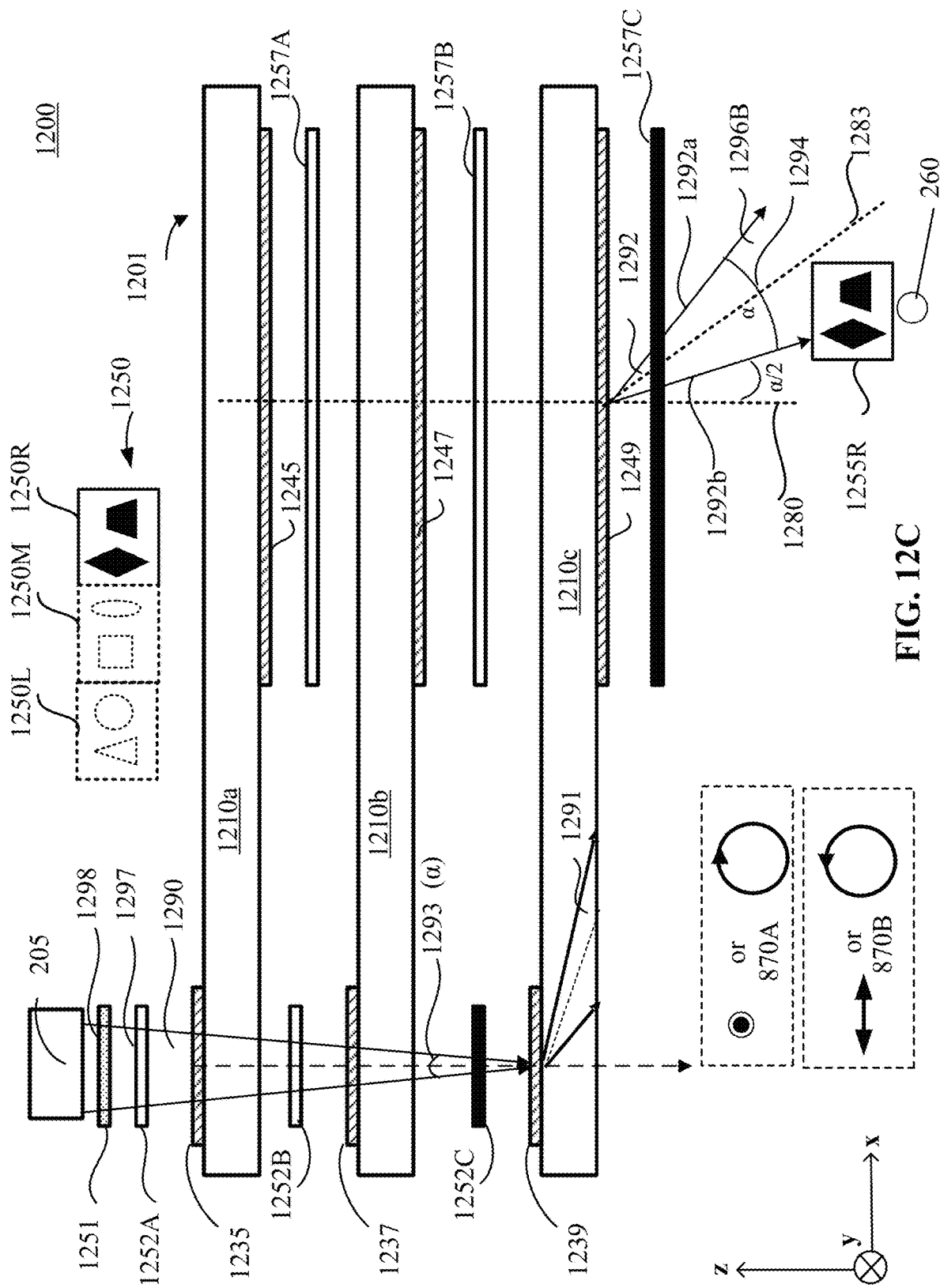

During a third sub-frame, as shown in FIG. 12C, the controller 215 may control or configure the polarization switches 1252A, 1252B, 1257A, and 1257B to operate in a non-switching state, and control or configure the polarization switches 1252C and 1257C to operate in a switching state. The controller 215 may control the display element 220 to display the third image portion 1250R having an image portion size (e.g., ⅓ of the image size of the virtual image 1250). For example, the controller 215 may control the display element 220 to output a third image light corresponding to, based on, or representing the third image portion 1250R. The third image light may be generated by the full light-generating area of the display element 220. The third image light may be an unpolarized or a polarized image light.

The light conditioning system 225 (not shown) may transform a linear distribution of pixels in the third image portion 1250R of the virtual image 1250 into an angular distribution of pixels, and output a third unpolarized image light 1298 having an input FOV 1293 (e.g., having an angular size represented by the angle α), which may be the same as the input FOV 1233 and the input FOV 1263. The polarizer 1251 may convert the third unpolarized image light 1298 into a third linearly polarized image light 1297 having the second polarization 870B. The polarization switch 1252A operating in the non-switching state may transmit the third linearly polarized image light 1297 having the second polarization 870B as a third input image light 1290 having the second polarization 870B. The third input image light 1290 may have an FOV (referred to as a third input FOV) that is substantially the same as the input FOV 1293 of the third unpolarized image light 1298. The third input FOV is also referred to as 1293 for discussion purposes.

As the in-coupling grating 1235 may be configured to diffract an image light having the first polarization 870A and transmit an image light having the second polarization 870B, the third input image light 1290 having the second polarization 870B may not be coupled into the waveguide 1210a by the in-coupling grating 1235. Rather, the third input image light 1290 having the second polarization 870B may travel through the in-coupling grating 1235 and the waveguide 1210a toward the waveguide 1210b. The polarization switch 1252B operating in the non-switching state may transmit the third input image light 1290 having the second polarization 870B without affecting the polarization. As the in-coupling grating 1237 may be configured to diffract an image light having the first polarization 870A and transmit an image light having the second polarization 870B, the third input image light 1290 having the second polarization 870B output from the polarization switch 1252B may not be coupled into the waveguide 1210b by the in-coupling grating 1237. Rather, the third input image light 1290 having the second polarization 870B may travel through the in-coupling grating 1237 and the waveguide 1210b without being diffracted toward the waveguide 1210c.

The polarization switch 1252C operating in the switching state may change the polarization of the third input image light 1290 from the second polarization 870B to the first polarization 870A. Thus, the third input image light 1290 may have the first polarization 870A. As the in-coupling grating 1239 may be configured to diffract an image light having the first polarization 870A and transmit an image light having the second polarization 870B, the in-coupling grating 1239 may couple the third input image light 1290 having the first polarization 870A into the waveguide 1210c as a third in-coupled image light 1291. The third in-coupled image light 1291 is presumed to have the first polarization 870A, which may be preserved when the third in-coupled image light 1291 propagates inside the waveguide 1210c through TIR toward the out-coupling grating 1249.

The out-coupling grating 1249 may be configured to couple, via diffraction, the third in-coupled image light 1291 having the first polarization 870A out of the waveguide 1210c, as a third output image light 1292 bounded by third output rays 1292a and 1292b. The third output image light 1292 is presumed to have the first polarization 870A. In some embodiments, the grating vectors of the in-coupling grating 1239 and the out-coupling grating 1249 may be configured, such that the out-coupling grating 1249 operating in the diffraction state may couple, via diffraction, the third in-coupled image light 1291 out of the waveguide 1210c, as the third output image light 1292 propagating toward a second side (e.g., a left side) of the surface normal 1280 of the waveguide 1210c.

In some embodiments, the third output image light 1292 may have a third output FOV 1294 corresponding to an angular region bounded by the third output rays 1292a and 1292b. For example, the output angle (or the diffraction angle) of the third output ray 1292a may be about −3α/2, and the output angle (or the diffraction angle) of the third output ray 1292b may be about −α/2. In some embodiments, the third output FOV 1294 may have an angular size represented by the angle α, i.e., the same as the input FOV 1293. In some embodiments, a symmetry axis 1283 of the third output image light 1292 may have an angle of −α with respect to the surface normal 1280 of the waveguide 1210c. That is, the controller 215 may configure the out-coupling grating 1249 to operate in the diffraction state to deliver the third output FOV 1294 (e.g., α) toward the second side (e.g., a right side) of the surface normal 1280 of the waveguide 1210c. In other words, the controller 215 may configure the out-coupling grating 1249 to operate in the diffraction state to rotate the third output FOV 1294 (e.g., α) counter-clockwise by an angle of −α with respect to the surface normal 1280 of the waveguide 1210c.

The polarization switch 1257C operating in the switching state may convert the third output image light 1292 having the first polarization 870A into an image light 1296B having the second polarization 870B. The image light 1296B may propagate toward the second side (e.g., a right side) of the surface normal 1280 of the waveguide 1210c. The image light 1296B may have an FOV that is substantially the same as the third output FOV 1294 of the third output image light 1292 out-coupled by the out-coupling grating 1249. As the third output FOV 1294 (e.g., α) is substantially equal to the third input FOV 1293 (e.g., α), during the third sub-frame, the eye 260 may perceive a third image 1255R having a substantially same content (and size) as the third image portion 1250R of the virtual image 1250 displayed by the display element 220.

Figure 12D:
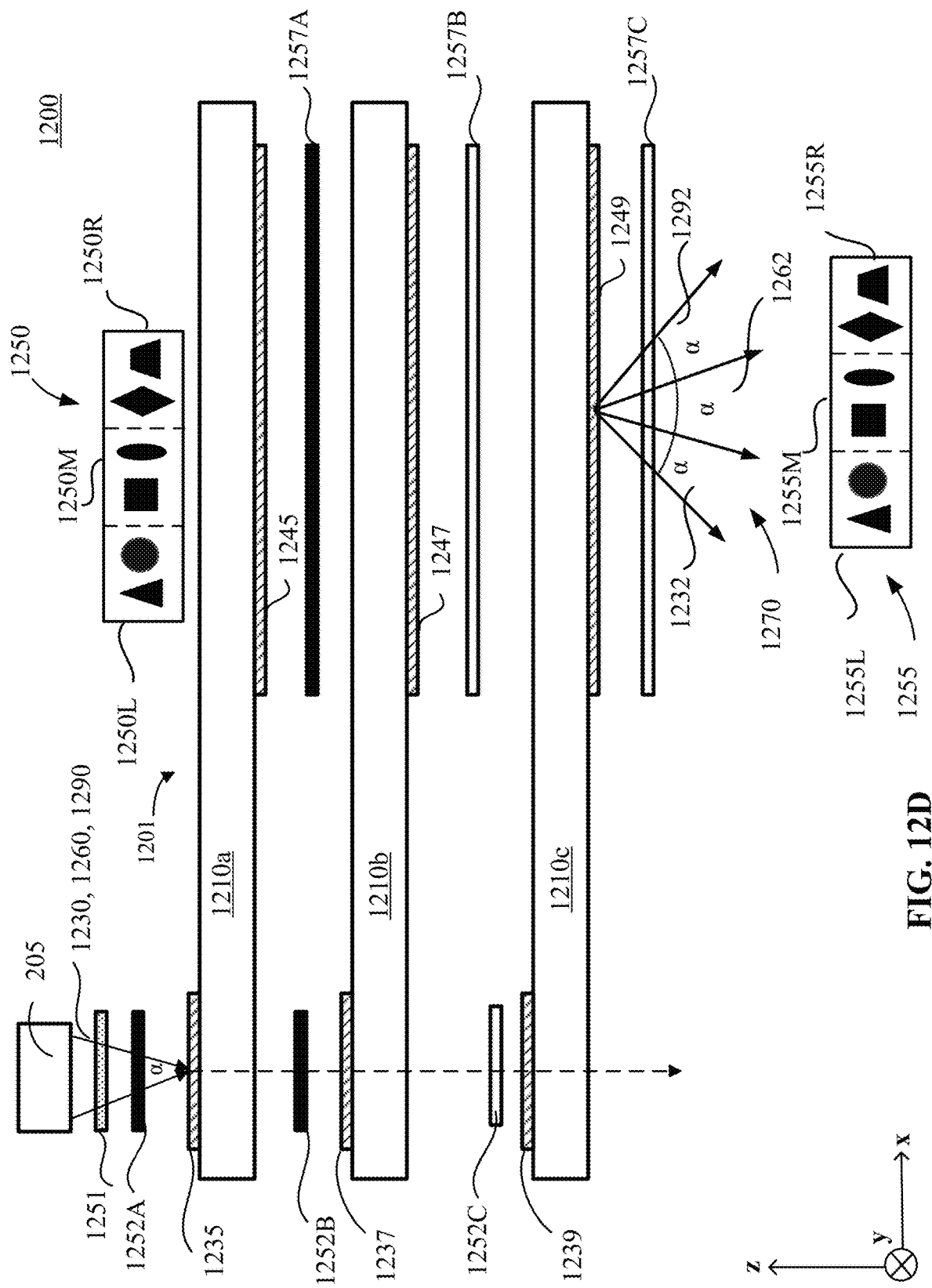

As shown in FIG. 12D, the input image lights 1230, 1260, and 1290 may have substantially the same input FOV. That is, the symmetry axes of the input FOVs of the input image lights 1230, 1260, and 1290 may be the same, and the angular sizes of the input FOVs of the input image lights 1230, 1260, and 1290 may be the same. The symmetry axes of the input FOVs of the input image lights 1230, 1260, and 1290 may be perpendicular to the in-coupling element 1235 (or 1237, 1239). In addition, the propagating direction of the center rays of the input image lights 1230, 1260, and 1290 may be parallel to one another, and may be perpendicular to the in-coupling element 1235 (or 1237, 1239).

During the display frame of the virtual image 1250 generated by the display element 220, the first output FOV 1234 delivered by the out-coupling grating 1245, the second output FOV 1264 delivered by the out-coupling grating 1247, and the third output FOV 1294 delivered by the third out-coupling grating 1249 may have a substantially narrow overlapping area (or overlapping FOV portion). An angular size of the overlapping FOV portion may be smaller than a predetermined percentage of the first output FOV 1234 (or the second output FOV 1264, or the third output FOV 1294). For example, the predetermined percentage of the first output FOV 1234 (or the second output FOV 1264, or the third output FOV 1294) may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%.

During the display frame of the virtual image 1250, an overall output FOV 1270 may be substantially equal to a combination of the first output FOV 1234 of the first output image light 1232, the second output FOV 1264 of the second output image light 1262, and the third output FOV 1294 of the third output image light 1292. The overall output FOV 1270 may be expanded (e.g., tripled) as compared to the input FOV (e.g., the first input FOV 1233, the second input FOV 1263, or the third input FOV 1293). Accordingly, during the display frame of the virtual image 1250, the eye 260 may perceive an image 1255 formed by the first image 1255L, the second image 1255M, and the third image 1255R of the image 1255.

Compared to a conventional waveguide display system (e.g., the conventional waveguide display system 100 shown in FIG. 1A) in which the output FOV 134 is substantially equal to the input FOV 133, through configuring the grating vectors (e.g., relative directions of the grating vectors) of the in-coupling grating and the out-coupling grating in the sets of coupling gratings, the disclosed optical system 1200 shown in FIGS. 12A-12D may be configured to provide an increased overall output FOV as compared to the input FOV. FIGS. 12A-12D show the configurations and operation schemes for delivering a single color image with an expanded overall output FOV to the eyebox. Delivering a polychromatic image (e.g., a full-color image) with an expanded overall output FOV (e.g., tripled as compared to the input FOV) to the eyebox may be based on a mechanism similar to that described above in connection with FIGS. 9A-9C or FIGS. 10A-10C. Referring to FIGS. 12A-12D, in some embodiments, the light source assembly 205 may emit a linearly polarized image light having the first polarization 870A or the second polarization 870B, and the polarizer 1251 may be omitted. Omitting the polarizer 1251 may increase the power efficiency of the optical system 1200.

Figure 13:
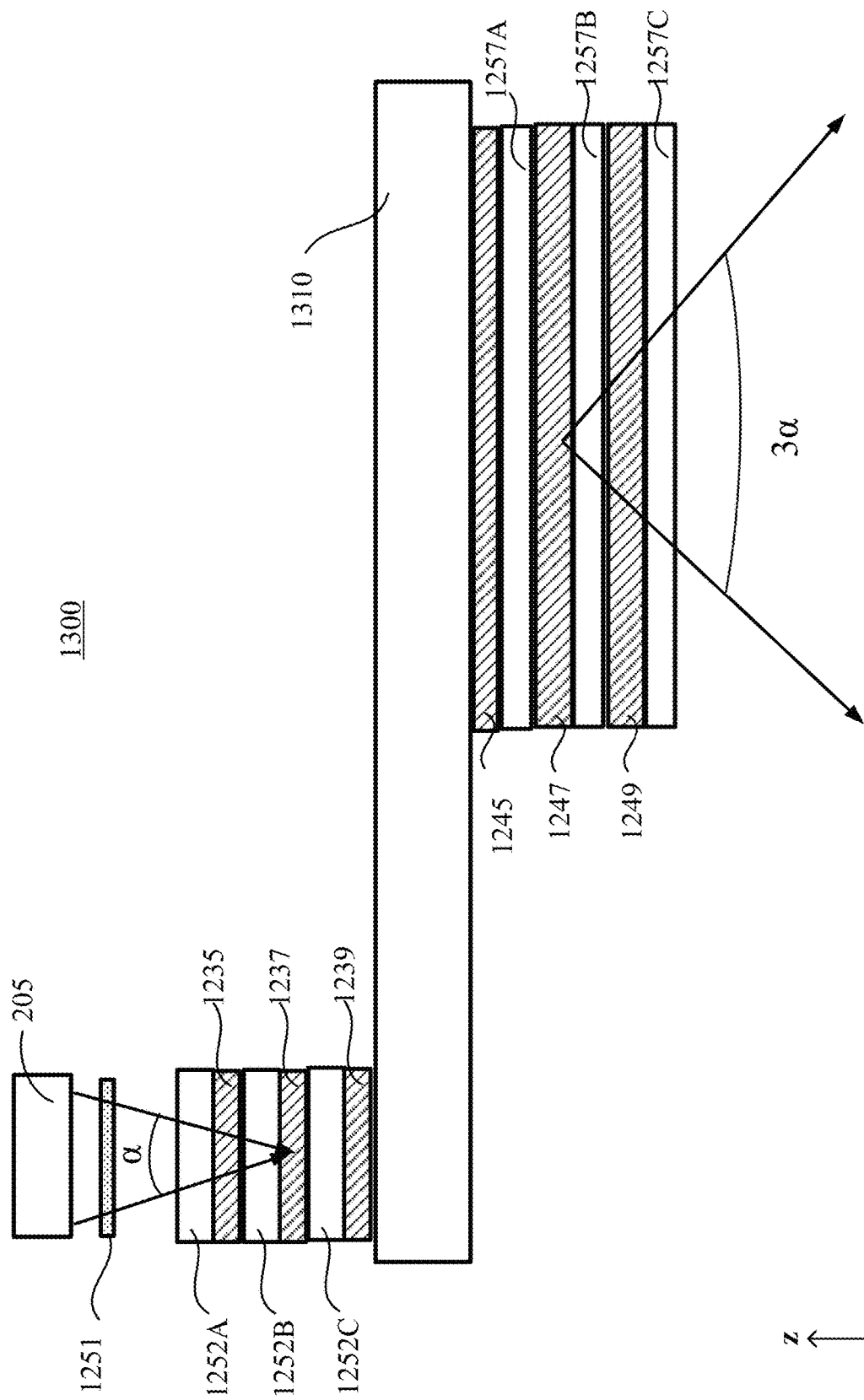
FIG. 13 illustrates a schematic diagrams of an optical system configured to provide an expanded FOV, according to another embodiment of the present disclosure.

In some embodiments, instead of being disposed at the respective waveguides in the waveguide stack 1201, the in-coupling gratings 1235, 1237, and 1239 and the corresponding polarization switches 1252A, 1252B, and 1252C may be stacked and attached to a common (e.g., a single) waveguide, and the out-coupling gratings 1245, 1247, and 1249 and the corresponding polarization switches 1257A, 1257B, and 1257C may be stacked and attached to the common waveguide. An exemplary waveguide display system 1300 is shown in FIG. 13. A stack of the in-coupling gratings and the corresponding polarization switches and a stack of the out-coupling gratings and the corresponding polarization switches may both be disposed at a same surface (e.g., a first surface or a second surface) of a common waveguide 1310, or may be disposed at different surfaces (e.g., the first surface and the second surface) of the common waveguide 1310, respectively. Descriptions of the operation scheme for providing an increased overall output FOV that is three times of the input FOV may refer to the descriptions rendered above in connection with FIGS. 12A-12D.

In some embodiments, the overall output FOV may be other suitable number of times (e.g., four times, five times, or six times, etc.) of the input FOV. The optical system may include a suitable number of in-coupling gratings and out-coupling gratings to deliver a plurality of image portions (e.g., four image portions, five image portions, six image portions, etc.) of the virtual image to the eyebox in a plurality of sub-frames of the display frame (e.g., four sub-frames, five sub-frames, sixth sub-frames, etc.). The grating vectors (e.g., the directions of the grating vectors) of the in-coupling grating and out-coupling gratings may be configured, such that a plurality of output lights (e.g., four output lights, five output light, sixth output lights, etc.) each having a predetermined output FOV (which may be substantially the same as the input FOV) may be delivered to a plurality of different spatial regions in a plurality of different directions (e.g., four different directions, five different directions, sixth different directions, etc.) with respect to a surface normal to the waveguide (or waveguide stack).

The predetermined output FOVs delivered during the plurality of sub-frames may have a substantially narrow overlapping area (or overlapping FOV portion). An angular size of the overlapping FOV portion may be smaller than a predetermined percentage of the predetermined output FOV. For example, the predetermined percentage of the predetermined output FOV may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. An overall output FOV delivered during the display frame may be a combination of the output FOVs delivered during the plurality of sub-frames. In some embodiments, the neighboring output FOVs delivered during the sub-frames may partially (e.g., substantially slightly) overlap to form a continuous FOV at the eye 260.

For illustrative purposes, FIGS. 7A-13 show that the in-coupling gratings and the out-coupling gratings included in the optical systems may be indirectly switchable gratings or directly switchable gratings. In some embodiments, when the optical system includes one in-coupling grating, the in-coupling grating may be a non-switchable grating. In some embodiments, the in-coupling gratings may include at least one indirectly switchable grating and at least one directly switchable grating, and/or the out-coupling gratings may include at least one indirectly switchable grating and at least one directly switchable grating.

For illustrative purposes, FIGS. 7A-13 show waveguide display systems configured for 1D pupil expansion and FOV expansion in a pupil replication direction that is the x-axis direction. In the embodiments shown in FIGS. 7A-13, a projection of a grating vector of a grating (e.g., an in-coupling grating, an out-coupling grating) onto the x-axis direction may be referred to as an in-plane projection of the grating vector of the grating. In a set of coupling gratings configured to operate in the diffraction state to rotate an output FOV relative to the input FOV (e.g., rotate the symmetry axis of the output FOV relative to the symmetry axis of the input FOV), a vector sum of the in-plane projections of the grating vectors of the in-coupling grating and the out-coupling grating may be a non-null vector. In a set of coupling gratings configured to operate in the diffraction state without rotating an output FOV relative to the input FOV, a vector sum of the in-plane projections of the grating vectors all of the gratings may be a null vector.

Although not shown, in some embodiments, the waveguide display systems may be configured for 1D pupil expansion and FOV expansion in a pupil replication direction that is the y-axis direction. In such cases, a projection of a grating vector of a grating onto the y-axis direction may be referred to as an in-plane projection of the grating vector of the grating. In a set of coupling gratings configured to operate in the diffraction state to rotate an output FOV relative to the input FOV, a vector sum of the in-plane projections of the grating vectors of the gratings (e.g., an in-coupling grating and an out-coupling grating) may be a non-null vector. In a set of coupling gratings configured to operate in the diffraction state without rotating an output FOV relative to the input FOV, a vector sum of the in-plane projections of the grating vectors of all the gratings may be a null vector.

Although not shown, in some embodiments, the waveguide display systems may be configured for 2D pupil expansion and FOV expansion in two different pupil replication directions, e.g., an x-axis direction and a y-axis direction. In such cases, a set of coupling gratings may include at least three gratings, e.g., an in-coupling grating, a folding grating, and an out-coupling grating. An in-plane projection of a grating vector of a grating may be a projection in a plane of the grating (e.g., a surface plane of the grating, or a plane parallel to the surface plane of the grating) or a plane corresponding to a surface of a waveguide to which the grating is attached. In some embodiments, in a set of coupling gratings configured to operate in the diffraction state to rotate an output FOV relative to the input FOV, a vector sum of the in-plane projections of the grating vectors of all of the gratings may be a non-null vector. In a set of coupling gratings configured to operate in the diffraction state without rotating an output FOV relative to the input FOV, a vector sum of the in-plane projections of the grating vectors of all of the gratings may be a null vector.

FIG. 14 is a flowchart illustrating a method 1400 for providing an increased overall output FOV, according to an embodiment of the present disclosure. The method 1400 may be performed by the controller 215 and/or optical elements included in the optical systems disclosed herein. In some embodiments, a virtual image to be displayed by a disclosed optical system may be divided into the plurality of image portions. The method 1400 may include generating, by a light source assembly, a plurality of input image lights representing a plurality of image portions of a virtual image during a plurality of time periods, the input image lights having a substantially same input field of view ("FOV") with a substantially same symmetry axis (Step 1410). The input image lights may be sequentially generated during the plurality of time periods. In some embodiments, the light source assembly may include a display element and a light conditioning system including a lens (e.g., a collimating lens). In some embodiments, the time periods may be a plurality of sub-frames of a display frame of the virtual image. In some embodiments, the plurality of input image lights may correspond to the plurality of image portions generated by a projection display in sequential time periods.

The method 1400 may also include during the time periods, coupling, by a plurality of grating sets, the input image lights into a waveguide and out of the waveguide as a plurality of output image lights, a combined output FOV of the output image lights being larger than the input FOV (Step 1420). In some embodiments, during each time period, one of the input image lights may be coupled, by one of the plurality of grating sets, into the waveguide and out of the waveguide as one of the plurality of output image lights. Thus, the input image lights may be sequentially coupled into and out of the waveguide as the plurality of output image lights by the corresponding grating sets. In some embodiments, the output image lights may be spatially directed to side-by-side spatial regions at the output side of the waveguide. In some embodiments, each of the plurality of input image lights may have the same input FOV. In some embodiments, each of the plurality of input image lights may be based on an image light generated by a full light-generating area of the display element. In some embodiments, each of the output image lights may have the same output FOV, which may be substantially the same as the input FOV.

In some embodiments, the output FOVs may have a substantially narrow overlapping area (or overlapping FOV portion). An angular size of the overlapping FOV portion may be smaller than a predetermined percentage of the output FOV. For example, the predetermined percentage of the output FOV may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. In some embodiments, an angular size of the combined output FOV that is a combination of the output FOVs of the output image lights may be a predetermined number of times of an angular size of the input FOV. In some embodiments, the predetermined number may correspond to the number of image portions into which the virtual image is divided.

In some embodiments, the grating sets may be configured to transmit a plurality of portions of the combined output FOV from an input side of the waveguide to an output side of the waveguide, respectively. In some embodiments, each grating set may include a plurality of gratings, such as an in-coupling grating and an out-coupling grating. In some embodiments, each grating set may include an in-coupling grating, an out-coupling grating, and a folding grating. In at least one of the plurality of grating sets, a vector sum of in-plane projections of grating vectors of all the gratings include in the at least one grating set may be a non-null vector. In some embodiments, the predetermined number may an even number, and a vector sum of in-plane projections of grating vectors of all the gratings included in the respective grating set may be a non-null vector. In some embodiments, the predetermined number may an odd number. In one of the plurality of grating sets, a vector sum of in-plane projections of grating vectors of all the gratings included in the grating set may be a null vector. A vector sum of in-plane projections of grating vectors of all the gratings in each of the remaining grating set may be a non-null vector, which may be along the pupil replication direction.

In some embodiments, the grating sets may include at least two out-coupling gratings (e.g., a first out-coupling grating and a second out-coupling grating) that may be directly or indirectly switchable between a diffraction state and a non-diffraction state, and at least one in-coupling grating. In some embodiments, at least one of the first out-coupling grating or the second out-coupling grating may include a directly switchable grating, and the method 1400 may further include controlling, by the controller, a power source to supply a voltage to configure the directly switchable grating to operate in the diffraction state or in the non-diffraction state. In some embodiments, at least one of the first out-coupling grating or the second out-coupling grating may include an indirectly switchable grating, and the method 1400 may further include controlling, by the controller, a polarization switch optically coupled with the indirectly switchable grating to operate in a switching state or a non-switching state to configure the indirectly switchable grating to operate in the diffraction state or in the non-diffraction state.

In some embodiments, the virtual image may be divided into two equal image portions. During a first sub-frame of a display frame of the virtual image, a first input image light representing a first image portion of the virtual image may be generated by the light source assembly. In some embodiments, the display element may generate a first image light representing a first image portion of the virtual image based on a full light-generating area of the display element, and the lens may convert the first image light into a first input image light having the input FOV. The in-coupling grating may couple the first input image light into the waveguide, and a first out-coupling grating of the at least two out-coupling gratings may couple the first input image light out of the waveguide as a first output image light. During a second sub-frame of the display frame of the virtual image, the display element may generate a second image light representing a second image portion of the virtual image based on a full light-generating area of the display element, and the lens may convert the second image light into a second input image light having the input FOV. The in-coupling grating may couple the second input image light into the waveguide, and a second out-coupling grating of the at least two out-coupling gratings may couple the second input image light out of the waveguide as a second output image light. The first output image light and the second output image light may be spatially arranged side by side, and may be slightly overlapped. The output image lights may provide a combined output FOV having an angular size that is substantially two times of an angular size of the input FOV of each of the first input image light and the second input image light.

In some embodiments, the virtual image may be divided into three or more image portions. The display frame of the virtual image may be divided into three or more sub-frames. The light source assembly may generate a plurality of input image lights (e.g., a first, a second, and a third input image light) each representing an image portion of the virtual image and having a substantially same input FOV. Each input image light may be generated based on an image light generated by a full light-generating area of the display element. For example, the display element may generate the image light based on the full light-generating area of the display element, and the lens (e.g., collimating lens) may convert the image light into the input image light.

The in-coupling grating may couple each of the input image lights (e.g., the first, the second, or the third input image light) into the waveguide during respective sub-frame. The system may include three or more out-coupling gratings, each configured to couple the input image light out of the waveguide during the respective sub-frame. Three or more output lights may be sequentially output from the waveguide during the display frame, with each output light having an output FOV with a size that is substantially equal to the size of the input FOV of the input image light. The three or more output image lights may be arranged at the output side of the waveguide side by side. The output FOVs may have a substantially narrow overlapping area (or overlapping FOV portion). An angular size of the overlapping FOV portion may be smaller than a predetermined percentage of the output FOV. For example, the predetermined percentage of the output FOV may be 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10%. An angular size of the combined or overall output FOV of the overall output image light (formed by the three or more output image lights) may be three or more times of an angular size of the input FOV of each input image light.

In some embodiments, when the virtual image is divided into a predetermined number of image portions, the light source assembly may generate the predetermined number of input image lights corresponding to the predetermined number of image portions. Each input image light may be generated based on an image light generated by a full light-generating area of the display element. The display frame of the virtual image may be divided into the predetermined number of sub-frames. In each sub-frame, an input image light corresponding to an image portion of the virtual image may be coupled into the waveguide by an in-coupling element, and coupled out of the waveguide by an out-coupling element as an output image light. Thus, during the number of sub-frames, the predetermined number of output image lights may be output from the waveguide sequentially. The predetermined number of output image lights may be spatially arranged side by side. A combined, overall output FOV of the combination of the output image lights may have an angular size that is the predetermined number of times of an angular size of the input FOV of each of the input image light.

The disclosed optical systems (e.g., waveguide display systems) and method for providing increased overall output FOV may be implemented in various systems, e.g., a near-eye display ("NED"), a head-up display ("HUD"), a head-mounted display ("HMD"), smart phones, laptops, or televisions, etc. In addition, the waveguide display systems shown in the figures are for illustrative purposes to explain the mechanism for providing an increased overall output FOV that may be two times, three times, or four times, etc., of an input FOV. The mechanism for an increased overall output FOV may be applicable to any suitable display systems other than the disclosed waveguide display systems. The gratings shown and disclosed herein are for illustrative purposes. Any suitable light deflecting elements (e.g., non-switchable light deflecting elements, indirectly switchable light deflecting elements, and/or directly switchable light deflecting elements) may be used and configured to provide the increased overall output FOV, following the same or similar design principles described herein with respect to the gratings.

For example, the light deflecting element may include a polarization selective grating or a holographic element that includes sub-wavelength structures, liquid crystals, a photo-refractive holographic material, or a combination thereof. In some embodiments, the light deflecting element that is a polarization non-selective element may also be implemented and configured to provide an increased overall output FOV. In some embodiments, the light deflecting elements may include diffraction gratings, cascaded reflectors, prismatic surface elements, and/or an array of holographic reflectors, or a combination thereof. The controller may be configured to configure a light deflecting element to operate at a light deflection state to deflect an input light (e.g., changing a propagating direction of the input light), or operate at a light non-deflection state in which the light deflecting element may not change the propagating direction of the input light.

Figure 15A:
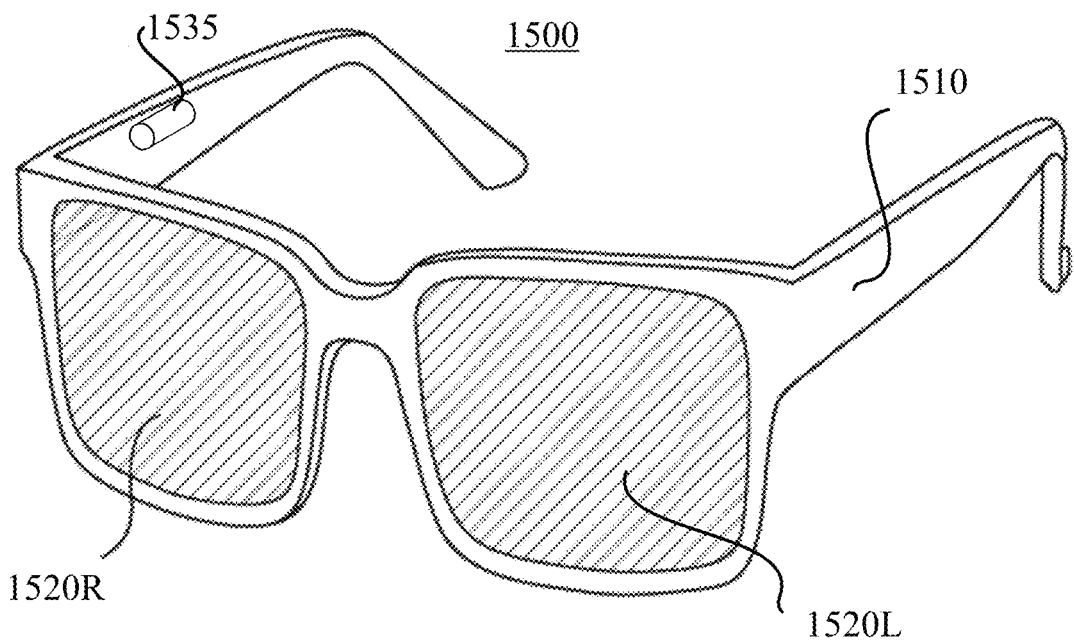
FIG. 15A illustrates a schematic diagram of a near-eye display ("NED"), according to an embodiment of the present disclosure.

FIG. 15A illustrates a schematic diagram of a near-eye display ("NED") 1500 according to an embodiment of the present disclosure. In some embodiments, the NED 1500 may be referred to as a head-mounted display ("HMD"). The NED 1500 may present media content to a user, such as one or more images, videos, audios, or a combination thereof. The NED 1500 may operate as a VR device, an AR device, an MR device, or a combination thereof.

As shown in FIG. 15A, the NED 1500 may include a frame 1510, a left display system 1520L and a right display system 1520R. The frame 1510 may include a suitable type of mounting structure configured to mount the left display system 1520L and the right display system 1520R to a body part (e.g. a head) of the user (e.g., adjacent eyes of the user). In some embodiments, the frame 1510 may represent a frame of eye-wear glasses. The left display system 1520L and the right display system 1520R may be configured to enable the user to view virtual content presented by the NED 1500 and/or to view images of real-world objects. For example, in some embodiments, each of the left display system 1520L and the right display system 1520R may include a see-through optical element. In some embodiments, the left display system 1520L and the right display system 1520R may include any suitable display assembly (not shown) configured to generate a light (e.g., an image light corresponding to a virtual image) and to direct the image light to an eye of the user. In some embodiments, the NED 1500 may include a projection system 1535, which may include a projector.

Figure 15B:
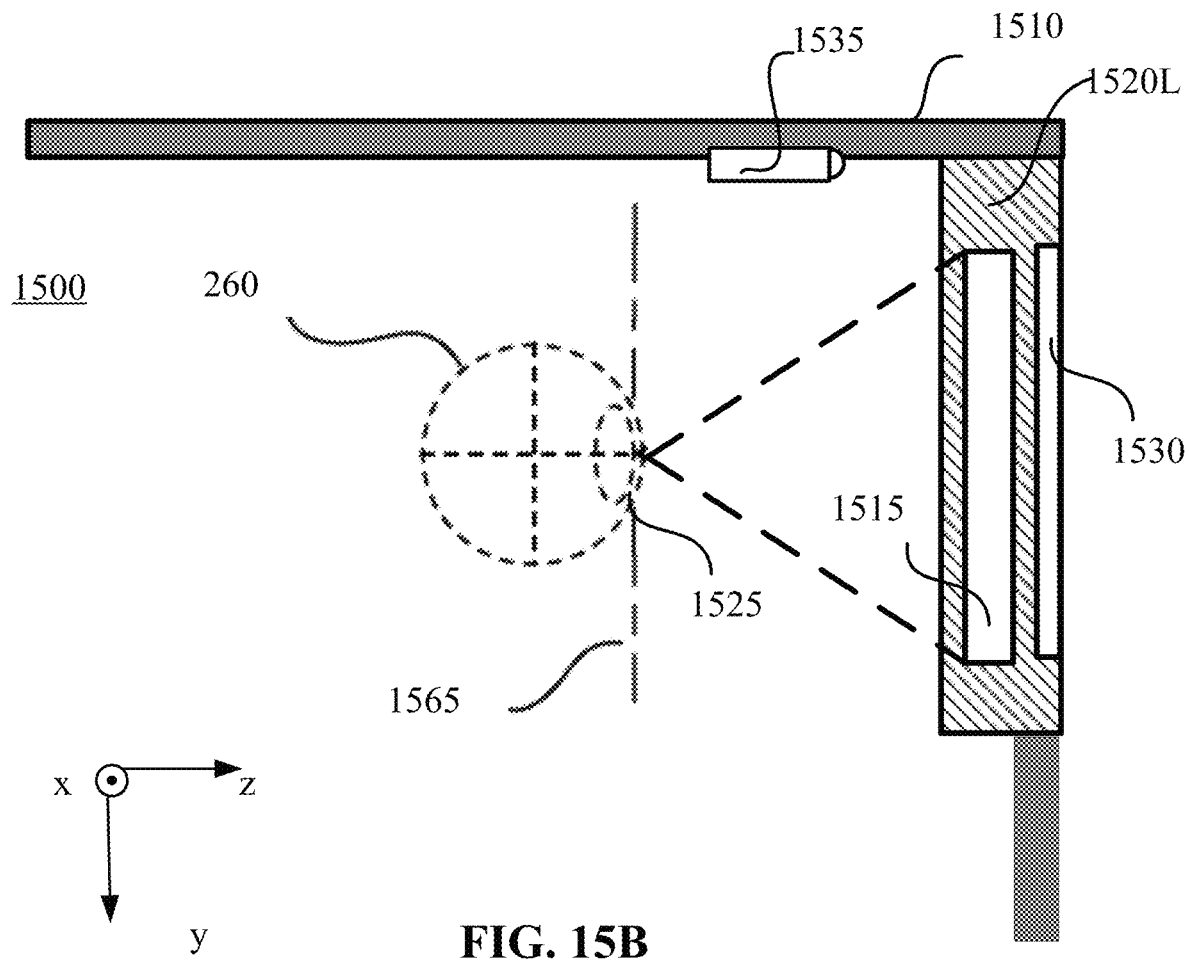
FIG. 15B illustrates a schematic cross-sectional view of half of the NED shown in FIG. 15A, according to an embodiment of the present disclosure.

FIG. 15B is a cross-sectional view of the NED 1500 shown in FIG. 15A according to an embodiment of the present disclosure. FIG. 15B shows the cross-sectional view associated with the left display system 1520L of the NED 1500. The cross-sectional view of the right display system 1520R may be similar to that shown for the left display system 1520L. As shown in FIG. 15B, for an eye 260, the left display system 1520L may include an optical device 1515 for providing an increased overall output FOV to an eye-box 1565. In some embodiments, the optical device 1515 may include a disclosed waveguide display system, such as the waveguide display system 700 shown in FIGS. 7A-7C, the waveguide display system 800 shown in FIGS. 8A-8C, the waveguide display system 900 shown in FIGS. 9A-9C, the waveguide display system 1000 shown in FIGS. 10A-10C, the waveguide display system 1100 shown in FIGS. 11A-11D, the waveguide display system 1200 shown in FIGS. 12A-12D, or the waveguide display system 1300 shown in FIG. 13.

An exit pupil 1525 may be a spatial region or location within the eye-box 1565 where the eye 260 may be positioned to receive lights delivered by the waveguide display system 1515 when the user wears the NED 1500. For illustrative purposes, FIG. 15B shows the cross-sectional view associated with a single eye 260 and a single waveguide display system 1515. In some embodiments, another waveguide display system separate from and similar to the waveguide display system 1515 shown in FIG. 15B may be included to provide an image light to another eye located at an exit pupil. As shown in FIG. 15B, the waveguide display system 1515 may be provided for one eye 260 of the user. The waveguide display system 1515 for one eye may be separated or partially separated from a similar waveguide display assembly for the other eye. In certain embodiments, a single waveguide display system 1515 may be used for both eyes of the user.

In some embodiments, the NED 1500 may include one or more optical elements (not shown) disposed between the waveguide display system 1515 and the eye 260. The optical elements may be configured to, e.g., correct aberrations in an image light generated from the waveguide display system 1515, magnify an image light generated from the waveguide display system 1515, or perform another type of optical adjustment of an image light generated from the waveguide display system 1515. Examples of the one or more optical elements may include an aperture, a Fresnel lens, a convex lens, a concave lens, a filter, any other suitable optical element that affects an image light, or a combination thereof.

In some embodiments, the NED 1500 may include an adaptive dimming element 1530, which may dynamically adjust the transmittance of real-world lights from the real-world environment, thereby switching the NED 1500 between a VR device and an AR device or between a VR device and an MR device. In some embodiments, along with switching between the AR/MR device and the VR device, the adaptive dimming element 1530 may be used in the AR and/MR device to mitigate differences in brightness of real and virtual objects.

Any of the steps, operations, or processes described herein may be performed or implemented with one or more hardware and/or software modules, alone or in combination with other devices. In one embodiment, a software module is implemented with a computer program product including a computer-readable medium containing computer program code, which can be executed by a computer processor for performing any or all of the steps, operations, or processes described. In some embodiments, a hardware module may include hardware components such as a device, a system, an optical element, a controller, an electrical circuit, a logic gate, etc.

Embodiments of the present disclosure may also relate to an apparatus for performing the operations herein. This apparatus may be specially constructed for the specific purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. The non-transitory computer-readable storage medium can be any medium that can store program codes, for example, a magnetic disk, an optical disk, a read-only memory ("ROM"), or a random access memory ("RAM"), an Electrically Programmable read only memory ("EPROM"), an Electrically Erasable Programmable read only memory ("EEPROM"), a register, a hard disk, a solid-state disk drive, a smart media card ("SMC"), a secure digital card ("SD"), a flash card, etc. Furthermore, any computing systems described in the specification may include a single processor or may be architectures employing multiple processors for increased computing capability. The processor may be a central processing unit ("CPU"), a graphics processing unit ("GPU"), or any processing device configured to process data and/or performing computation based on data. The processor may include both software and hardware components. For example, the processor may include a hardware component, such as an application-specific integrated circuit ("ASIC"), a programmable logic device ("PLD"), or any combination thereof. The PLD may be a complex programmable logic device ("CPLD"), a field-programmable gate array ("FPGA"), etc.

Further, when an embodiment illustrated in a drawing shows a single element, it is understood that the embodiment or another embodiment not shown in the figures but within the scope of the present disclosure may include a plurality of such elements. Likewise, when an embodiment illustrated in a drawing shows a plurality of such elements, it is understood that the embodiment or another embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:
a waveguide; and
a plurality of grating sets coupled with the waveguide,
wherein a first grating set of the plurality of grating sets is configured to couple, during a first time period, a first input image light into and out of the waveguide as a first output image light, and a first vector sum of in-plane projections of grating vectors associated with all gratings included in the first grating set is a first non-null vector,
wherein a second grating set of the plurality of grating sets is configured to couple, during a second time period, a second input image light into and out of the waveguide as a second output image light, and a second vector sum of in-plane projections of grating vectors associated with all gratings included in the second grating set is a second non-null vector,
wherein a third grating set of the plurality of grating sets is configured to couple, during a third time period, a third input image light into and out of the waveguide as a third output image light, and a third vector sum of in-plane projections of grating vectors associated with all gratings included in the third grating set is a null vector, and
wherein the first vector sum and the second vector sum have different directions.

2. The device of claim 1, wherein the first, second, and third input image lights have a substantially same input field of view ("FOV"), and a combined output FOV of the first, second, and third output image lights is larger than the input FOV.

3. The device of claim 1, wherein the first vector sum and the second vector sum have anti-parallel directions.

4. The device of claim 1, wherein magnitudes of the first vector sum and the second vector sum are substantially the same.

5. The device of claim 1, wherein
the first output image light has a first output field of view ("FOV") with a first symmetry axis, the first symmetry axis forming a positive angle with a surface normal of the waveguide,
the second output image light has a second output FOV with a second symmetry axis, the second symmetry axis forming a negative angle with the surface normal of the waveguide, and
the third output image light has a third output FOV with a third symmetry axis that is parallel to the surface normal of the waveguide.

6. The device of claim 1, wherein
the first output image light has a first output field of view ("FOV") with a first symmetry axis, the first symmetry axis forming a positive angle with a surface normal of the waveguide, and
the second output image light has a second output FOV with a second symmetry axis, the second symmetry axis forming a negative angle with the surface normal of the waveguide.

7. The device of claim 1, further comprising a controller configured to:
during the first time period, control a first out-coupling grating in the first grating set to operate in a diffraction state to couple the first input image light out of the waveguide as the first output image light propagating toward a second out-coupling grating in the second grating set, and control the second out-coupling grating to operate in a non-diffraction state to transmit the first output image light; and
during the second time period, control the first out-coupling grating to operate in the non-diffraction state to transmit the second input image light toward the second out-coupling grating, and control the second out-coupling grating to operate in the diffraction state to couple the second input image light out of the waveguide as the second output image light.

8. The device of claim 7, wherein
at least one of the first out-coupling grating or the second out-coupling grating is a directly switchable grating,
the device further includes a power source configured to provide an electric field to the directly switchable grating, and
the controller is configured to control the electric field provided by the power source to control the directly switchable grating to operate in the diffraction state or the non-diffraction state.

9. The device of claim 7, wherein
at least one of the first out-coupling grating or the second out-coupling grating is an indirectly switchable grating,
the device further includes a polarization switch optically coupled with the indirectly switchable grating, and a power source electrically coupled with the polarization switch, and
the controller is configured to control the power source to provide different electric fields to the polarization switch to thereby control the indirectly switchable grating to operate in the diffraction state or the non-diffraction state.

10. The device of claim 1, wherein the first, second and third input image lights have a substantially same input field of view ("FOV") with a substantially same symmetry axis, and the symmetry axis of the input FOV is substantially parallel with a surface normal of the waveguide.

11. The device of claim 10, wherein the first, second and third output image lights have individual output field of view ("FOVs"), and an angular size of each of the individual output FOVs is equal to an angular size of the input FOV.

12. The device of claim 1, further comprising a light source assembly including:
a display element configured to generate a first light based on a first image portion of a virtual image during the first time period, a second light based on a second image portion of the virtual image during the second time period, and a third light based on a third image portion of the virtual image during the third time period, wherein the first, second and third image portions have a substantially same image portion size, and each of the first, second and third lights is generated by a full light-generating area of the display element; and
a lens configured to convert the first, second and third lights output from the display element into the first, second and third input image lights representing the first, second and third image portions, respectively, the first, second and third input image lights having a substantially same input field of view ("FOV").

13. The device of claim 12, wherein
an angular size of a combined output FOV of the first, second and third output image lights is three times of an angular size of the input FOV,
the combined output FOV is a combination of individual output FOVs corresponding to the first, second and third output image lights, and
at least one of the individual output FOVs is rotated relative to the input FOV.

14. The device of claim 12, wherein
a size of the full light-generating area of the display element is substantially equal to a size of a display panel included in the display element, or
the size of the full light-generating area of the display element corresponds to a scanning range of a scanner included in the display element.

15. A method, comprising:
during a first time period, coupling, by a first grating set, a first input image light into and out of a waveguide as a first output image light;
during a second time period, coupling, by a second grating set, a second input image light into and out of the waveguide as a second output image light; and
during a third time period, coupling, by a third grating set, a third input image light into and out of the waveguide as a third output image light,
wherein a first vector sum of in-plane projections of grating vectors associated with all gratings included in the first grating set is a first non-null vector,
wherein a second vector sum of in-plane projections of grating vectors associated with all gratings included in the second grating set is a second non-null vector,
wherein a third vector sum of in-plane projections of grating vectors associated with all gratings included in the third grating set is a null vector, and
wherein the first vector sum and the second vector sum have different directions.

16. The method of claim 15, wherein the first and second input image lights have a substantially same input field of view ("FOV"), and a combined output FOV of the first and second output image lights is larger than the input FOV.

17. The method of claim 15, further comprising:
during the first time period, generating, by a light source assembly, the first input image light representing a first image portion of a virtual image; and
during the second time period, generating, by the light source assembly, the second input image light representing a second image portion of the virtual image.

18. The method of claim 17, further comprising:
during the third time period, generating, by the light source assembly, the third input image light representing a third image portion of the virtual image.

19. The method of claim 15, wherein:
the first output image light has a first output field of view ("FOV") with a first symmetry axis, the first symmetry axis forming a positive angle with a surface normal of the waveguide, and
the second output image light has a second output FOV with a second symmetry axis, the second symmetry axis forming a negative angle with the surface normal of the waveguide.

* * * * *